US011555528B2

(12) United States Patent
Kopp

(10) Patent No.: US 11,555,528 B2
(45) Date of Patent: Jan. 17, 2023

(54) VARIABLE ROTARY MASS VIBRATION SUPPRESSION SYSTEM

(71) Applicant: Moog Inc., East Aurora, NY (US)

(72) Inventor: John Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 638 days.

(21) Appl. No.: 16/500,715

(22) PCT Filed: Mar. 30, 2018

(86) PCT No.: PCT/US2018/025458
§ 371 (c)(1),
(2) Date: Oct. 3, 2019

(87) PCT Pub. No.: WO2018/187178
PCT Pub. Date: Nov. 10, 2018

(65) Prior Publication Data

US 2020/0191237 A1 Jun. 18, 2020

Related U.S. Application Data

(60) Provisional application No. 62/481,508, filed on Apr. 4, 2017.

(51) Int. Cl.
*F16F 15/22* (2006.01)
*B06B 1/16* (2006.01)
(Continued)

(52) U.S. Cl.
CPC ............ *F16F 15/223* (2013.01); *B06B 1/166* (2013.01); *B63H 21/302* (2013.01);
(Continued)

(58) Field of Classification Search
CPC ............ B64C 27/001; B64C 2027/003; B63H 21/302; B06B 1/166; F16F 15/223
See application file for complete search history.

(56) References Cited

U.S. PATENT DOCUMENTS 3,509,971 A 5/1970 Gerstine et al.
5,347,884 A 9/1994 Garnjost et al.
(Continued)

FOREIGN PATENT DOCUMENTS

EP 0337040 A1 10/1989
EP 0776431 B1 4/1998
WO 2017013303 A1 1/2017

OTHER PUBLICATIONS

International Search Report and Written Opinion of the International Searching Authority for International Application No. PCT/US2018/025458, completed Jun. 19, 2018.
(Continued)

*Primary Examiner* — Topaz L. Elliott
*Assistant Examiner* — Jackson N Gillenwaters
(74) *Attorney, Agent, or Firm* — Harter Secrest & Emery LLP

(57) ABSTRACT

A vibration suppression unit for an aircraft comprising a vibration control frame adapted to be mounted to the aircraft and to rotate about a central axis, a first motor configured to rotate the vibration control frame about the central axis, a second motor configured to rotate a first and second center of mass about a first and second axis or rotation, a third motor configured to adjust a variable distance between the first and second centers of mass and the first and second axis of rotation, respectively, and a controller for receiving input signals and outputting command signals to the first, second and third motors.

34 Claims, 48 Drawing Sheets

(51) Int. Cl.

| | |
|---|---|
| ***B63H 21/30*** | (2006.01) |
| ***B64C 27/00*** | (2006.01) |
| ***F16F 7/10*** | (2006.01) |
| ***G05D 19/02*** | (2006.01) |

(52) U.S. Cl.
CPC .......... *B64C 27/001* (2013.01); *F16F 7/1011* (2013.01); *G05D 19/02* (2013.01); *B64C 2027/003* (2013.01)

(56) References Cited

U.S. PATENT DOCUMENTS

| | | | | |
|---|---|---|---|---|
| 5,825,663 | A | 10/1998 | Barba et al. | |
| 6,494,680 | B2 | 12/2002 | Cardin | |
| 7,448,854 | B2 | 11/2008 | Jolly et al. | |
| 7,722,322 | B2 | 5/2010 | Altieri et al. | |
| 7,942,633 | B2 | 5/2011 | Jolly et al. | |
| 8,021,115 | B2 | 9/2011 | Welsh | |
| 8,090,482 | B2 | 1/2012 | Jolly et al. | |
| 8,162,606 | B2 | 4/2012 | Jolly et al. | |
| 8,267,652 | B2 | 9/2012 | Jolly et al. | |
| 8,313,296 | B2 | 11/2012 | Jolly et al. | |
| 8,424,799 | B2 | 4/2013 | Popelka et al. | |
| 8,435,002 | B2 | 5/2013 | Jolly et al. | |
| 8,474,745 | B2 | 7/2013 | Popelka et al. | |
| 8,480,364 | B2 | 7/2013 | Altieri et al. | |
| 8,639,399 | B2 | 1/2014 | Jolly et al. | |
| 8,920,125 | B2 | 12/2014 | Welsh | |
| 9,073,627 | B2 | 7/2015 | Jolly et al. | |
| 9,139,296 | B2 | 9/2015 | Popelka et al. | |
| 9,452,828 | B2 | 9/2016 | Heverly et al. | |
| 9,776,712 | B2 | 10/2017 | Jolly et al. | |
| 10,308,355 | B2 | 6/2019 | Arce | |
| 10,364,865 | B2 | 7/2019 | Hunter et al. | |
| 2006/0083617 | A1* | 4/2006 | Jolly | F16F 15/22 416/133 |
| 2006/0135302 | A1 | 6/2006 | Manfredotti et al. | |
| 2013/0164132 | A1 | 6/2013 | Welsh | |
| 2014/0360830 | A1 | 12/2014 | Heverly et al. | |
| 2015/0203196 | A1 | 7/2015 | Heverly, II et al. | |
| 2016/0195161 | A1 | 7/2016 | Hunter et al. | |
| 2017/0259911 | A1* | 9/2017 | Choi | B64C 27/001 |
| 2021/0155341 | A1* | 5/2021 | Heath | B64C 27/82 |

OTHER PUBLICATIONS

European Patent Office (ISA/EP), International Search Report and Written Opinion of ISA from International Patent Application No. PCT/US2018/025531, dated Jun. 25, 2018.

European Patent Office (ISA/EP), International Search Report and Written Opinion of ISA from International Patent Application No. PCT/US2018/025508, dated Jun. 25, 2018.

* cited by examiner

VARIABLE ROTARY MASS VIBRATION SUPPRESSION SYSTEM

TECHNICAL FIELD

The present invention relates generally to the field of aircraft vibration control systems, and more particularly to a variable rotary mass vibration suppression system.

BACKGROUND ART

Active counter-vibration devices have been used in rotary-wing aircraft, such as helicopters and tiltrotors, to oppose and cancel high levels of vibration transmitted from the rotor to the fuselage. If such vibrations are not suppressed, they can lead to structural fatigue and may be transmitted to other areas and systems of the helicopter.

Hub mounted vibration control systems are used to suppress vibrations more proximate to the source of the vibration, namely at the main rotor system. The rotor system of a conventional helicopter drives a plurality of rotor blades that are subject to numerous aerodynamic loads. Mast or hub mounted vibration isolation systems suppress vibrations at a location proximate to the source, as opposed to active vibration control systems that may be used to reduce or suppress vibrations at locations more remote from the main rotor system.

U.S. Pat. No. 8,920,125, entitled "Dual Frequency Hub Mounted Vibration Suppressor System," issued Dec. 30, 2014, is directed to a hub mounted vibration suppression system that includes an annular electric motor system defined about the axis of rotation of the main rotor system and a control system in communication with the annular electric motor system to independently control rotation of at least two masses about the axis of rotation of the main rotor system to reduce in-plane vibration of the rotating system. This patent is also directed to a method of reducing vibrations in a rotary-wing aircraft main rotor system that includes independently rotating a multiple of independently rotatable masses disposed about the axis of rotation defined by the main rotor system and controlling a relative angular position of the independent rotatable masses to reduce the vibrations of the main rotor system.

U.S. Pat. No. 8,435,002, entitled "Helicopter Vibration Control System and Rotating Assembly Rotary Forces Generators for Cancelling Vibrations," issued May 7, 2013, is directed to a rotary blade rotating hub mounted rotating assembly vibration control system that includes a first imbalance mass concentration rotor, a second imbalance mass concentration rotor, a third imbalance mass concentration rotor, and a fourth imbalance mass concentration rotor, each having a center axis of rotation that is centered on the rotating assembly center axis of rotation.

U.S. Patent Application Publication No. 2015/0203196, entitled "Active Vibration Control System With Non-Concentric Revolving Masses," is directed to vibration control system for a rotor hub having unbalanced weights each rotating about an axis non-concentric with the rotor hub axis.

BRIEF SUMMARY

With parenthetical reference to the corresponding parts, portions or surfaces of the disclosed embodiment, merely for purposes of illustration and not by way of limitation, an improved vibration suppression system (110) is provided comprising a first vibration control mass (116) having a first center of mass (118); a first Cg input driver (119) rotationally coupled to the first mass (116) such that the first center of mass (118) rotates about a first Cg axis (120) with selective rotation of the first Cg input driver (119) about a first Cg input drive axis (123A); the first center of mass (118) offset a first Cg radial distance (121) from the first Cg axis (120); a first mass input driver (122) rotationally coupled to the first mass (116) such that the first Cg axis (120) rotates about a first mass axis (123) with selective rotation of the first mass input driver (122) about a first mass input drive axis (123B); the first Cg axis (120) offset a first mass radial distance (124) from the first mass axis (123); the first center of gravity (118) having a selectively variable first displacement angle (125) defined by the inclusive angle between a line (121A) extending between the first Cg axis (120) and the first center of mass (118) and a line (124A) extending between the first Cg axis (120) and the first mass axis (123); the first mass axis (123) offset a first unit radial distance (115) from a unit center axis (10); a second vibration control mass (216) having a second center of mass (218); a second Cg input driver (219) rotationally coupled to the second mass (216) such that the second center of mass (218) rotates about a second Cg axis (220) with selective rotation of the second Cg input driver (219) about a second Cg input drive axis (223A); the second center of mass (218) offset a second Cg radial distance (221) from the second Cg axis (220); a second mass input driver (222) rotationally coupled to the second mass (216) such that the second Cg axis (220) rotates about a second mass axis (223) with selective rotation of the second mass input driver (222) about a second mass input drive axis (223B); the second Cg axis (220) offset a second mass radial distance (224) from the second mass axis (223); the second center of gravity (218) having a selectively variable second displacement angle (225) defined by the inclusive angle between a line (221A) extending between the second Cg axis (220) and the second center of mass (218) and a line (224A) extending between the second Cg axis (220) and the second mass axis (223); and the second mass axis (223) offset a second unit radial distance (215) from the unit center axis (10); wherein the first vibration control mass (116) and the second vibration control mass (216) may be controllable to produce a vibration control force vector (9) having a controllable magnitude about the unit center axis (10).

The first vibration control mass (116) and the second vibration control mass (216) may be controllable to produce a linear vibration control force vector (9). The first vibration control mass (116) and the second vibration control mass (216) may be controllable to produce a linear vibration control force vector (9) having a controllable operational magnitude (FIG. 11). The first Cg axis (120), the second Cg axis (220), the first mass axis (123) and the second mass axis (223) may be substantially parallel, and the first Cg axis (120) may rotate about the first mass axis (123) and the second Cg axis (220) may rotate about the second mass axis (223) in opposite rotational directions. The first center of mass (118) may rotate about the first Cg axis (120) and the second center of mass (218) may rotate about the second Cg axis (220) in opposite rotational directions. The first Cg axis (120) may rotate about the first mass axis (123) and the first center of mass (118) may rotate about the first Cg axis (120) in opposite rotational directions. The first displacement angle (125) and the second displacement angle (225) may be synchronized to be substantially equal. The first Cg input drive axis (123A) of the first Cg input driver (119) and the first mass input drive axis (123B) of the first mass input driver (122) may be coincident with the first mass axis (123).

At a first displacement angle of zero degrees, the first center of mass (118) may be coincident to the first mass axis (123).

The vibration suppression system may comprise a mass motor (12) having a mass rotor (14) driven to rotate about a mass rotor axis (15); a Cg motor (20) having a Cg rotor (22) driven to rotate about a Cg rotor axis (23); a first motor rotational coupling (17) between the mass rotor (14) and the first mass input driver (122) configured such that the first Cg axis (120) rotates about the first mass axis (123) with rotation of the mass rotor (14) about the mass rotor axis (15), whereby a speed of rotation of the vibration control mass (116) about the first mass axis (123) is a function of rotation of the mass rotor (14); a second motor rotational coupling (25) between the Cg rotor (22) and the first Cg input driver (119) configured such that the first center of mass (118) rotates about the first Cg axis (120) with rotation of the Cg rotor (22) about the Cg rotor axis (23), whereby the first displacement angle is a function of the Cg rotor (22); and a controller (80) for receiving input signals and outputting command signals to the mass motor (12) and the Cg motor (20) to control the speed of rotation of the first vibration control mass (116) and the first displacement angle (125) of the first vibration control mass (116).

The controller (80) may control the first displacement angle (125) of the first vibration control mass (116) such that the first displacement angle (125) varies over an operation cycle (FIG. 8B). The first displacement angle (125) may vary from 0 degrees to 180 degrees during the operational cycle (FIG. 8B). The controller (80) may selectively control the mass motor (12) and the Cg motor (20) such that the first Cg axis (120) rotates about the first mass axis (123) at a mass rotational speed and the first center of mass (118) rotates about the first Cg axis (120) at a Cg rotational speed that is substantially twice the first rotational speed. The second Cg axis (220) may rotate about the second mass axis (223) at the mass rotational speed and the second center of mass (218) may rotate about the second Cg axis (220) at the Cg rotational speed. The controller (80) may selectively control the mass motor (12) and the Cg motor (20) such that the first Cg axis (120) rotates about the first mass axis (123) at a first mass rotational speed and the second Cg axis (220) rotates about the second mass axis (223) at a second mass rotational speed that is substantially the same as the first mass rotational speed, and the first center of mass (118) rotates about the first Cg axis (120) at a first Cg rotational speed and the second center of mass (218) rotates about the second Cg axis (220) at a second Cg rotational speed that is substantially the same as the first Cg rotational speed.

The first motor rotational coupling (17A) between the mass rotor (14) and the first mass input driver (122) may comprise a first mass coupling speed ratio and the first motor rotational coupling (17B) between the mass rotor (14) and the second mass input driver (222) may comprise a second mass coupling speed ratio that is substantially the same as the first mass coupling speed ratio. The second motor rotational coupling (25A) between the Cg rotor (22) and the first Cg input driver (119) may comprise a first Cg coupling speed ratio and the second motor rotational coupling (25B) between the Cg rotor (22) and the second Cg input driver (219) may comprise a second Cg coupling speed ratio that is substantially the same as the first Cg coupling speed ratio. The controller (80) may vary the first displacement angle (125) by maintaining a speed differential between the Cg motor (20) and the mass motor (12) at a constant that is a function of a differential between the mass coupling speed ratio and the Cg coupling speed ratio. The controller (80) may vary an operational magnitude (FIG. 11) of the linear vibration control force vector (9) by varying a speed differential between a speed of rotation of the first Cg axis (120) about the first mass axis (123) and a speed of rotation of the first center of mass (118) about the first Cg axis (120) from substantially 2 to 1.

The vibration suppression system may comprise a first support linkage (117) rotationally coupled between the first mass input driver (122) and the first vibration control mass (116) such that the first support linkage (117) and the first Cg axis (120) rotate about the first mass axis (123) with rotation of the first mass input driver (122) about the first mass input drive axis (123B); and a second support linkage (217) rotationally coupled between the second mass input driver (222) and the second vibration control mass (216) such that the second support linkage (217) and the second Cg axis (220) rotate about the second mass axis (223) with rotation of the second mass input driver (222) about the second mass input drive axis (223B). The first support linkage (117) may have a first support center of mass and the first support center of mass may be substantially coincident with the first mass axis (123). The vibration suppression system may comprise a unit frame (11) and a stator (21) of the Cg motor (20) may be mounted to the unit frame and a stator (13) of the mass motor (12) may be mounted to the unit frame (11). The Cg rotor axis and the mass rotor axis may be offset from the unit axis by an equal distance and may be not coincident.

The vibration suppression system may comprise a rotary-wing aircraft (30) having a plurality of rotor blades (31) mounted to a rotor hub (32) and driven about a central axis of rotation (10) at an operational speed and in a rotational direction (34) relative to a non-rotating body (18) of the aircraft (30); a unit frame (11) mounted to the rotor hub (32) and operationally configured to rotate with the rotor hub (32) about the central axis (10); a vibration control frame (35) rotationally supported by the unit frame (11) and operationally configured to rotate relative to the rotor hub (32) about the central axis (10) in a rotational direction (36) opposite to the operational rotational direction (34) of the rotor hub (32); a control frame motor (43) configured to rotate the vibration control frame (35) about the central axis (10) in the rotational direction (36) opposite to the operational rotational direction (34) of the rotor hub (32); the unit frame (11) supporting the control frame motor (43), the Cg motor (20) and the mass motor (12); and the vibration control frame (35) supporting in rotational engagement the first mass input driver (122), the first Cg input driver (119), the second mass input driver (222), and the second Cg input driver (219).

The vibration suppression system may comprise a first support linkage (117) rotationally coupled between the first mass input driver (122) and the first vibration control mass (116) such that the first support linkage (117) and the first Cg axis (120) rotate about the first mass axis (123) with rotation of the first mass input driver (122) about the first mass input drive axis (123B); and a second support linkage (217) rotationally coupled between the second mass input driver (222) and the second vibration control mass (216) such that the second support linkage (217) and the second Cg axis (220) rotate about the second mass axis (223) with rotation of the second mass input driver (222) about the second mass input drive axis (223B). The vibration suppression system may comprise a first linkage rotational coupling (128) rotationally supported by the first support linkage (117) and rotationally coupled between the first Cg input driver (119) and the first vibration control mass (116) and a second linkage rotational coupling (228) rotationally supported by the second support linkage (217) and rotationally coupled between the second Cg input driver (219) and the second vibration control mass (216). The first linkage rotational coupling (128) may comprise a first linkage first gear (66) and a first linkage second gear (67) and the second linkage rotational coupling (228) may comprise a second linkage first gear (76) and a second linkage second gear (77). The first linkage second gear (67) of the first linkage rotational coupling (128) may comprise a shaft (138) connected to an arm (139) fixed to the first vibration control mass (116) and the second linkage second gear (77) of the second linkage rotational coupling (228) may comprise a shaft (238) connected to an arm (239) fixed to the second vibration control mass (216). The vibration suppression system may comprise bearings (150, 151, 152) between the first support linkage (117) and the first linkage rotational coupling (128) such that the first linkage first gear (66) and the first linkage second gear (67) can rotate relative to the first support linkage (117), and bearings (150, 151, 152) between the second support linkage (217) and the second linkage rotational coupling (228) such that the second linkage first gear (76) and the second linkage second gear (77) can rotate relative to the second support linkage (217). The vibration control frame (35) may support in rotational engagement the first support linkage (117) such that the first support linkage (117) rotates about the first mass axis (123) relative to the vibration control frame (35), and the vibration control frame (35) may support in rotational engagement the second support linkage (217) such that the second support linkage (217) rotates about the second mass axis (223) relative to the vibration control frame (35). The vibration suppression system may comprise bearings (155A, 155B) between the first support linkage (117) and the vibration control frame (35) such that the first support linkage (117) can rotate relative to the vibration control frame (35) and bearings (255A, 255B) between the second support linkage (217) and the vibration control frame (35) such that the second support linkage (217) can rotate relative to the vibration control frame (35).

The first motor rotational coupling (17A) between the mass rotor (14) and the first mass input driver (122) may comprise planetary gears (60) rotationally supported by the unit frame (11) and in meshed engagement with an output shaft (16) rotationally coupled to the mass rotor (14); a ring gear (62) rotationally supported by the unit frame (11) or the vibration control frame (35) and in meshed engagement with the planetary gears (60); a first mass gear (63) in meshed engagement with the ring gear (62); and a second mass gear (64) in meshed engagement with the first mass gear (63) and the first mass input driver (122), respectively. The first motor rotational coupling (17B) between the mass rotor (14) and the second mass input driver (222) may comprise a third mass gear (65) in meshed engagement with the ring gear (62) and the second mass input driver (222), respectively. The geared output shaft (16) rotationally coupled to the mass rotor (14), the first mass gear (63), the third mass gear (65), and the first mass input driver (122) may each rotate in a first rotational direction (36) and the ring gear (62), the second mass gear (64) and the second mass input driver (222) may rotate in a second rotational direction (34) opposite to the first rotational direction (36). The vibration suppression system may comprise bearings (156) between the planetary gears (60) and the unit frame (11) such that the planetary gears (60) can rotate relative to the unit frame (11), and bearings (157, 158, 159) between the first mass gear (63), the second mass gear (64) and the third mass gear (65) and the vibration control frame (35) such that the first mass gear (63), the second mass gear (64) and the third mass gear (65) can rotate relative to the vibration control frame (35).

The second motor rotational coupling (25) between the Cg rotor (22) and the second Cg input driver (219) may comprise a dual ring gear (70) rotationally supported by the unit frame (11) and configured to rotate about the unit center axis (10) relative to the unit frame (11), the dual ring gear may have a first ring gear (70A) and a second ring gear (70B); the first ring gear (70A) may be in meshed engagement with an output shaft (24) rotationally coupled to the Cg rotor (22); the second ring gear (70B) may be in meshed engagement with a first Cg mass gear (73); and a second Cg gear (74) may be in meshed engagement with the first Cg gear (73) and the second Cg input driver (219), respectively. The second motor rotational coupling (25) between the Cg rotor (22) and the first Cg input driver (119) may comprise a third Cg gear (75) in meshed engagement with the second ring gear (70B) of the dual ring gear (70) and the first Cg input driver (119), respectively. The rotor hub (32), the unit frame (11), the geared output shaft (24) rotationally coupled to the Cg rotor (22), the first gear (73), the third gear (75), and the second mass input driver (219) may each rotate in a first rotational direction (34) and the vibration control frame (35), the dual ring gear (70), the second gear (74), and the first Cg input driver (119) may rotate in a second rotational direction (36) opposite to the first rotational direction. The vibration suppression system may comprise bearings (39) between the dual ring gear (70) and the unit frame (11) such that the dual ring gear (70) can rotate relative to the unit frame (11), and bearings (161, 162, 163) between the first Cg gear (73), the second Cg gear (74) and the third Cg gear (75) and the vibration control frame (35) such that first Cg gear (73), the second Cg gear (74) and the third Cg gear (75) can rotate relative to the vibration control frame (35). The vibration suppression system may comprise a bearing (155A, 155B) between the vibration control frame (35) and the first support linkage (117); a bearing (153) between the first support linkage (117) and the first Cg input driver (119); and a bearing (38) between the unit frame (11) and the vibration control frame (35). The vibration suppression system may comprise a rotational coupling (48) between the control frame motor (43) and the vibration control frame (35) comprising a frame gear (49) mounted to the vibration control frame (35) and in meshed engagement with an output shaft (47) rotationally coupled to a rotor (45) of the control frame motor (43).

The vibration suppression system (210) may comprising a unit frame (11) fixed to a structure subject to vibration; a vibration control frame (35) mounted to the unit frame (11) and operationally configured to rotate relative to the unit frame (11) about the unit central axis (10) in a first (34) and a second (36) rotational direction; a control frame motor (43) configured to rotate the vibration control frame (35) about the unit central axis (10) in the first (34) and the second (36) rotational directions; the unit frame (11) supporting the control frame motor (43), the Cg motor (20) and the mass motor (12); and the vibration control frame (35) supporting in rotational engagement the first mass input driver (122), the first Cg input driver (119), the second mass input driver (222), and the second Cg input driver (219). The controller (80) may receive the input signals and may output command signals to the control frame motor (43) to control a direction of the vibration control force vector (9) about the unit center axis (10).

The first vibration control mass (116) and the second vibration control mass (216) may be controllable to produce a circular vibration control force vector (9) having a controllable operational magnitude. The controller may control the first displacement angle (125) of the first vibration control mass (116) such that the first displacement angle (125) is constant over an operation cycle to produce a vibration control force vector (9) having a desired constant magnitude about the unit center axis (10) over the operational cycle. The first Cg radial distance (121) may be substantially equal to the first mass radial distance (124). A distance (125A) between the first center of gravity (118) and the first mass axis (123) may be selectively variable. The vibration suppression system may comprise a sensor for measuring vibration (81) and/or rotor shaft speed (82) and providing input to the controller (80). The mass motor (12) and the Cg motor (2) may each comprise a rotary electric motor. The controller (80) may be supported by and rotate with the unit frame (11).

BRIEF DESCRIPTION OF THE DRAWINGS

FIGS. 14A-141 show the relative positions of the mass units for each of the designated points on the curve shown in FIG. 14.

DETAILED DESCRIPTION OF THE EMBODIMENTS

Figure 1:
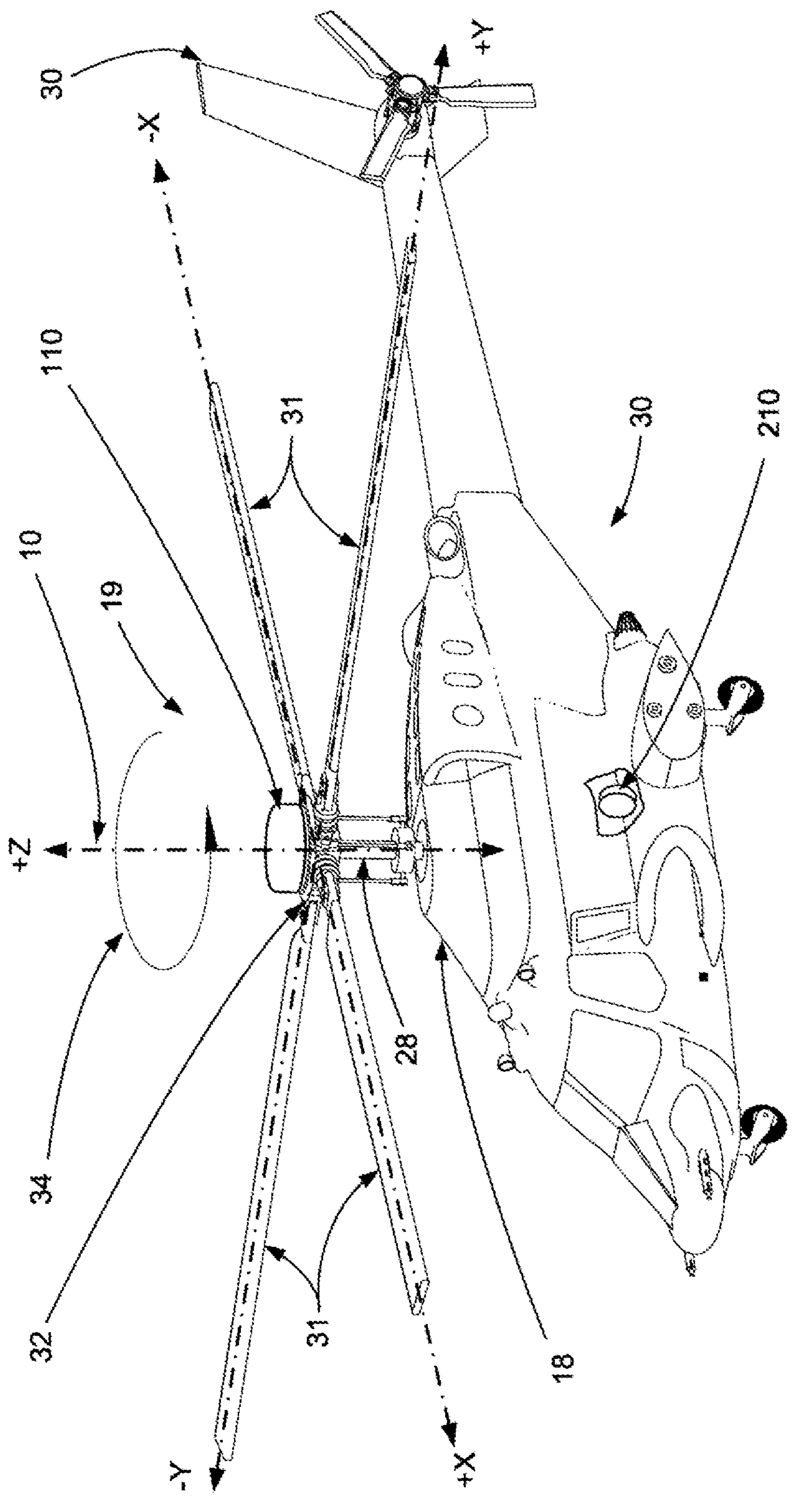
FIG. 1 is a representative perspective view of an embodiment of the improved vibration suppression system on a rotor hub assembly of a rotary wing aircraft.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 is a schematic illustration of helicopter 30 having airframe 18 and main rotor system 19 that is driven about center axis of rotation 10. Main rotor system 19 includes a plurality of rotor blades 31 mounted to rotor hub 32 via rotor blade grips 33. Rotor hub 32 is driven about center axis of rotation 10 by main rotor shaft 28, which is driven through a main rotor gear box by one of more aircraft engines. Main rotor shaft 28 and hub 32 rotate in rotational direction 34 at an operational rotational frequency about center axis of rotation 10. Although a helicopter is shown and described in this embodiment, vibration suppression unit 110 may be used with other types or configurations of rotary-wing aircraft or rotor-craft or in other vibration control applications.

Figure 2:
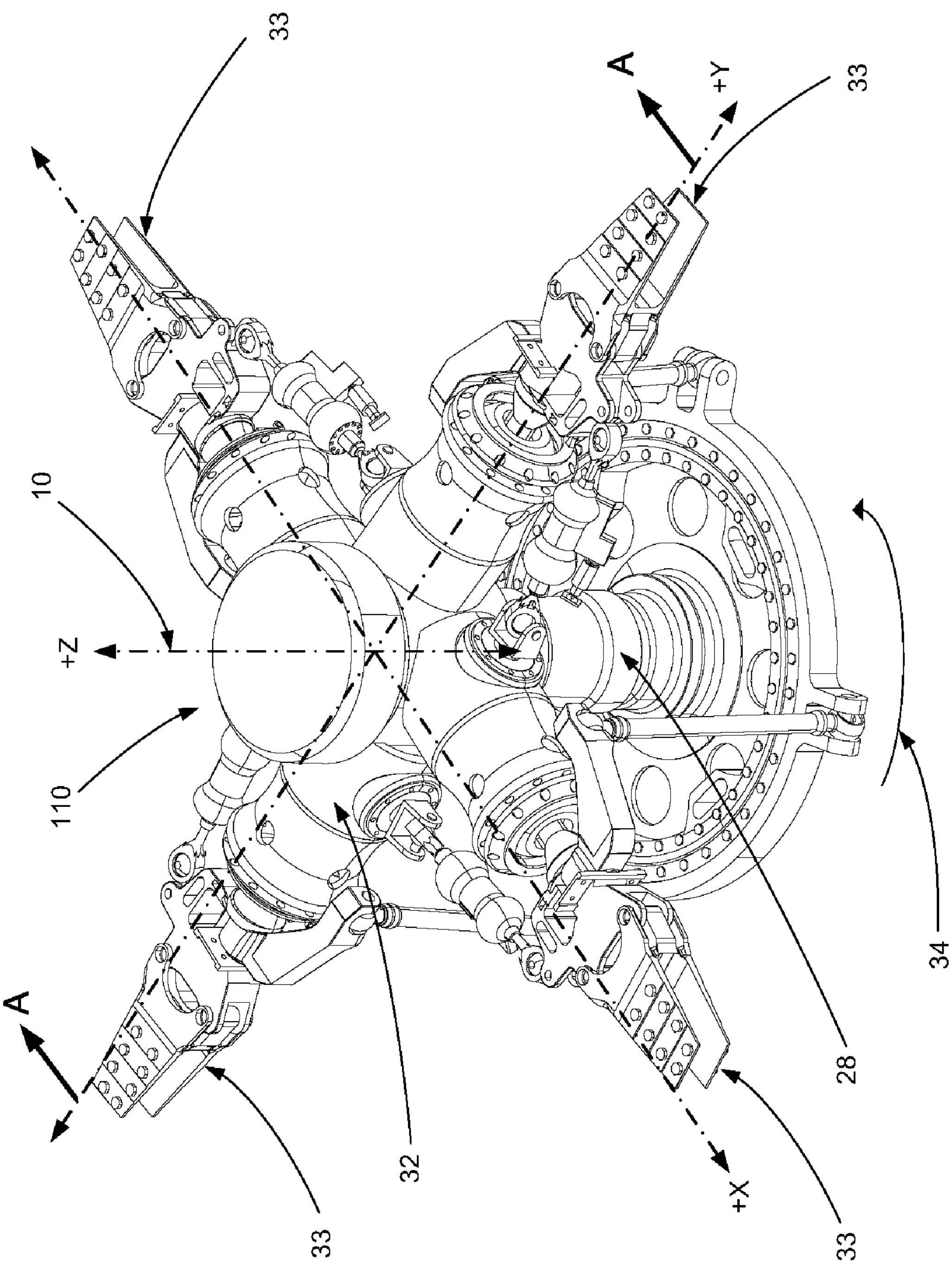
FIG. 2 is an enlarged partial view of the rotor hub assembly shown in FIG. 1.
Figure 2A:
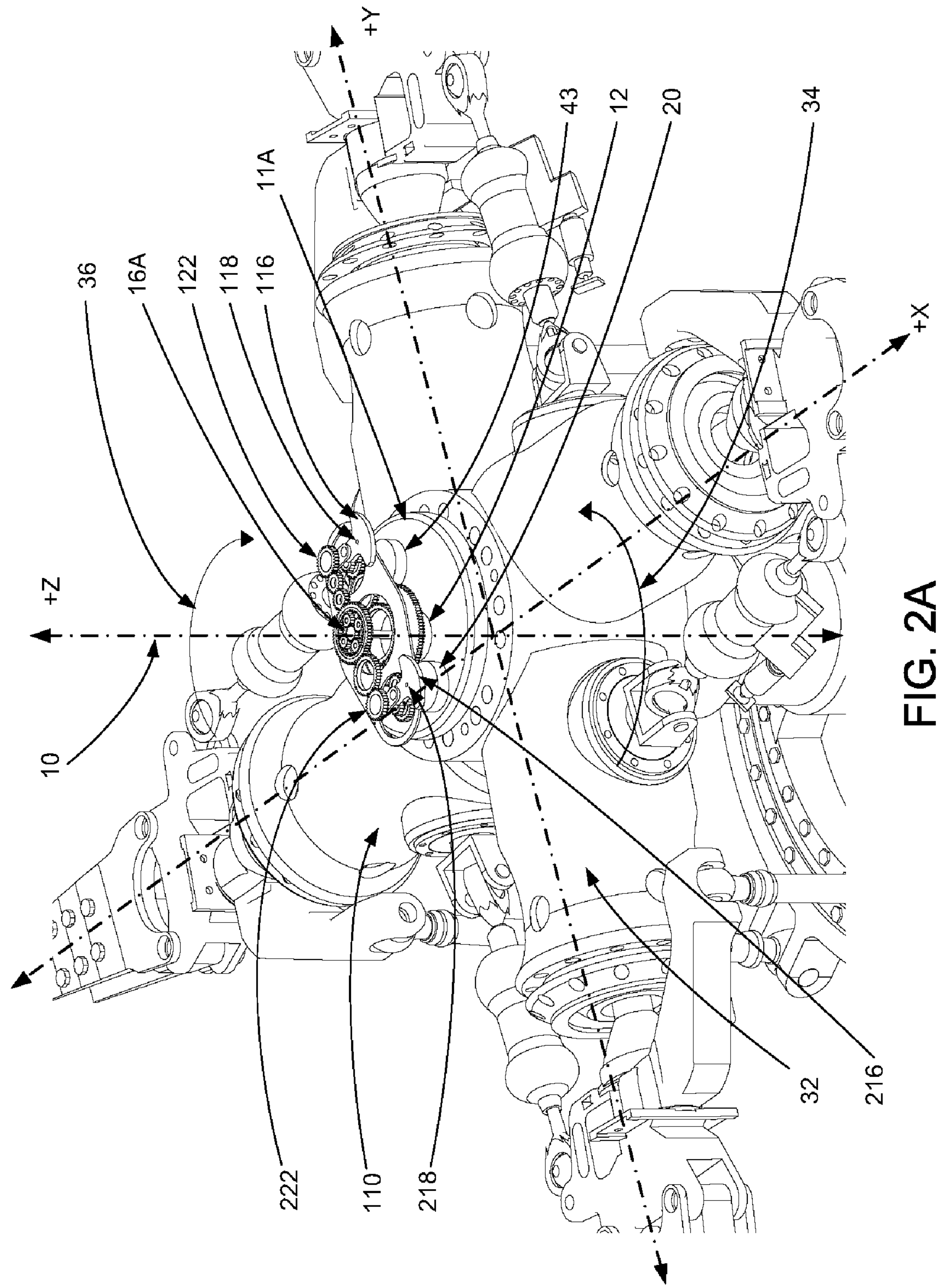
FIG. 2A is a partial cutaway view of the rotor hub assembly shown in FIG. 2.

As shown in FIGS. 1-2A, vibration suppression unit 110 is mounted on top of rotor 32. FIG. 1 provides a frame of reference comprising longitudinal axis x-x aligned with the longitudinal axis of helicopter 30, transverse axis y-y perpendicular to axis x-x, and vertical axis z-z concentric with center axis of rotation 10 of rotor hub 32. While system 110 is shown being mounted above hub 32, as an alternative a vibration suppression unit 210 may be mounted directly to fuselage 18 of helicopter 30. As another alternative, the vibration suppression unit may be mounted below hub 32 and configured such that rotor shaft 28 extends through a center opening in the unit. In this alternative configuration, the axis of rotation of mass motor 12 is moved off-center of axis 10 such that mass motor 12 and the rotational coupling between mass motor 12 and the masses of the unit do not extend into or overlap with the central opening for shaft 28.

Figure 3:
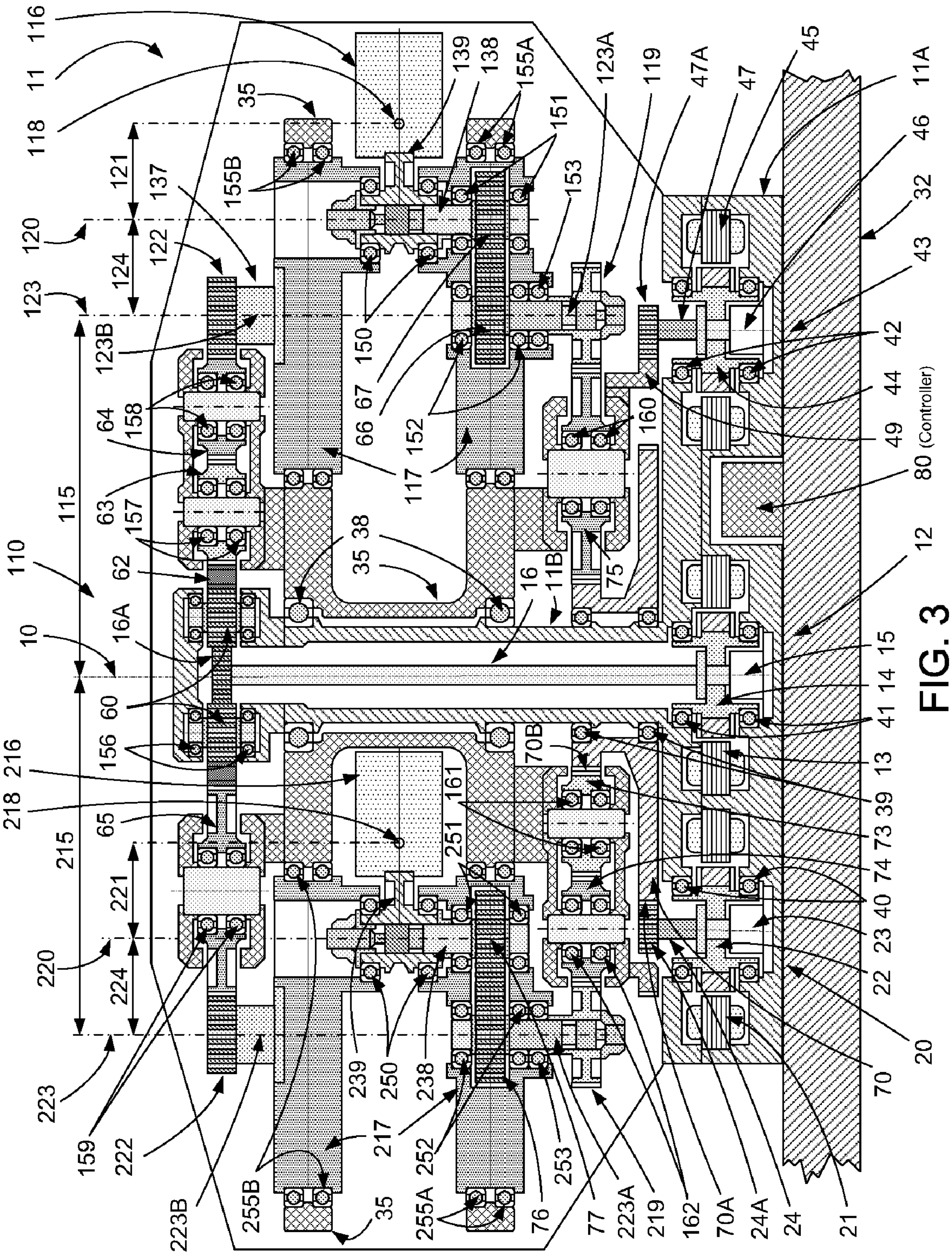
FIG. 3 is a vertical cross-sectional view of the vibration suppression unit shown in FIG. 2, taken generally on line A-A of FIG. 2.
Figure 4:
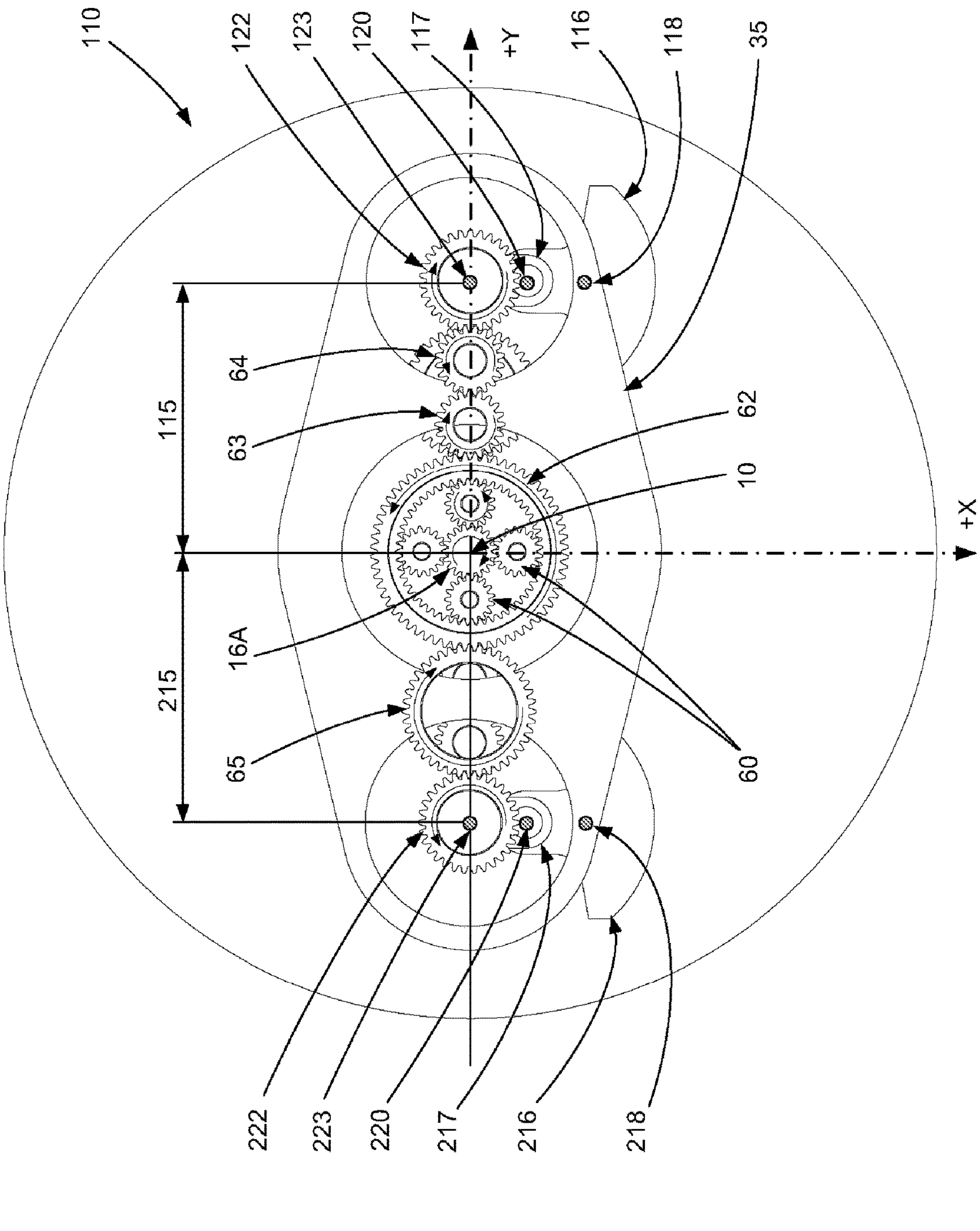
FIG. 4 is top diagram of the vibration suppression unit shown in FIG. 2A.

As shown in FIGS. 1-3, vibration suppression unit 110 is mounted to hub 32 and generally includes mass motor 12 rotationally coupled via drive train 17 to eccentric masses 116 and 216, Cg motor 20 rotationally coupled via drive train 25 to eccentric masses 116 and 216, vibration support frame motor 43 rotationally coupled to vibration support frame 35 via drive train 48, and controller 80, all supported within unit housing 11 mounted to hub 32.

Unit housing 11 comprises cylindrical base 11A, orientated coaxially on hub 32 about center axis 10, inner cylindrical support tube 11B extending upward from base 11A and orientated coaxially with hub 32 about center axis 10, and outer housing 11C covering assembly 110.

As shown in FIG. 3, housing base 11A supports mass motor 12, Cg motor 20 and support frame motor 43. Motor 20 comprises stator 21 fixed to base 11A and rotor 22 that rotates about an axis 23 relative to stator 21. Upper and lower bearings 40 act between rotor 22 and housing base 11A such that rotor 22 is rotatable about axis 23 relative to housing base 11A. In this embodiment, motor 20 is a rotary brushless permanent magnet electric motor with rotor 22 having permanent magnets and stator 21 having coils energized to drive rotor 22 about axis 23. Motor 12 comprises stator 13 fixed to base 11A and rotor 14 that rotates about an axis 15 relative to stator 13. Upper and lower bearings 41 act between rotor 14 and housing base 11A such that rotor 14 is rotatable about axis 15 relative to housing base 11A. In this embodiment, motor 12 is a rotary brushless permanent magnet electric motor with rotor 14 having permanent magnets and stator 13 having coils energized to drive rotor 14 about axis 15. In this embodiment, axis 15 is coaxial to central axis 10. Alternatively, however, motor 12 may be positioned off-axis from center axis 10 such that axis 15 is offset a radial distance from central axis 10. Motor 43 comprises stator 44 fixed to base 11A and rotor 45 that rotates about an axis 46 relative to stator 44. Upper and lower bearings 42 act between rotor 44 and housing base 11A such that rotor 44 is rotatable about axis 46 relative to housing base 11A. In this embodiment, motor 43 is a rotary brushless permanent magnet electric motor with rotor 45 having permanent magnets and stator 44 having coils energized to drive rotor 45 about axis 46. Motor axis 15, 23 and 46 are parallel to each other but are not coaxial and none of rotors 14, 22 and 45 are concentric with each other.

As shown in FIG. 3, vibration control frame 35 is rotationally supported by unit housing 11. Upper and lower bearings 38 act between the outer cylindrical surface of support tube 11B of housing 11 fixed to hub 23 and the opposed inner cylindrical surface of control frame 35. Control frame 35 is configured to rotate about center axis 10 on upper and lower bearings 38. Thus, control frame 35 is mounted on hub 32 of helicopter rotor system 19 by rolling bearings 38 such that control frame 35 is rotatable relative to housing 11 and rotor hub 32. Control frame 35 is coaxial with center axis of rotation 10 of rotor hub 32 of helicopter rotor system 19.

As shown in FIGS. 3, 9, 9A, 10 and 10A, shaft 47 extends from rotor 44 and ends at output gear 47A. Gear 47A is in meshed engagement with the outwardly facing teeth of ring gear 49 fixed to control frame 35 to form coupling 48. Ring gear 49 is a ring-shaped annular structure orientated about center axis 10. Ring gear 49 and control frame 35 rotate about center axis 10 relative to housing 11 with rotation of rotor 44 and gear 47A about motor axis 46. Control frame 35 rotates about axis 10 opposite to the direction of rotation of rotor 44 and gear 47A about axis 46. However, other gearing configurations may be used as alternatives to drive control frame 35 about axis 10 relative to hub 32. Control frame motor 43 is configured to rotate control frame 35 about center axis 10 relative to rotor shaft 28 and hub 32 in a rotational direction 36 that is opposite to rotational direction 34 of hub 32 and at an operational frequency or speed of rotation that is substantially the same as the operational frequency or speed of rotation of rotor hub 32 about center axis 10. Thus, rotor 45 is selectively driven about axis 46 in rotational direction 34 to drive rotation of control frame 35 about center axis 10.

Accordingly, while control frame 35 rotates, it does not rotate with hub 32. Rather, control frame 35 is configured to selectively rotate about center axis 10 opposite to the rotation of hub 32, such that vibration control frame 35 is stationary relative to body or airframe 18 of helicopter 30. Since vibration control frame 35 rotates opposite to the rotation of helicopter mast and hub 32 at the same rate, control frame 35 retains masses 116 and 216 in the same reference frame as body 18 of helicopter 30.

As shown in FIG. 3, support linkage 117 is rotationally supported by control frame 35. Upper and lower bearing pairs 155A and 155B act between the outer cylindrical bearing surfaces of control frame 35 and the opposed inner cylindrical bearing surfaces of support linkage 117, respectively. Support linkage 117 is configured to rotate about axis 123 on upper and lower bearing pairs 155A and 155B. Thus, support linkage 117 is mounted on control frame 35 by rolling bearings 155A and 155B such that support linkage 117 is rotatable relative to control frame 35. Support linkage 117 has a center of mass or gravity that is substantially coincident with axis 123 about which it rotates.

As shown in FIG. 3, support linkage 217 is also rotationally supported by control frame 35. Upper and lower bearing pairs 255A and 255B act between the outer cylindrical bearing surfaces of control frame 35 and the opposed inner cylindrical bearing surfaces of support linkage 217, respectively. Support linkage 217 is configured to rotate about axis 223 on upper and lower bearing pairs 255A and 255B. Thus, support linkage 217 is mounted on control frame 35 by rolling bearings 255A and 255B such that support linkage 217 is rotatable relative to control frame 35. Support linkage 217 has a center of that is substantially coincident with axis 223 about which it rotates.

Mass 116 is rotationally supported by support linkage 117. Center of mass 118 of mass 116 is selectively driven about axis 120 via input drive gear 119, which is also rotationally supported by support linkage 117. Drive gear 119 rotates about axis 123A, which in this embodiment is coaxial with axis 123. However, gear 119 could be configured to rotate about an axis that is not coaxial to axis 123. Coupling 128 rotationally links gear 119 to mass 116. Rotational coupling 128 is supported by and rotates with linkage 117, and comprises gear 66, gear 67, shaft 138 and arm 139. Gear 66 is fixed above gear 119 on the same gear shaft such that gear 66 rotates about axis 123 with rotation of drive gear 119 about axis 123. Gear 66 is in meshed engagement with gear 67 such that gear 67 rotates about axis 120 in the opposite direction to the rotation of gears 119 and 66 about axis 123A. Gear 67 includes shaft 138 orientated about axis 120 such that shaft 138 rotates about axis 120 with rotation of gear 67 about axis 120. Shaft 138 is in turn fixed to arm 139 of mass 116 such that center of mass 118 rotates about axis 120 with rotation of shaft 138 about axis 120. Thus, rotation of drive gear 119 about axis 123A causes rotation of center of mass 118 about axis 120.

Upper and lower bearings 150 act between linkage 117 and arm 139 of mass 116 and upper and lower bearings 151 act between linkage 117 and gear shaft 138 such that mass 116 with arm 139, gear shaft 138 and gear 67 are rotatable about axis 120 relative to linkage 117. Similarly, upper and lower bearings 152 and bearing 153 act between linkage 117 and the shaft of gears 66 and 119, respectively, such that gears 66 and 119 are rotatable about axis 123A relative to linkage 117.

Mass 216 is rotationally supported by support linkage 217. Center of mass 218 of mass 216 is selectively driven about axis 220 via input drive gear 219, which is also rotationally supported by support linkage 217. Drive gear 219 rotates about axis 223A, which in this embodiment is coaxial with axis 223. However, gear 219 could be configured to rotate about an axis that is not coaxial to axis 223. Coupling 228 rotationally links gear 219 to mass 216. Rotational coupling 228 is supported by and rotates with linkage 217, and comprises gear 76, gear 77, shaft 238 and arm 239. Gear 76 is fixed above gear 219 on the same gear shaft such that gear 76 rotates about axis 223 with rotation of drive gear 219 about axis 223. Gear 76 is in meshed engagement with gear 77 such that gear 77 rotates about axis 220 in the opposite direction to the rotation of gears 219 and 76 about axis 223A. Gear 77 includes shaft 238 orientated about axis 220 such that shaft 238 rotates about axis 220 with rotation of gear 77 about axis 220. Shaft 238 is in turn fixed to arm 239 of mass 216 such that center of mass 218 rotates about axis 220 with rotation of shaft 238 about axis 220. Thus, rotation of drive gear 219 about axis 223A causes rotation of center of mass 218 about axis 220.

Upper and lower bearings 250 act between linkage 217 and arm 239 of mass 216 and upper and lower bearings 251 act between linkage 217 and gear shaft 238 such that mass 216 with arm 239, gear shaft 238 and gear 77 are rotatable about axis 220 relative to linkage 217. Similarly, upper and lower bearings 252 and bearing 253 act between linkage 217 and the shaft of gears 76 and 219, respectively, such that gears 76 and 219 are rotatable about axis 223A relative to linkage 217.

Support linkage 117 and Cg axis 120 are selectively driven about mass axis 123 via mass input drive gear 122. Drive gear 122 includes shaft 137, which is in turn fixed to support linkage 117. Drive gear 122 rotates about axis 123B, which in this embodiment is coaxial with axis 123. However, gear 122 could be configured to rotate about an axis that is not coaxial to axis 123. Shaft 137 rotationally links gear 122 to support linkage 117 such that support linkage 117 rotates in bearings 155A and 155B about axis 123 relative to control frame 35 with rotation of drive gear 122 about axis 123B. Cg axis 120 thereby rotates about axis 123 with rotation of gear 122 and support linkage 117 about axis 123B, and mass 116 thereby rotates about axis 123 with rotation of gear 122 and support linkage 117 about axis 123B. Thus, rotation of Cg input drive gear 122 about axis 123B causes rotation of Cg axis 120 about axis 123.

Figure 8:
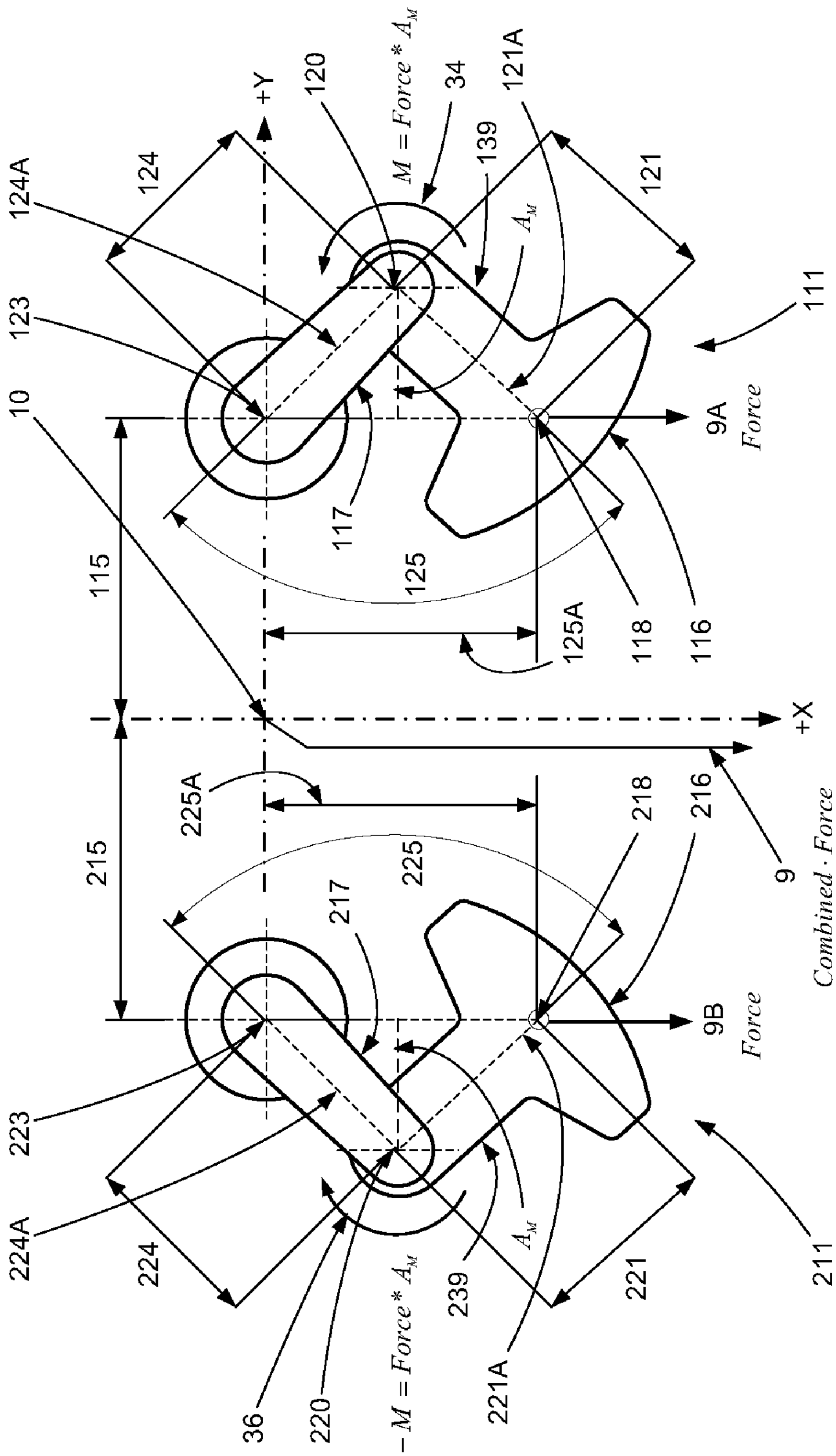
FIG. 8 is a diagram of the operation forces of the two mass units shown in FIG. 4.
Figure 8A:
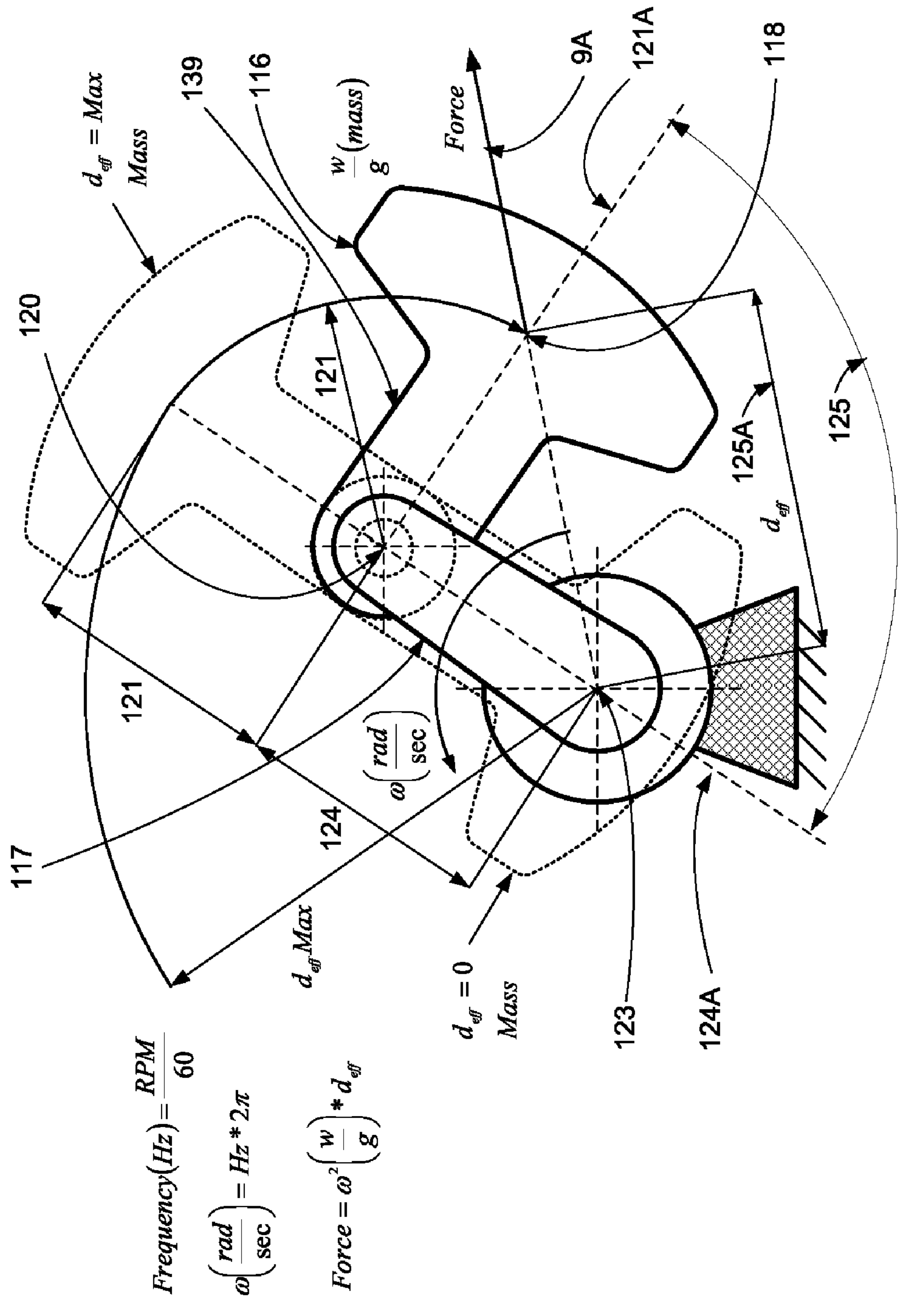
FIG. 8A is a diagram of the operation forces of a single mass unit shown in FIG. 8.

Drive gears 119 and 122 drive mass unit 111 and drive gears 219 and 222 drive mass unit 211, with drive gears 119 and 219 always being rotationally synchronized and drive gears 122 and 222 always being rotationally synchronized. As shown in FIGS. 8 and 8A, first mass unit 111 generally comprises linkage 117, rotatable about axis 123, and mass 116, connected to linkage 117 via mass arm 139 at pivot axis 120 such that mass 116 may be rotated about axis 120 relative to linkage 117. Mass 116 is an unbalanced or eccentric mass having center of gravity 118 offset or separated a radial distance 121 from pivot axis 120. Link 117 extends from rotational axis 123 to pivot axis 120 such that axis 120 is offset or separated a radial distance 124 from axis 123. Input drive gear 119 drives rotation of center of mass 118 about axis 120 and input drive gear 122 drives rotation of linkage 117 about axis 123. Thus, center of mass 118 of mass 116 may be selectively driven to rotate about both axis 120 and axis 123 at the same time.

Accordingly, input drive gear 119 is rotationally coupled to mass 116 such that center of mass 118 rotates about axis 120 with selective rotation of input drive gear 119 about axis 123A. Center of mass 118 is offset by arm 139 a radial distance 121 from axis 120. Mass input drive gear 122 is also rotationally coupled to mass 116 such that axis 120 rotates about axis 123 with selective rotation of input drive gear 122 about drive axis 123B. Axis 120 is offset by linkage 117 a radial distance 124 from axis 123. Thus, center of gravity 118 of mass 116 has a selectively variable displacement angle 125 defined by the inclusive angle between a phantom or imaginary line 121A extending between axis 120 and center of mass 118 and a phantom or imaginary line 124A extending between axis 120 and axis 123. Axis 123 is in turn offset a unit radial distance 115 from unit 110 center axis 10.

As shown in FIG. 8, second mass unit 211 generally comprises linkage 217, rotatable about axis 223, and mass 216, connected to linkage 217 at pivot axis 220 such that mass 216 may be rotated about axis 220 relative to linkage 217. Mass 216 is an unbalanced or eccentric mass having center of gravity 218 offset or separated a radial distance 221 from pivot axis 220. Link 217 extends from rotational axis 223 to pivot axis 220 such that axis 220 is offset or separated a radial distance 224 from axis 223. Input drive gear 219 drives rotation of center of mass 218 about axis 220 and input drive gear 222 drives rotation of linkage 217 about axis 223. Thus, center of mass 218 of mass 216 may be selectively driven to rotate about both axis 220 and axis 223 at the same time.

Accordingly, input drive gear 219 is rotationally coupled to mass 216 such that center of mass 218 rotates about axis 220 with selective rotation of input drive gear 219 about axis 223A. Center of mass 218 is offset by arm 239 a radial distance 221 from axis 220. Mass input drive gear 222 is also rotationally coupled to mass 216 such that axis 220 rotates about axis 223 with selective rotation of input drive gear 222 about drive axis 223B. Axis 220 is offset by linkage 217 a radial distance 224 from axis 223. Thus, center of gravity 218 of mass 216 has a selectively variable displacement angle 225 defined by the inclusive angle between line 221A extending between axis 220 and center of mass 218 and line 224A extending between axis 220 and axis 223. Axis 223 is in turn offset a unit radial distance 215 from unit 110 center axis 10.

As shown in FIGS. 8 and 8A, mass unit 111 may be controlled via input drive gear 122 to rotate mass 116 about axis 123 at a desired rotational frequency (w), which rotation results in a vibration control force 9A. Furthermore, the magnitude of force 9A may be varied by varying angle 125, which varies distance 125A ($d_{eff}$) of center of mass 118 from its center of rotation 123. Since input drive gear 119 may be rotated to vary angle 125 and distance 125A, the magnitude of force 9B may be varied accordingly. As shown, when angle 125 is 180 degrees, center of mass 118 is furthest away from center of rotation axis 123 and distance 125A ($d_{eff}$) is a maximum. As shown, when angle 125 is zero degrees, center of mass 118 is coincident with or aligned on center of rotation axis 123 and distance 125A ($d_{eff}$) is zero.

As shown in FIG. 8, mass unit 111 is controlled via input drive gear 222 to rotate mass 216 about axis 223 at a desired rotational frequency (ω), which rotation results in a vibration control force 9B. Furthermore, the magnitude of force 9B may be varied by varying angle 225, which varies distance 225A ($d_{eff}$) of center of mass 218 from its center of rotation 223. Since input drive gear 219 may be rotated to vary angle 225 and distance 225A, the magnitude of force 9A may be varied accordingly. As shown, when angle 225 is 180 degrees, center of mass 218 is furthest away from center of rotation axis 223 and distance 225A ($d_{eff}$) is a maximum. As shown, when angle 225 is zero degrees, center of mass 218 is coincident with or aligned on center of rotation axis 223 and distance 225A ($d_{eff}$) is zero.

Forces 9A and 9B from mass units 111 and 211, respectively, sum at central axis 10 to provide combined unit 110 vibration control force 9. Thus, vibration control force 9 is the sum of the individual mass unit vibration control force vectors 9A and 9B of masses 116 and 216, respectively. Controller 80 is configured to direct force vector 9 parallel to the longitudinal axis x-x of fuselage 18.

As shown, axis 120, axis 123, axis 220 and axis 223 are substantially parallel. Axis 120 rotates about axis 123 and axis 220 rotates about axis 223 in opposite rotational directions. As shown in FIG. 8, center of mass 118 rotates about axis 120 and center of mass 218 rotates about axis 220 in opposite rotational directions 34 and 36. Displacement angle 125 of mass unit 111 and displacement angle 225 of mass unit 211 are synchronized to be substantially equal at all times during the operational cycle of mass units 111 and 211. As shown in FIG. 8, mass units 111 and 211 are mirrored about axis x-x and rotate in opposite directions about axis 123 and 223, respectively, such that moment M about axis 120 of mass unit 111 from force 9A acting on moment arm $A_M$ is balanced by the opposed moment M about axis 220 of mass unit 211 from force 9B acting on moment arm $A_M$, which reduces the required motor power to move the subject masses and undesired structural loads.

Figure 8B:
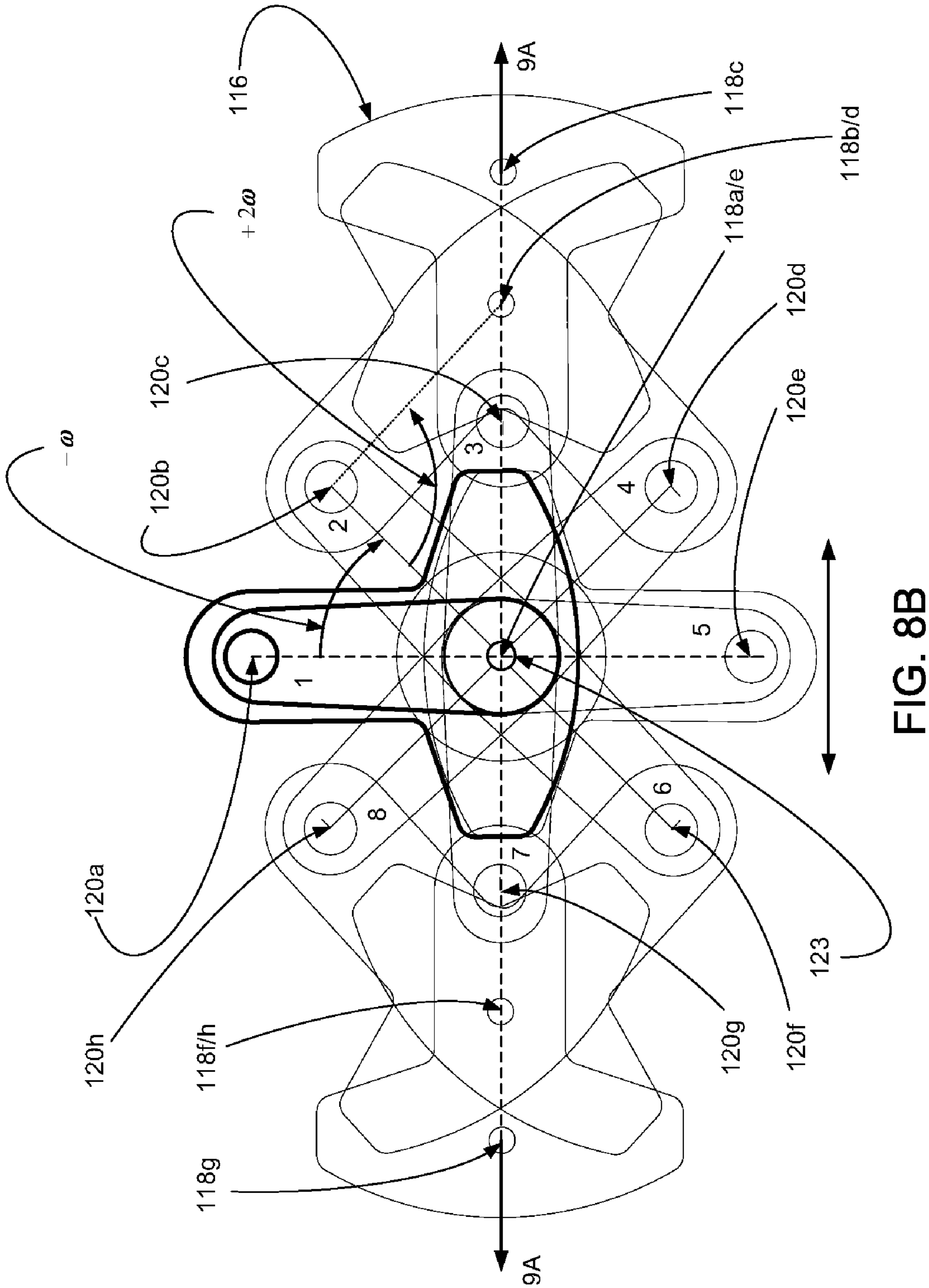
FIG. 8B is a diagram of the operational movement of the two mass units shown in FIG. 8A in a linear operational mode.

As shown in the sequencing of positions from 1 to 8 in FIG. 8B, mass units 111 and 112 may be controlled by controller 80 to provide a linear force 9A and 9B by constantly varying displacements angles 125 and 225, respectively, between zero and 180 degrees during an operational cycle. Thus, as shown in FIG. 8B, by constantly varying angle 125 between 0 and 180 degrees, the motion of center of mass 118 is rectilinear, with the travel of center of mass 18*a*-18*h* being points on a linear axis, and the motion of axis 120 is circular about axis 123, with the travel of pivot axis 120*a*-120*h* being points on a circle of radius 124 about axis 123.

Figure 9:
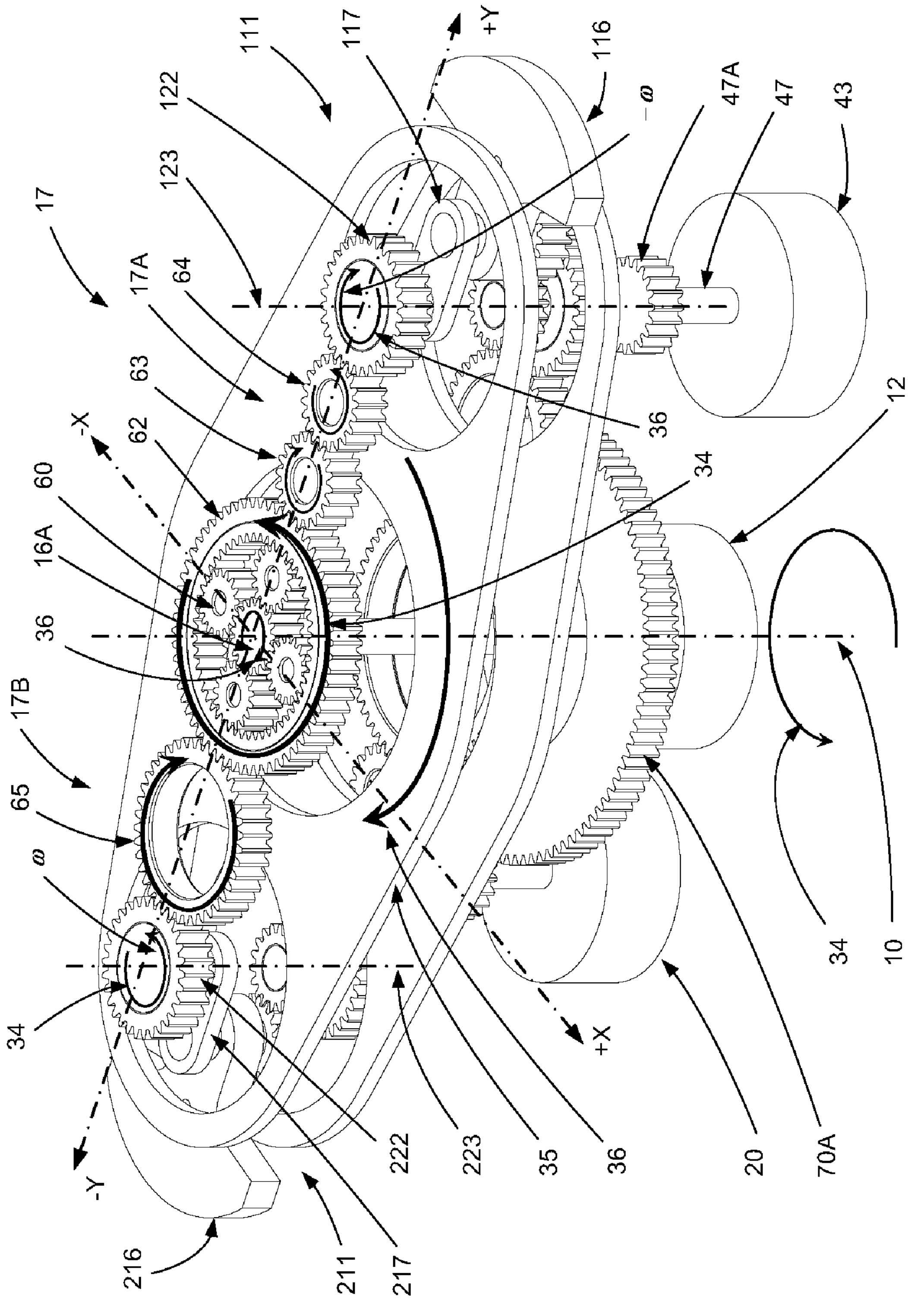
FIG. 9 is a top perspective view of the drive coupling between the motors and the masses shown in FIG. 4.
Figure 9A:
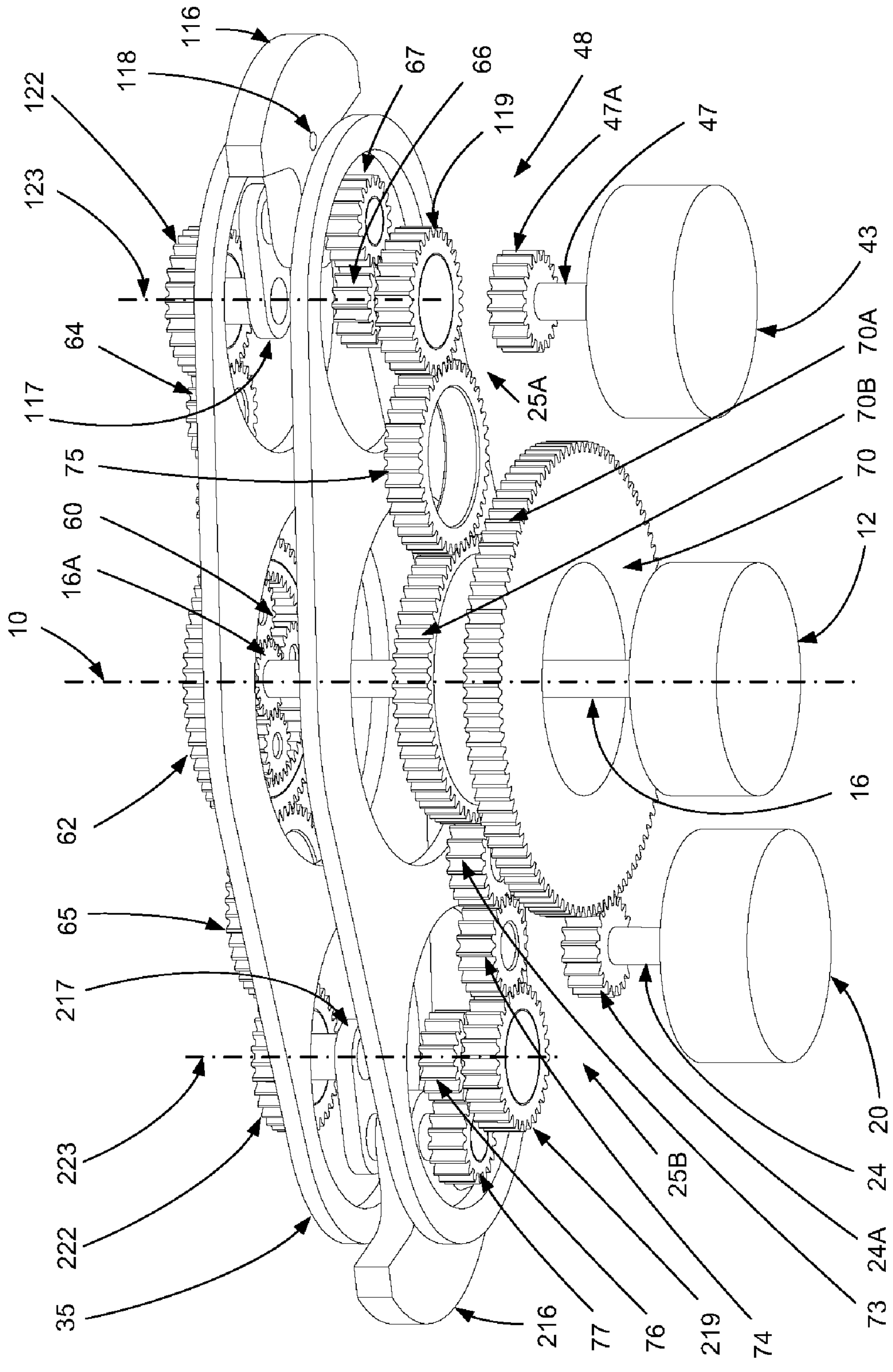
FIG. 9A is a bottom perspective view of the drive coupling between the motors and the masses shown in FIG. 9.
Figure 10:
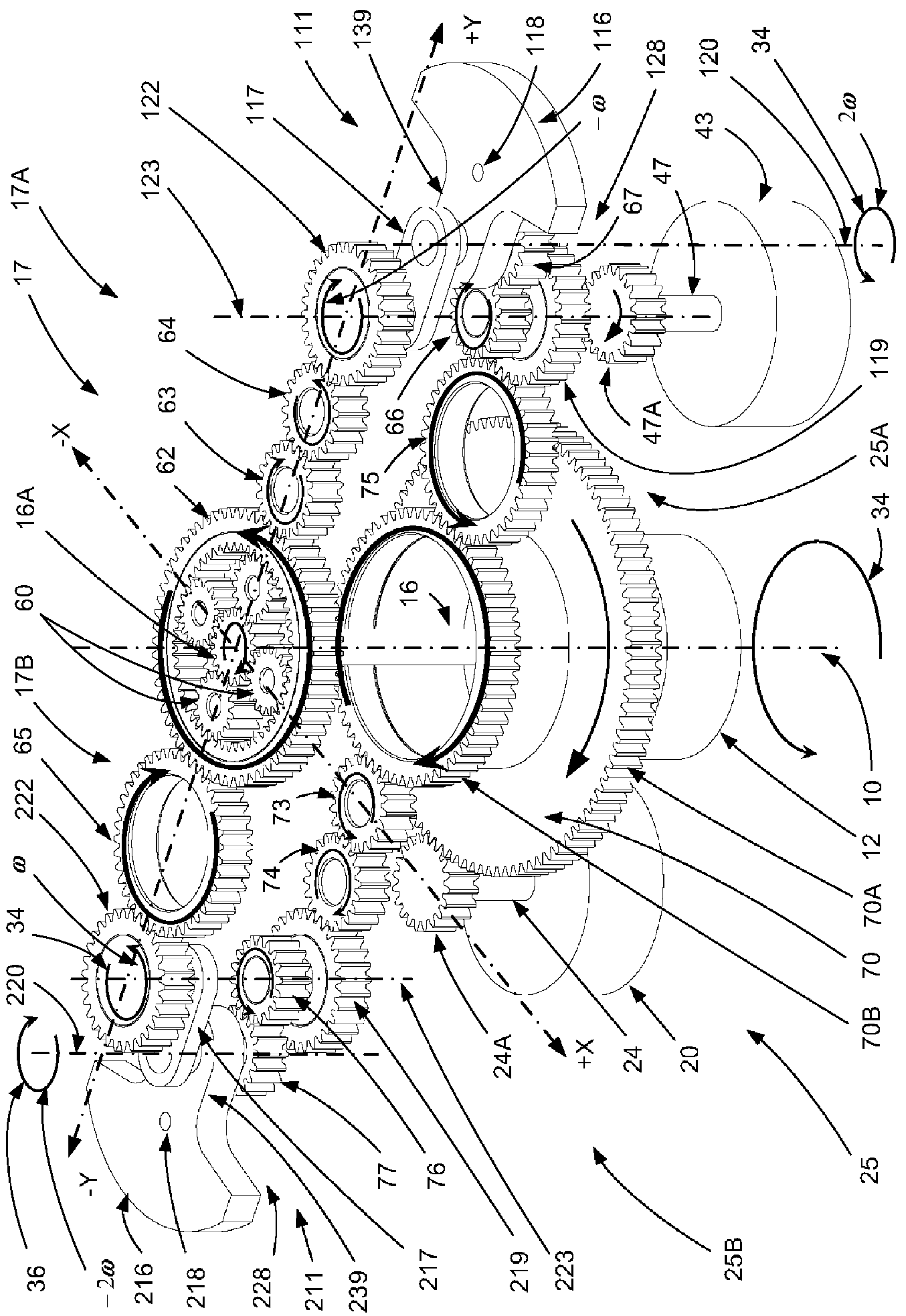
FIG. 10 is a partial top perspective view of the drive coupling between the motors and the masses shown in FIG. 9.
Figure 10A:
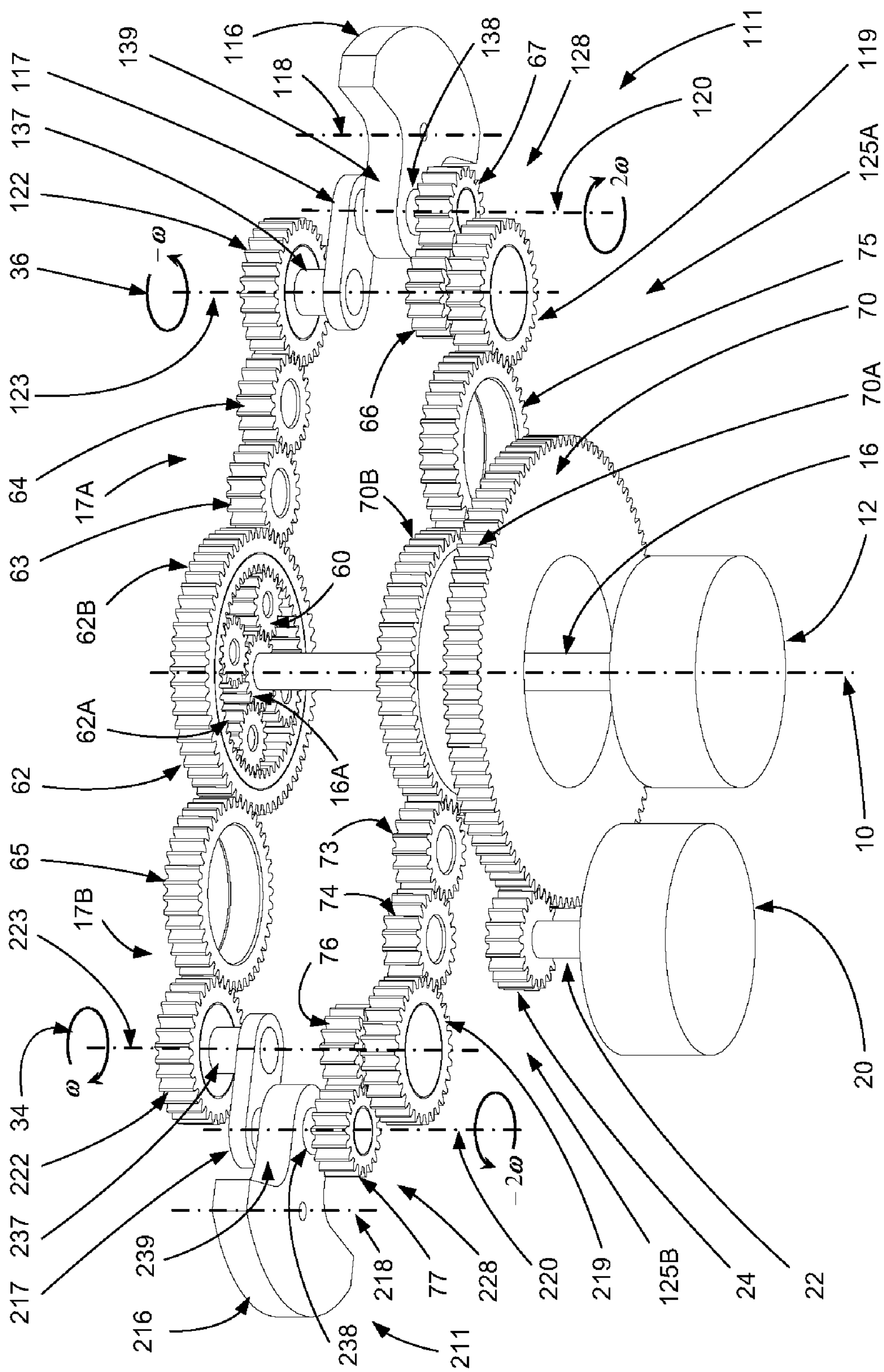
FIG. 10A is a partial bottom perspective view of the drive coupling between the motors and the masses shown in FIG. 9A.

Rotational couplings 17 and 25 provide the desired relative rotational direction and synchronized motion of mass units 111 and 211. As shown in FIGS. 3, 9 and 10, gear train 17 extends from rotor 14 of mass motor 12 to input drive gear 122 of mass 116 and input drive gear 222 of mass 216. Gear train 17 includes motor output gear 16A, planetary gears 60, ring gear 62, and gears 63, 64 and 65.

Output shaft 16 of rotor 14 terminates at gear 16A having externally facing teeth. Gear 16A is in meshed engagement with four planetary gears, severally indicated at 60 and spaced circumferentially about gear 16A, such that planetary gears 60 rotate with rotation of gear 16A. Planetary gears 60 each rotate about an axis that is fixed relative to unit housing 11. Upper and lower bearings 156 act between support tube 11B of housing 11 and planetary gears 60. If rotor 14 and gear 16A are rotating in direction 36 about axis 10, gears 60 rotate in direction 34 about their parallel axes. Planetary gears 60 are in meshed engagement with the interior teeth 62A of ring gear 62 such that ring gear 62 rotates about axis 10 in direction 34 with rotation of planetary gears 60. Ring gear 62 is held in vertical alignment by a washer or other support element on support tube 11B of housing 11. Alternatively, ring gear 62 may be held in vertical alignment by support frame 35.

On side 17A, the external teeth 62B of ring gear 62 are in meshed engagement with gear 63 such that gear 63 rotates in direction 36 with rotation of ring gear 62. Upper and lower bearings 157 act between support frame 35 and gear 63, such that gear 63 is rotatable about its gear axis relative to support frame 35 but its gear axis is fixed relative to support frame 35 and will rotate with rotation of support frame 35. Gear 63 is in meshed engagement with gear 64 such that gear 64 rotates in direction 34 with rotation of gear 63. Upper and lower bearings 158 act between support frame 35 and gear 64, such that gear 64 is rotatable about its gear axis relative to support frame 35 but its gear axis is fixed relative to support frame 35 and will rotate with rotation of support frame 35. Gear 64 is in meshed engagement with input drive gear 122 such that drive gear 122 rotates about axis 123 in direction 36 with rotation of gear 64. On side 17B, the external teeth of ring gear 62 are in meshed engagement with gear 65 such that gear 65 rotates in direction 36 with rotation of ring gear 62. Upper and lower bearings 159 act between support frame 35 and gear 65, such that gear 65 is rotatable about its gear axis relative to support frame 35 but its gear axis is fixed relative to support frame 35 and will rotate with rotation of support frame 35. Gear 65 is in meshed engagement with input drive gear 222 such that drive gear 222 rotates about axis 223 in direction 34 with rotation of gear 65.

Thus, because side 17A has an extra gear compared to side 17B, input drive 122 is configured to rotate about axis 123 in a direction of rotation 36 that is opposite to the direction of rotation 34 of input drive gear 222 about axis 223 with rotation of rotor 14 about axis 15 of motor 12. Accordingly, axis 120 is driven to rotate in direction 36 about axis 123 and axis 220 is driven to rotate in direction 34 about axis 223, which is opposite to rotational direction 36 of rotation of axis 120 about axis 123. However, the gear speed coupling ratio on side 17A between ring gear 62 and input drive gear 122 is substantially the same as the gear speed coupling ratio on side 17B between ring gear 62 and input drive gear 222. Accordingly, input drive gears 122 and 222 and in turn axis 120 and 220 rotate about axis 123 and 223, respectively, at the same speed of rotation and simultaneously with rotation of rotor 14 of motor 12.

As shown in FIGS. 3, 9 and 10, gear train 25 extends from rotor 22 of Cg motor 20 to input drive gear 119 of mass 116 and input drive gear 219 of mass 216. Gear train 25 includes motor output gear 24A, dual tiered ring gear 70, having lower ring gear 70A and upper ring gear 70B, and gears 73, 74 and 75.

Upper and lower bearings 39 act between the outer cylindrical surface of support tube 11B of housing 11 fixed to hub 23 and the opposed inner cylindrical surface of dual ring gear 70. Dual ring gear 70 is configured to rotate about center axis 10 on upper and lower bearings 39. Thus, dual tiered ring gear 70 is mounted on hub 32 of helicopter rotor system 19 by rolling bearings 39 such that dual ring gear 70 is rotatable relative to housing 11 and rotor hub 32 and also rotatable relative to control frame 35. Dual tiered ring gear 70 is coaxial with center axis of rotation 10 of rotor hub 32 of helicopter rotor system 19.

Output shaft 24 of rotor 22 terminates at gear 24A having externally facing teeth. Gear 24A is in meshed engagement with lower ring gear 70A of dual tiered ring gear 70, such that dual tiered ring gear 70, including upper ring gear 70B, rotates about center axis 10 with rotation of gear 24A.

On side 25B, the external teeth of upper ring gear 70B are in meshed engagement with gear 73 such that gear 73 rotates in direction 34 with rotation of upper ring gear 70B. Upper and lower bearings 161 act between support frame 35 and gear 73, such that gear 73 is rotatable about its gear axis relative to support frame 35 but its gear axis is fixed relative to support frame 35 and will rotate with rotation of support frame 35. Gear 73 is in meshed engagement with gear 74 such that gear 74 rotates in direction 36 with rotation of gear 73. Upper and lower bearings 162 act between support frame 35 and gear 74, such that gear 74 is rotatable about its gear axis relative to support frame 35 but its gear axis is fixed relative to support frame 35 and will rotate with rotation of support frame 35. Gear 74 is in meshed engagement with input drive gear 219 such that drive gear 219 rotates about axis 223 in direction 34 with rotation of gear 74. Gear 76 rotates about axis 223 in direction 34 with rotation of drive gear 219. Gear 77, in meshed engagement with gear 76, rotates in direction 36 about axis 220 with rotation of gear 76. Gear 77 includes shaft 238 orientated about axis 220 such that shaft 238 rotates in direction 36 about axis 220 with rotation of gear 77 about axis 220. Shaft 238 is in turn fixed to arm 239 of mass 216 such that center of mass 218 rotates in direction 36 about axis 220 with rotation of shaft 238 about axis 220. Thus, rotation of Cg input drive gear 219 in direction 34 about axis 223A causes rotation of center of mass 218 in direction 36 about axis 220.

On side 25A, the external teeth of upper ring gear 70B are in meshed engagement with gear 75 such that gear 75 rotates in direction 34 with rotation of upper ring gear 70B. Upper and lower bearings 160 act between support frame 35 and gear 75, such that gear 75 is rotatable about its gear axis relative to support frame 35 but its gear axis is fixed relative to support frame 35 and will rotate with rotation of support frame 35. Gear 75 is in meshed engagement with input drive gear 119 such that drive gear 119 rotates about axis 123 in direction 36 with rotation of gear 75. Gear 66 rotates about axis 123 in direction 36 with rotation of drive gear 119. Gear 67, in meshed engagement with gear 66, rotates in direction 34 about axis 120 with rotation of gear 66. Gear 67 includes shaft 138 orientated about axis 120 such that shaft 138 rotates in direction 34 about axis 120 with rotation of gear 67 about axis 120. Shaft 138 is in turn fixed to arm 139 of mass 116 such that center of mass 118 rotates in direction 34 about axis 120 with rotation of shaft 138 about axis 120. Thus, rotation of Cg input drive gear 119 in direction 36 about axis 123A causes rotation of center of mass 118 in direction 34 about axis 120.

Thus, because side 25B has an extra gear compared to side 25A, input drive 222 is configured to rotate about axis 223 in a direction of rotation 36 that is opposite to the direction of rotation 34 of input drive gear 122 about axis 123 with rotation of rotor 22 about axis 23 of motor 20. Accordingly, center of mass 118 is driven to rotate in direction 34 about axis 120 and center of mass 218 is driven to rotate in direction 36 about axis 220, which is opposite to rotational direction 34 of rotation of center of mass 118 about axis 120. However, the gear speed coupling ratio on side 25A between dual tiered ring gear 70 and input drive gear 119 is substantially the same as the gear speed coupling ratio on side 25B between dual tiered ring gear 70 and input drive gear 219. Accordingly, input drive gear 119 and 219 and in turn center of mass 118 and 218 rotate about axis 120 and 220, respectively, at the same speed of rotation and simultaneously with rotation of rotor 22 of motor 20.

While in this embodiment rotational couplings 17, 25, 48, 128 and 228 comprise meshed gear trains, it is contemplated that other geared combinations may be used and/or various alternative rotational couplings may be employed. For example and without limitation, the masses may be mechanically linked to the motors via one or more belts, gears, pulleys, chains, sprockets, and/or any other types of suitable couplers configured to physically or mechanically link the subject elements.

As shown in FIG. 8B and discussed above, mass units 111 and 112 may be controlled to provide a linear force 9A and 9B by constantly varying displacements angles 125 and 225, respectively, between zero and 180 degrees during an operational cycle. In this embodiment, angles 125 and 225 are varied to provide this linear motion and force by controller 80 driving mass motor 12 and Cg motor 20 relative to each other such that the difference in speed, or speed differential, between the speed that motor 12 rotates axis 120 about axis 123 and axis 220 about axis 223 and the speed that motor 20 rotates center of mass 118 about axis 120 and center of mass 218 about axis 220 is maintained at a constant that is a function of the differential between the speed coupling ratios of the subject rotational couplings 17 and 25. Thus, as shown in FIG. 8B, by maintaining the subject speed differential between the speed that motor 12 rotates axis 120 about axis 123 and axis 220 about axis 223 and the speed that motor 20 rotates center of mass 118 about axis 120 and center of mass 218 about axis 220, and thereby constantly varying angle 125 between 0 and 180 degrees, the motion of centers of mass 118 and 218 are linear and the motion of axis 120 about axis 123 and axis 220 about axis 223 are circular.

Figure 11:
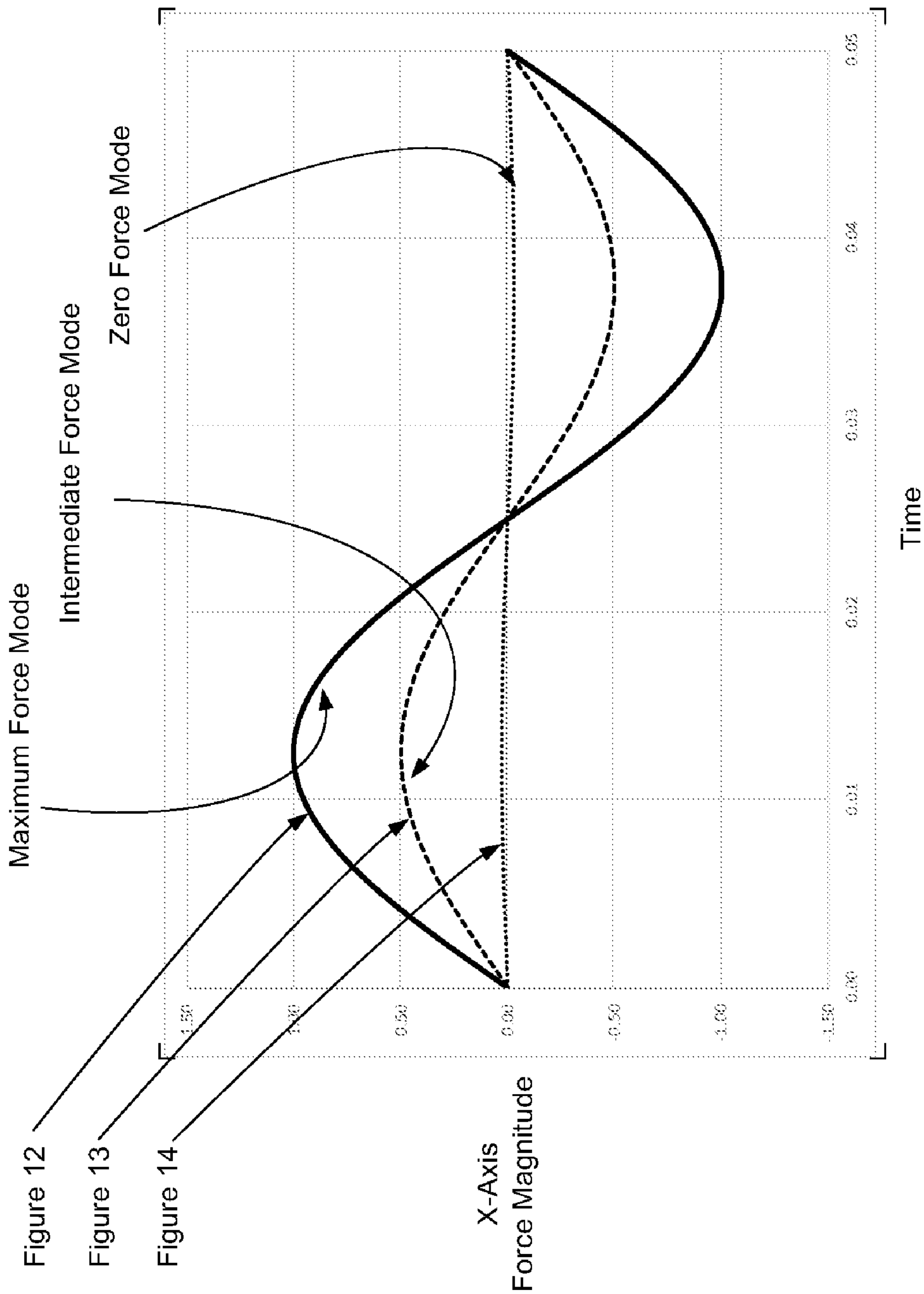
FIG. 11 shows comparative reaction force versus time for the maximum, intermediate and minimum configurations shown in FIGS. 5, 6 and 7, respectively.

The relative linear motion of center of masses 118 and 218 of masses 116 and 216 and resulting force vectors 9A and 9B of mass units 111 and 211 may be controlled to adjust the maximum magnitude of resulting vibration counter force 9. As shown in FIG. 11, the peak x-axis force magnitude of unit 110 may be adjusted from a maximum force mode to a zero or minimum force mode.

Figure 5:
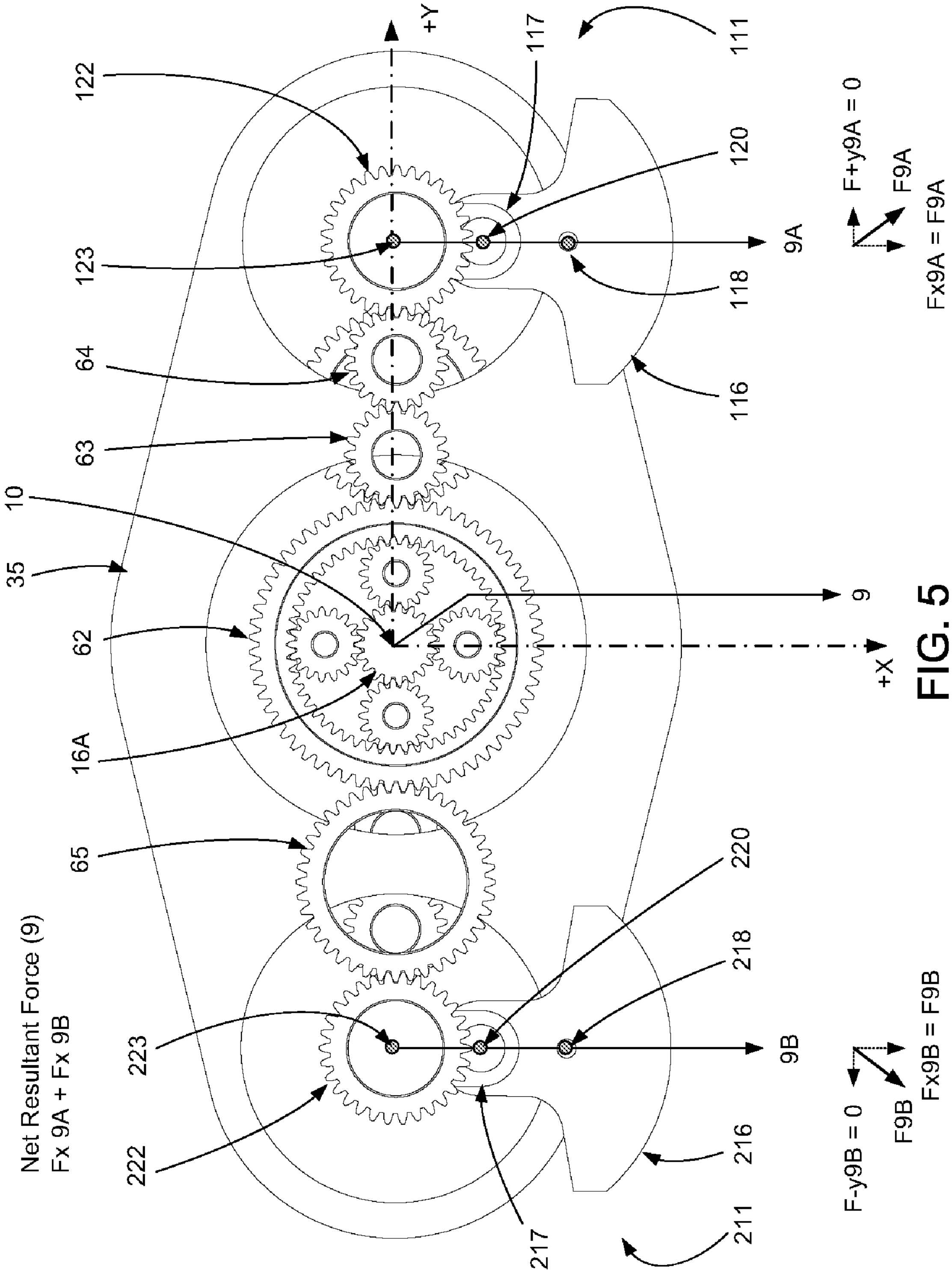
FIG. 5 is a top diagram of the vibration suppression unit shown in FIG. 4 in a maximum resulting force configuration.
Figure 6:
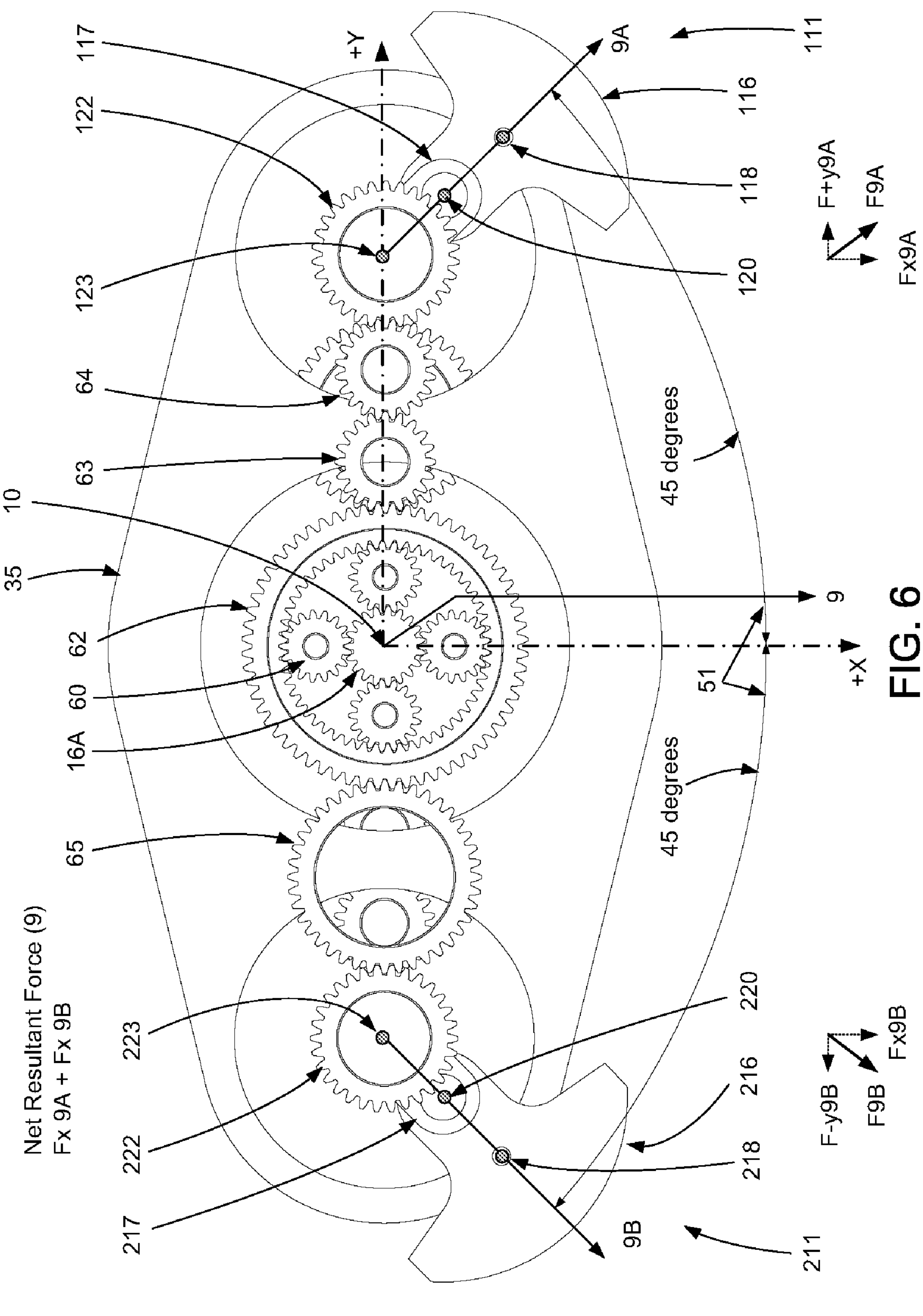
FIG. 6 is a top diagram of the vibration suppression unit shown in FIG. 4 in an intermediate resulting force configuration.
Figure 12:
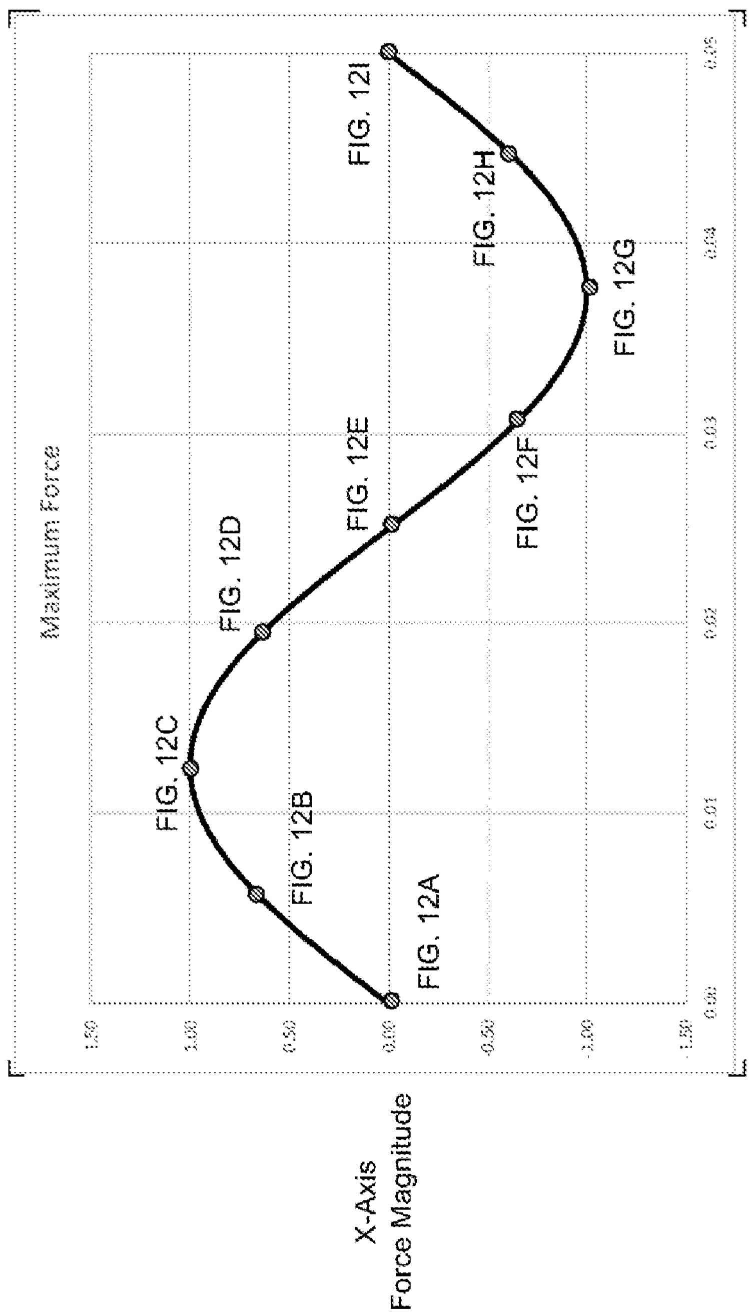
FIG. 12 is a graphical representation of reaction force versus time for the maximum configuration shown in FIG. 5.
Figure 12A:
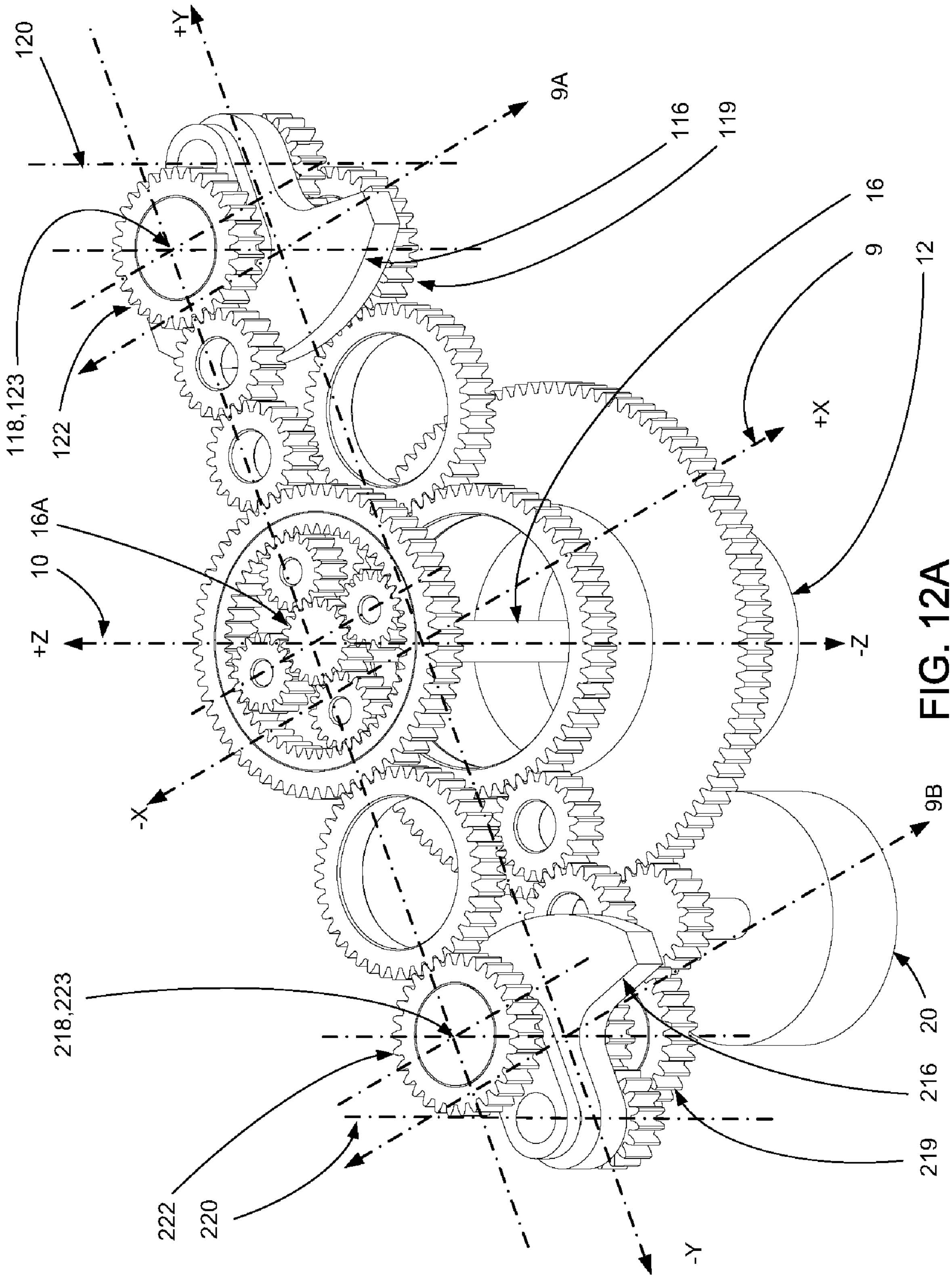
FIGS. 12A-12I show the relative positions of the mass units for each of the designated points on the curve shown in FIG. 12.
Figure 12B:
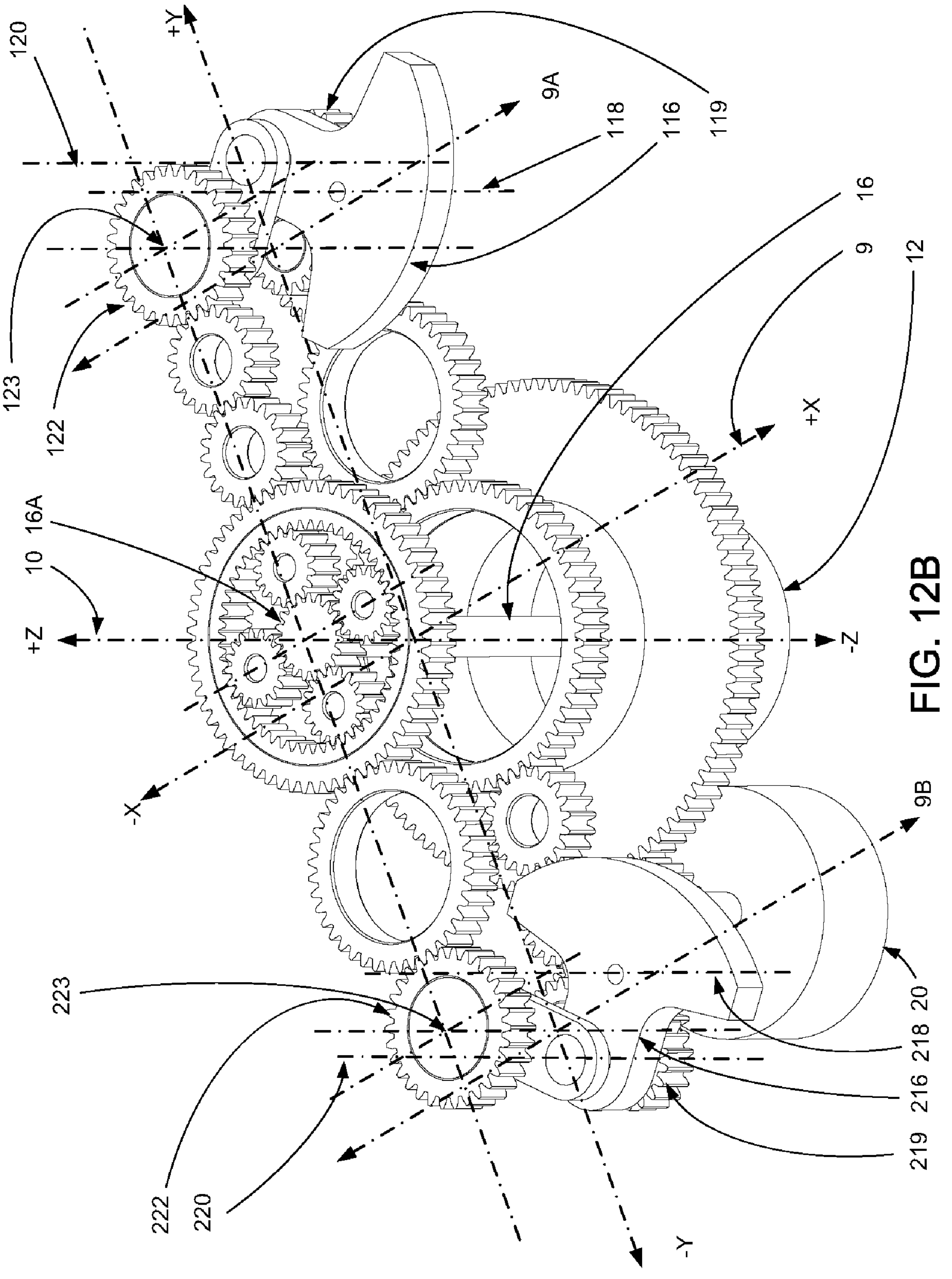
Figure 12C:
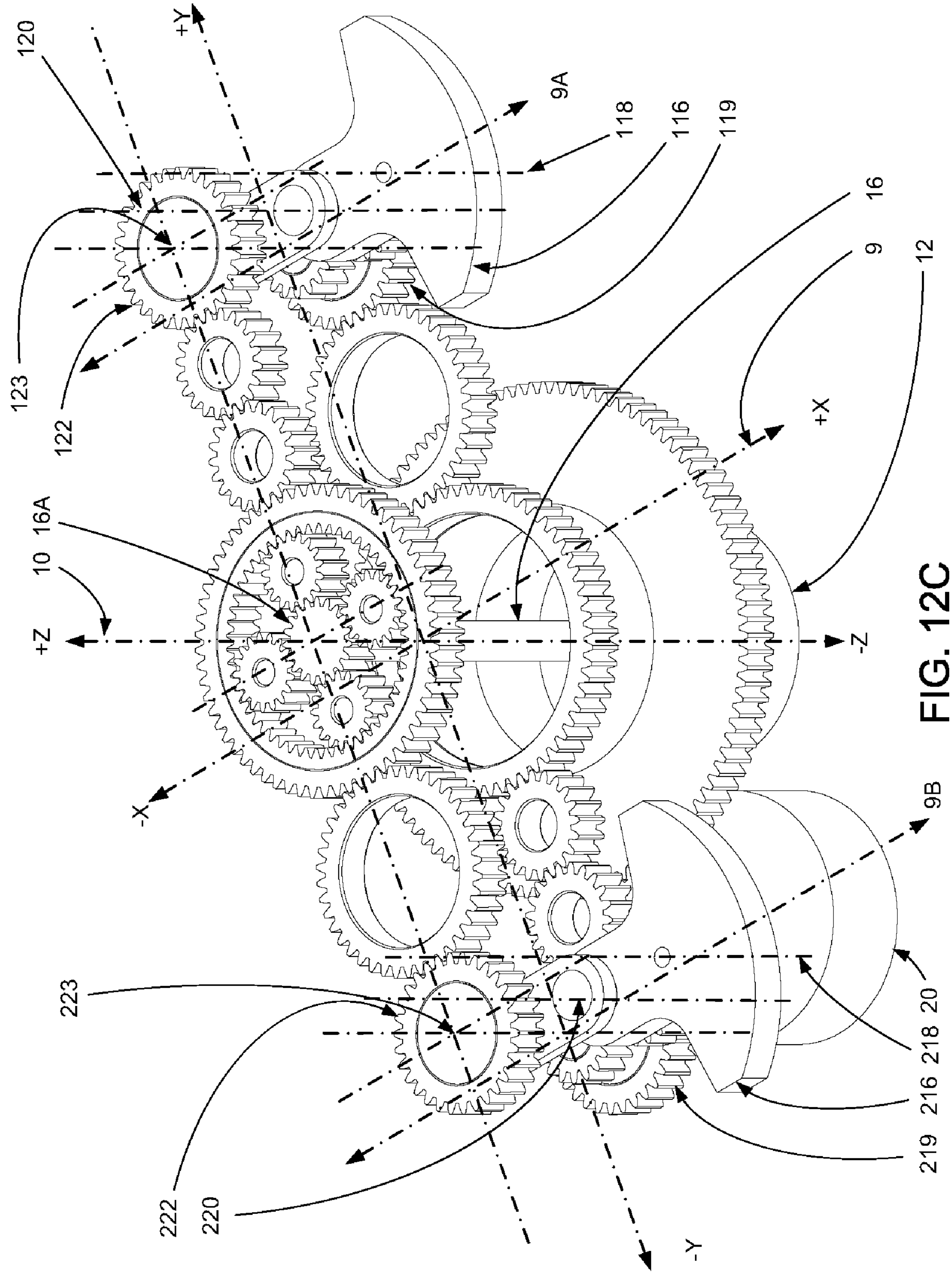
Figure 12D:
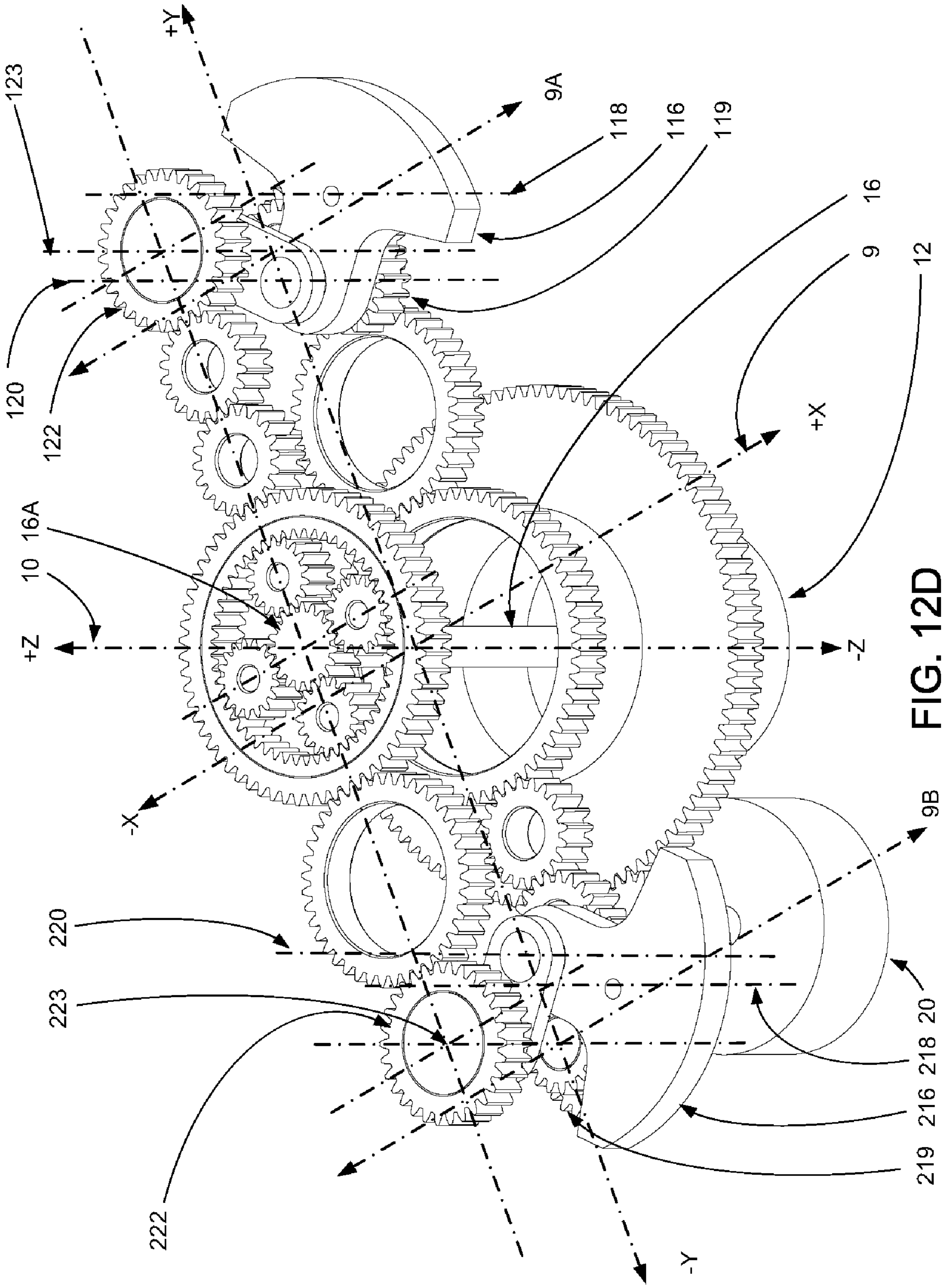
Figure 12E:
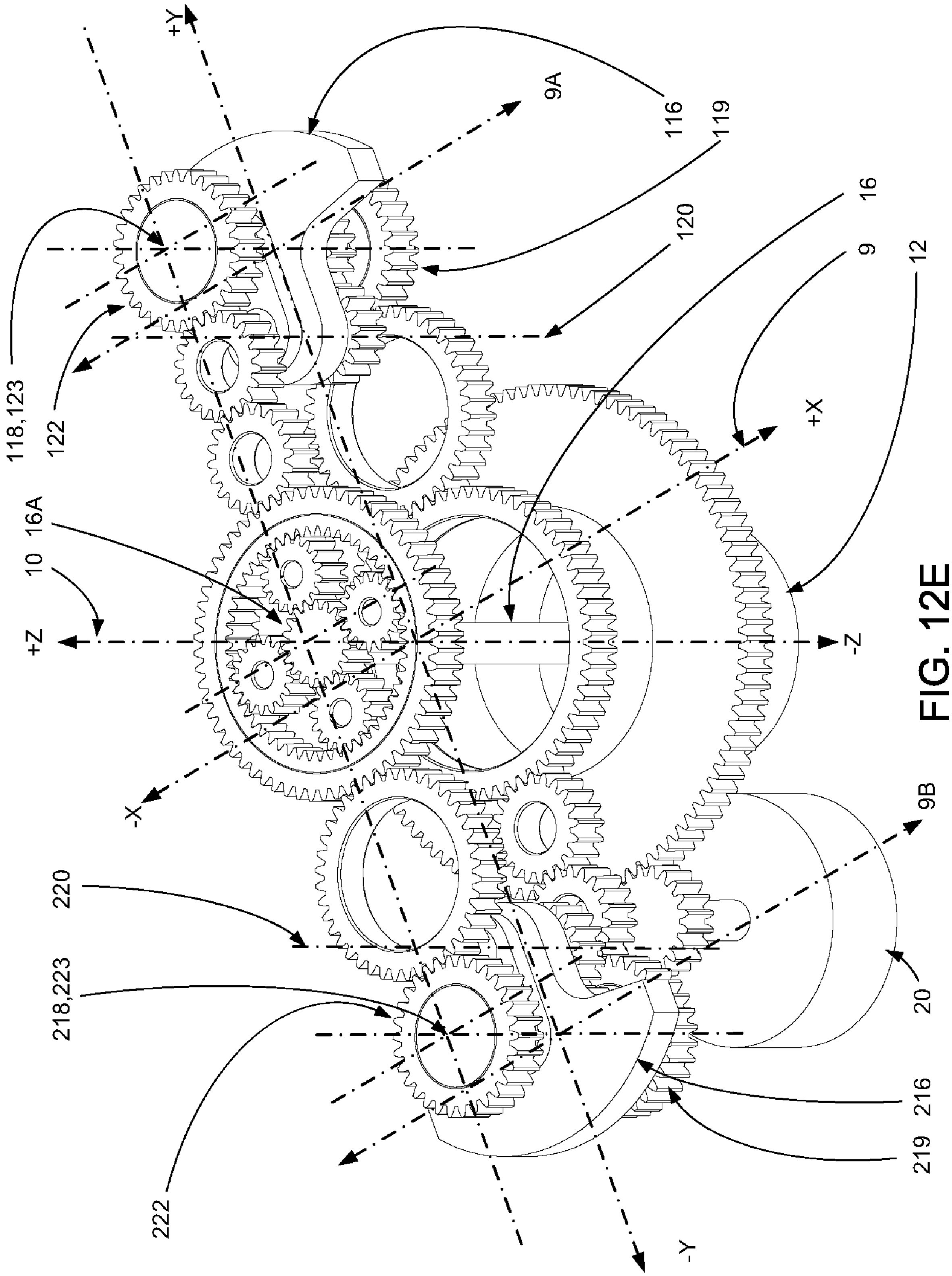
Figure 12F:
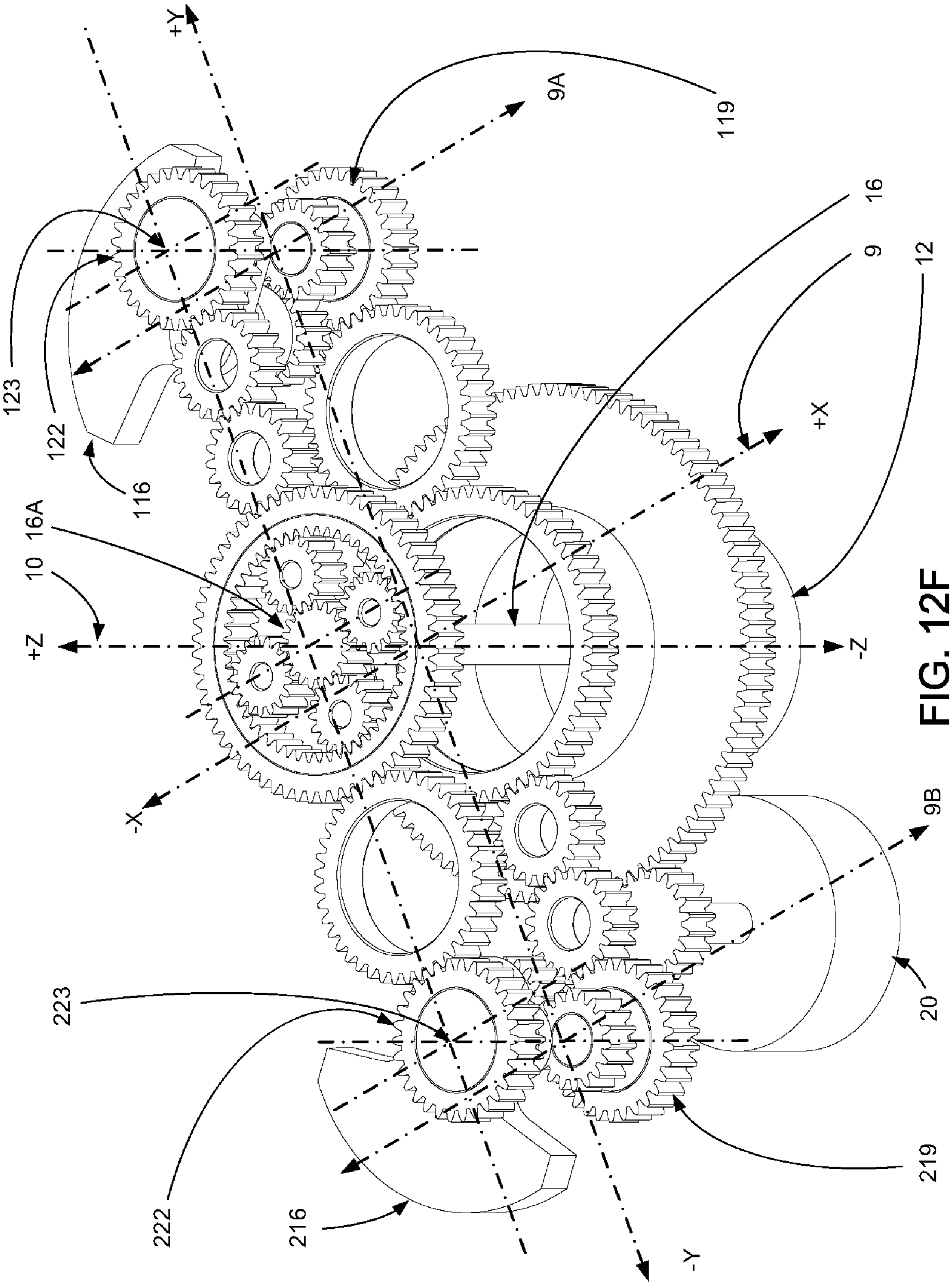
Figure 12G:
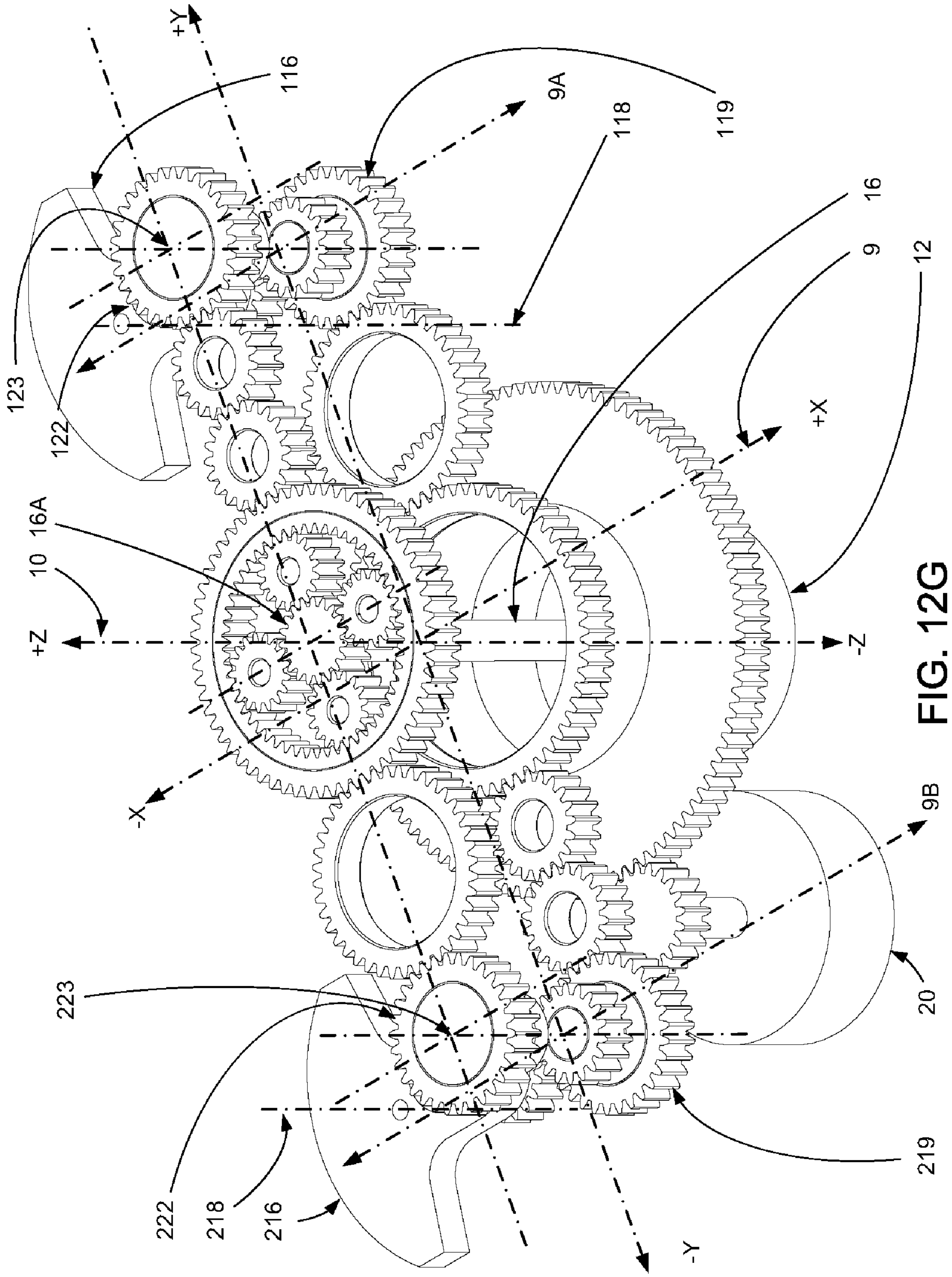
Figure 12H:
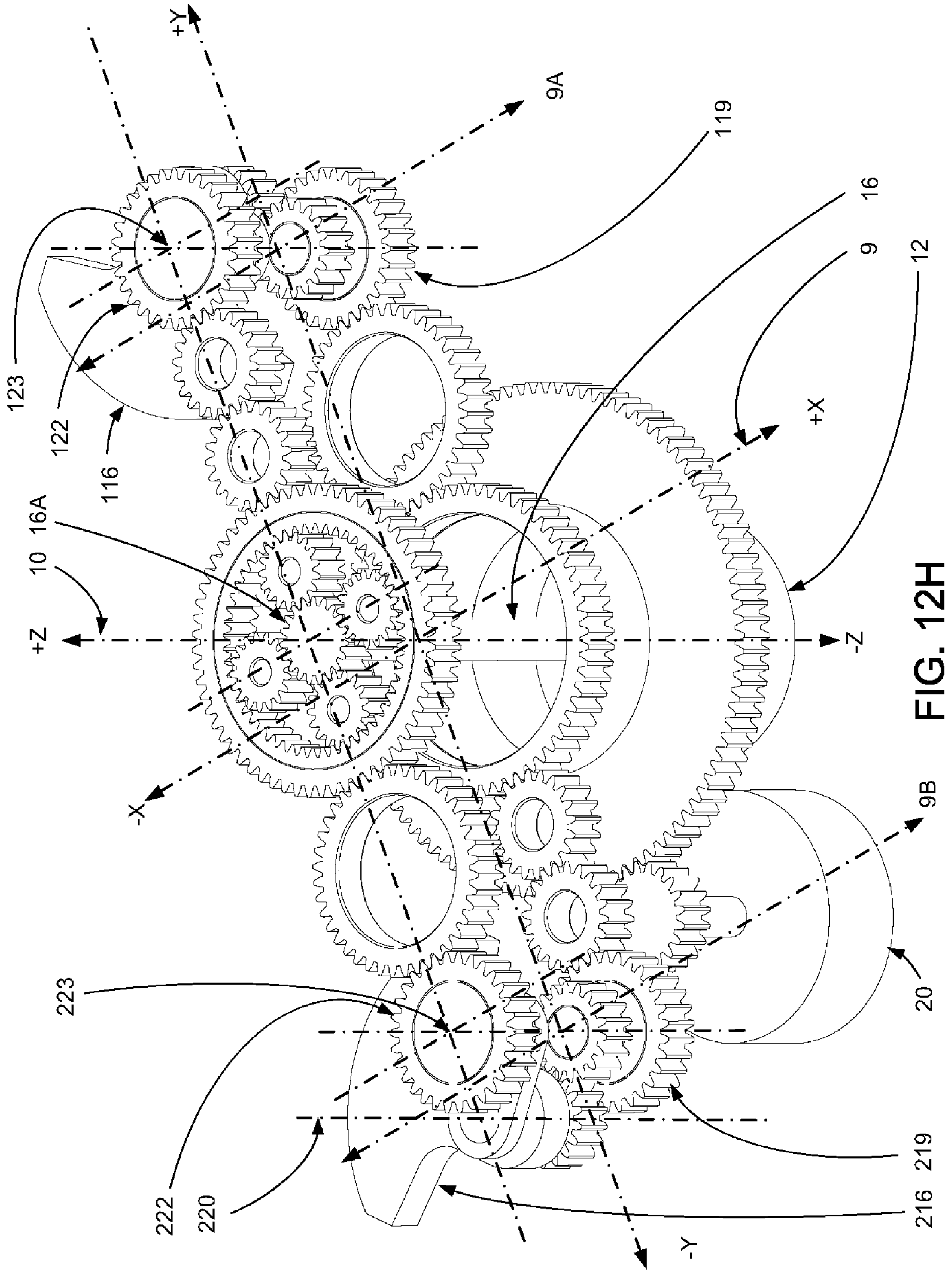
Figure 12I:
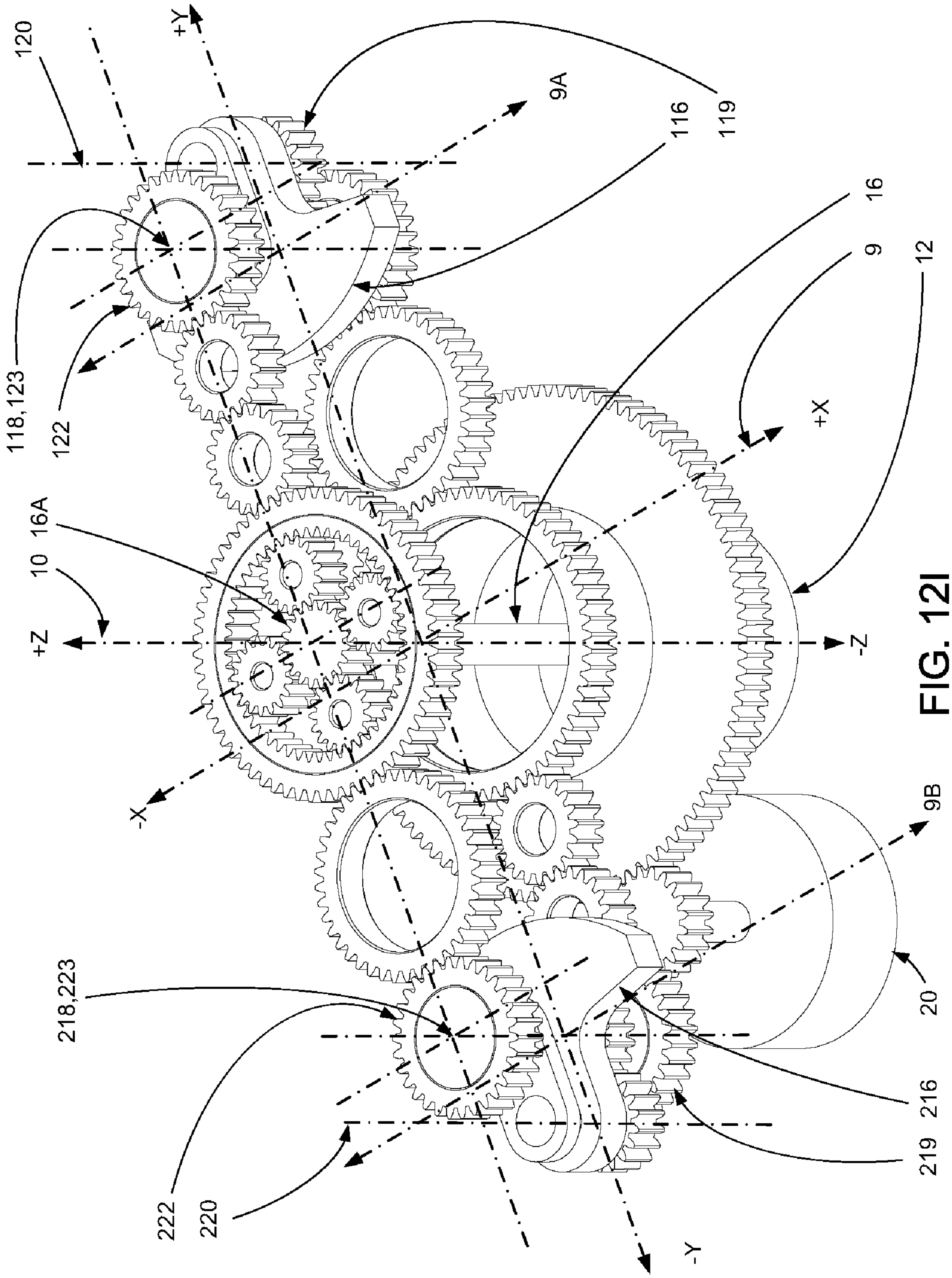
Figure 13:
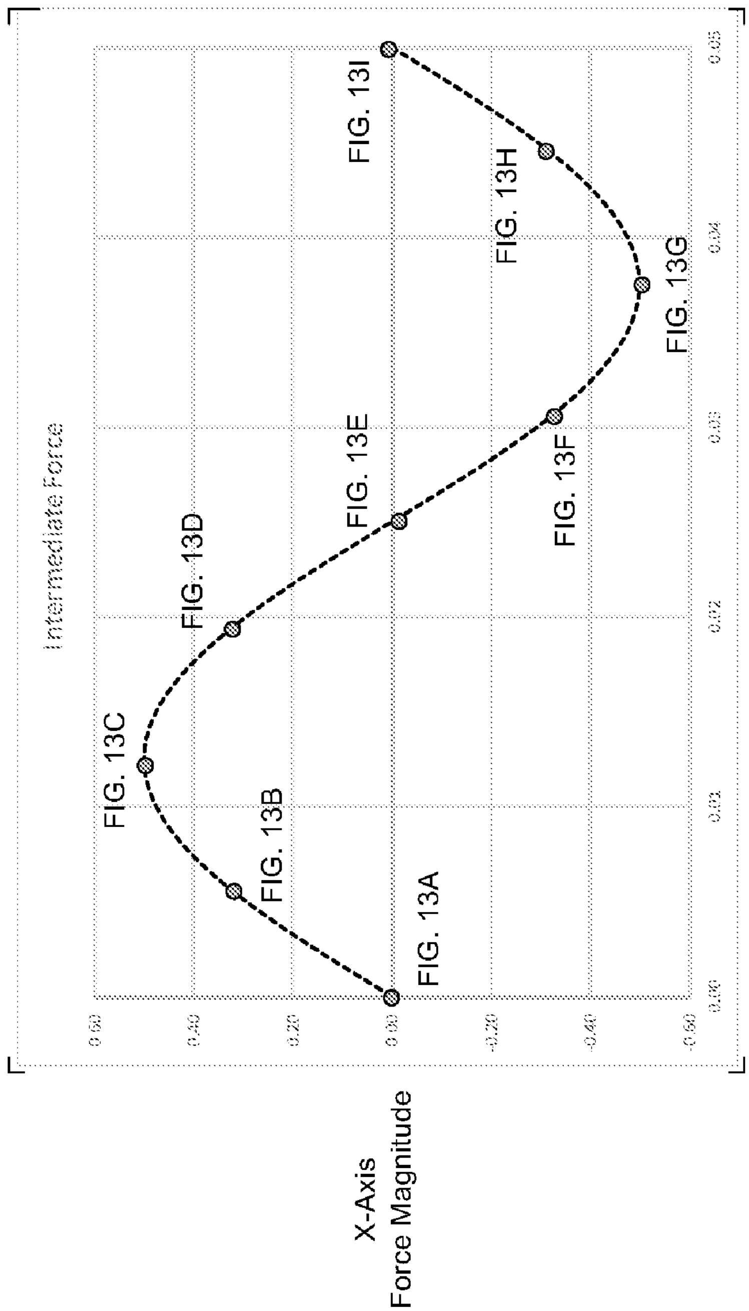
FIG. 13 is a graphical representation of reaction force versus time for the intermediate configuration shown in FIG. 6.
Figure 13A:
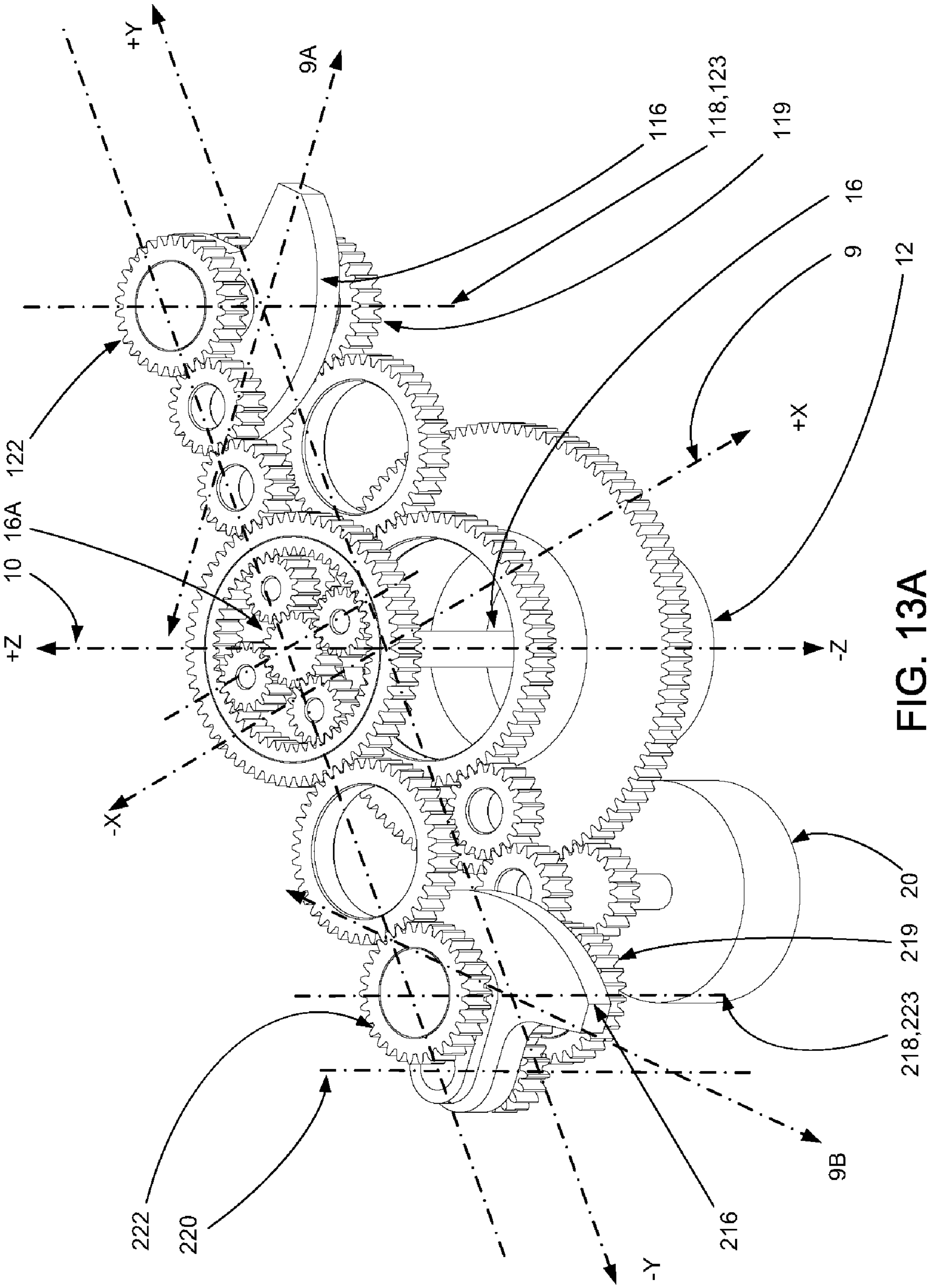
FIGS. 13A-13I show the relative positions of the mass units for each of the designated points on the curve shown in FIG. 13.
Figure 13B:
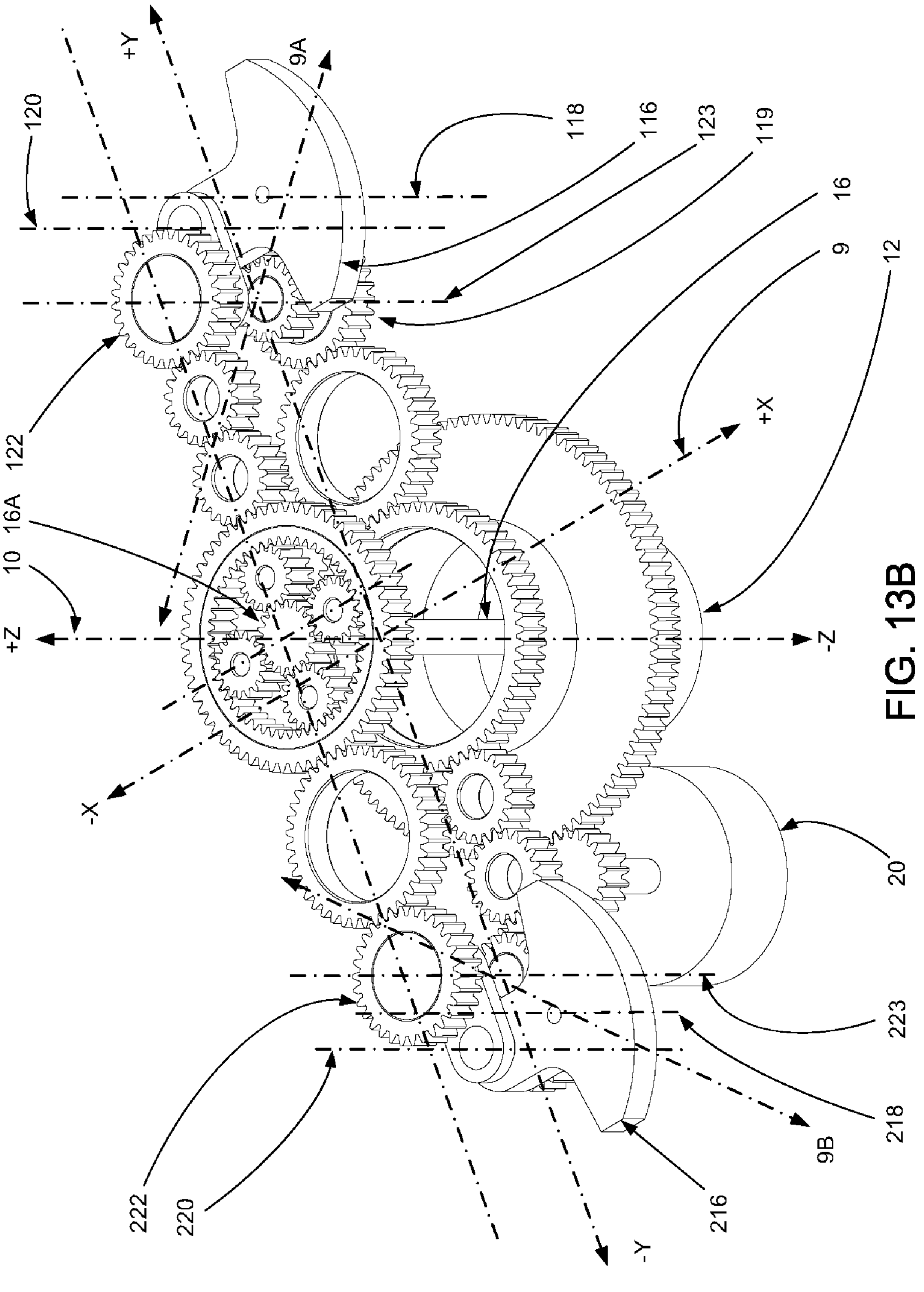
Figure 13C:
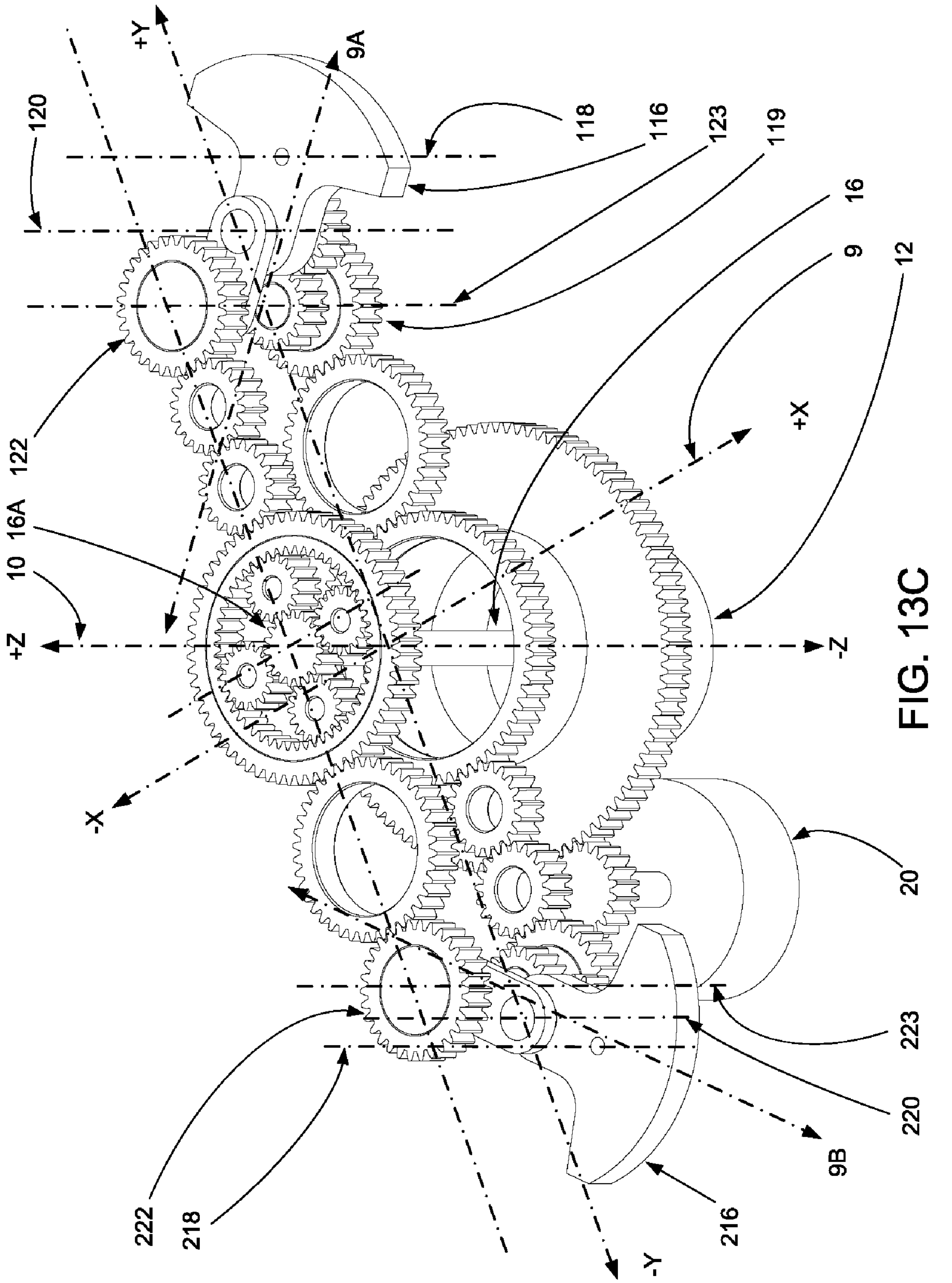
Figure 13D:
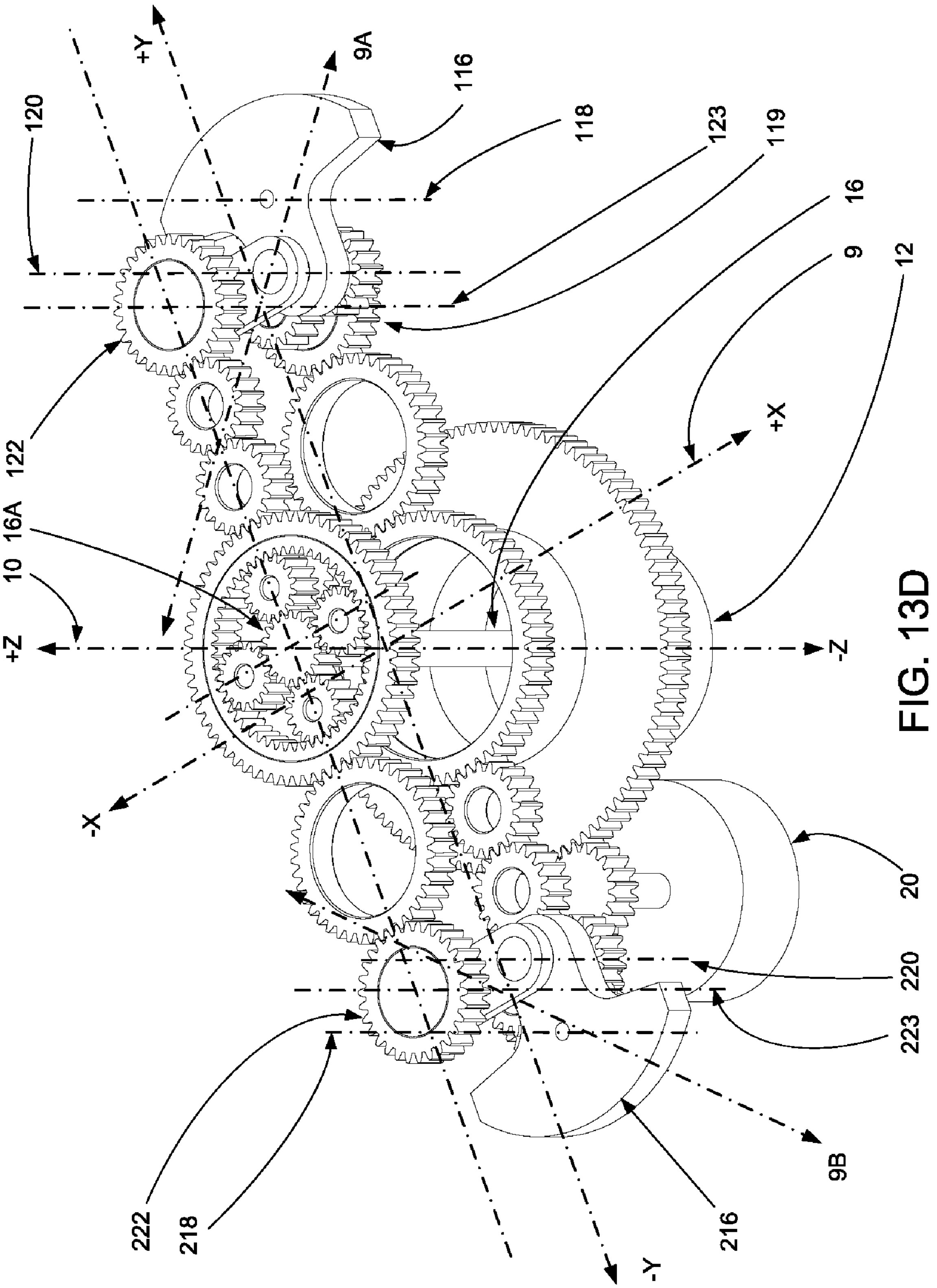
Figure 13E:
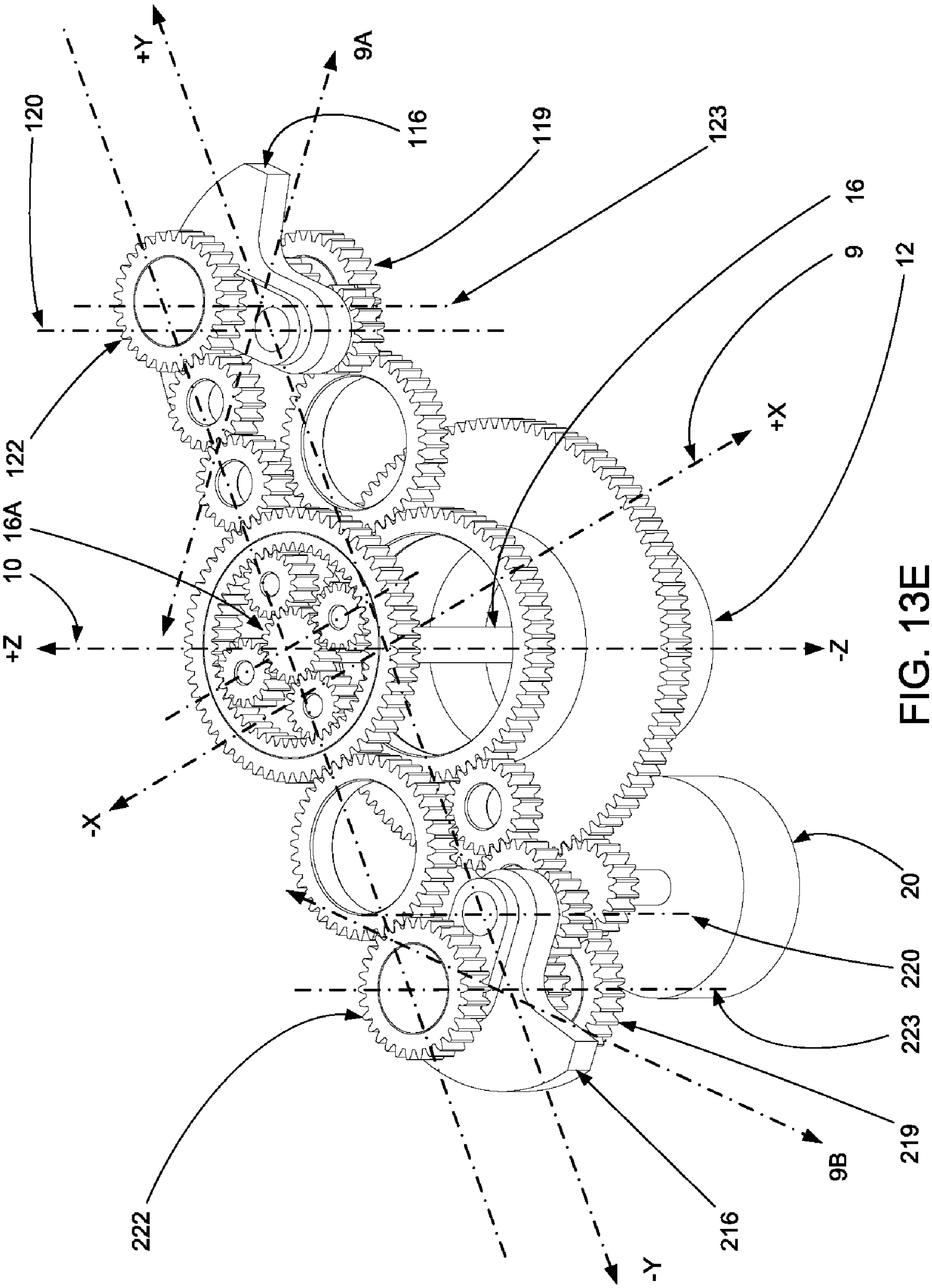
Figure 13F:
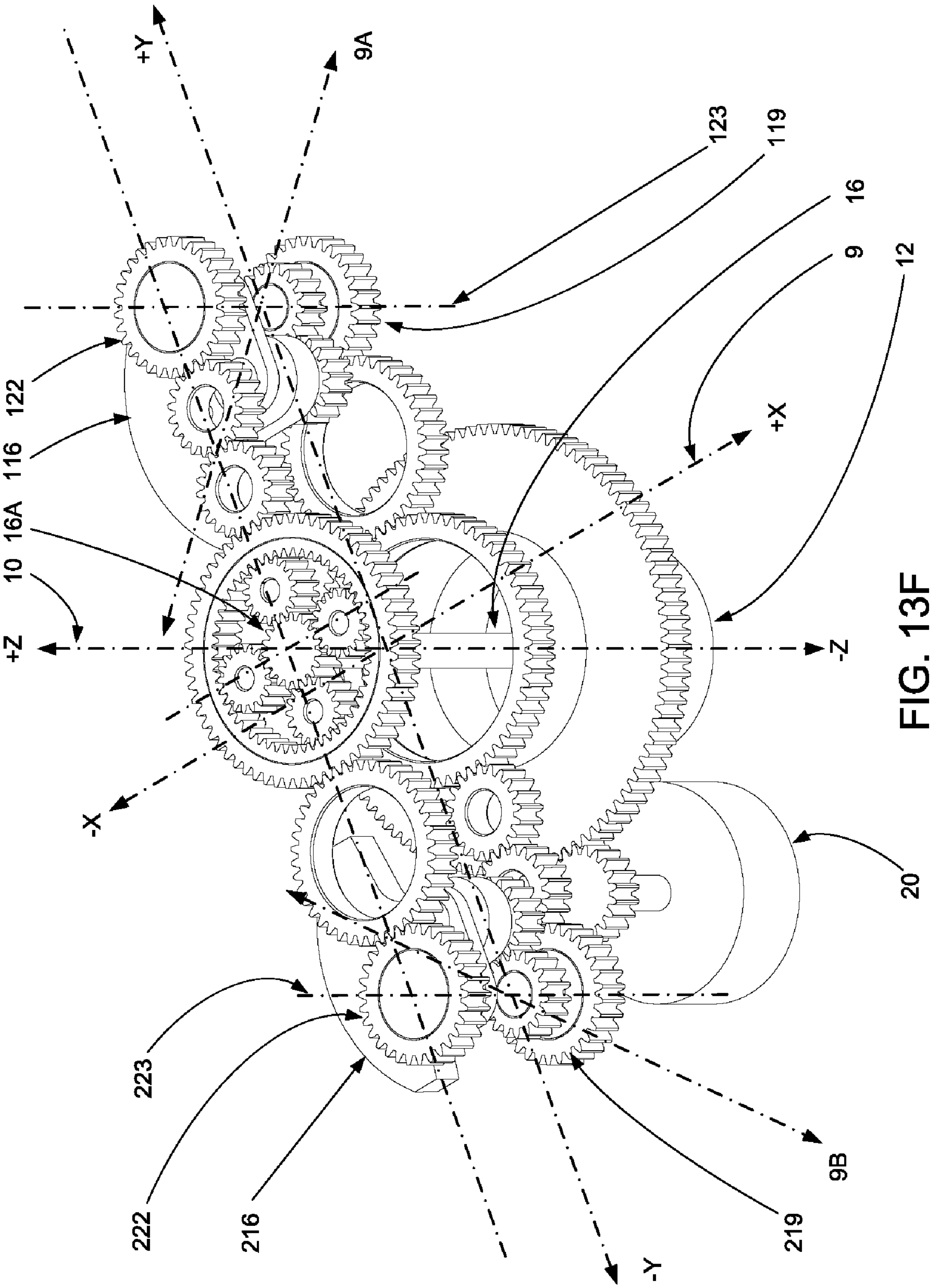
Figure 13G:
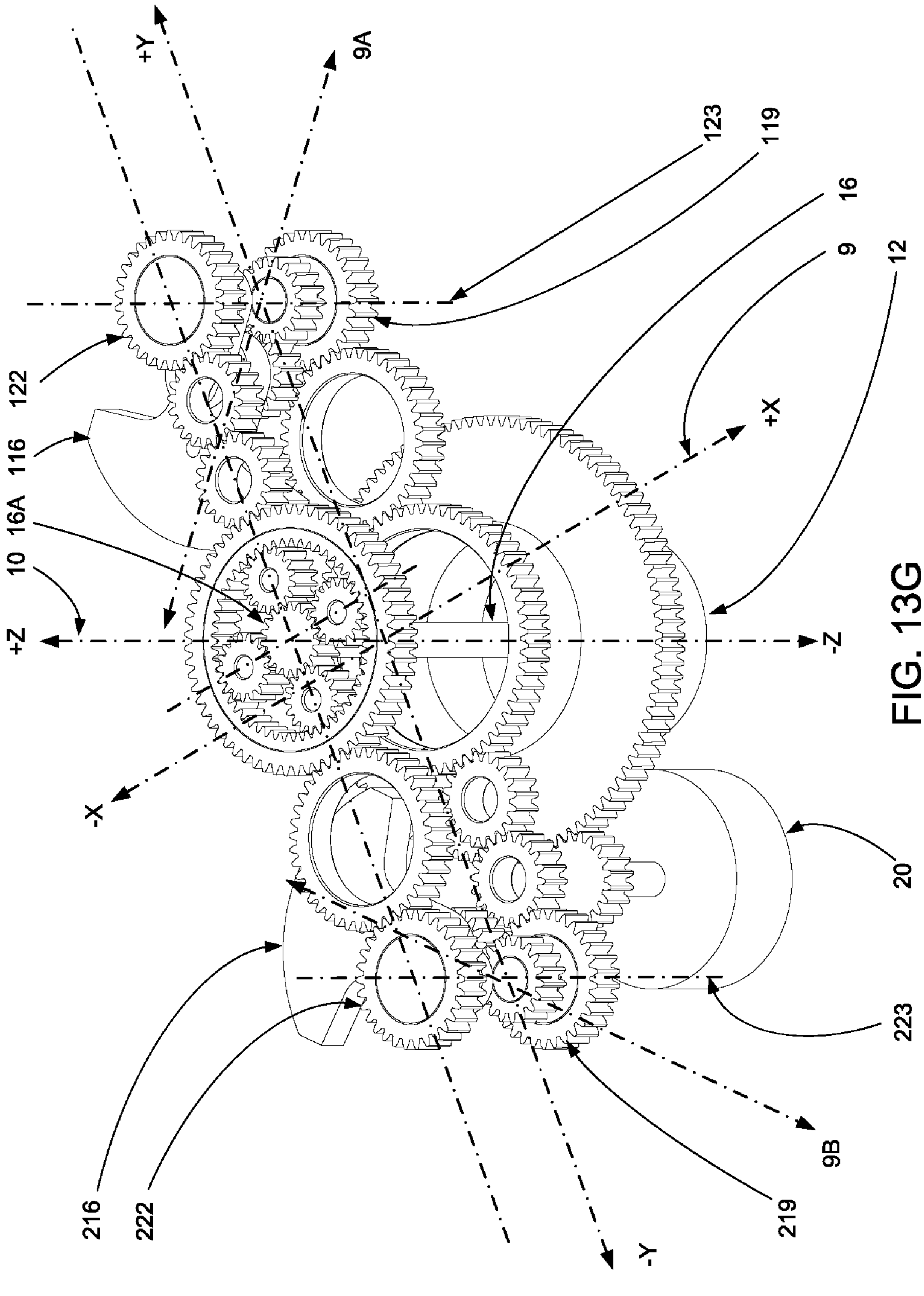
Figure 13H:
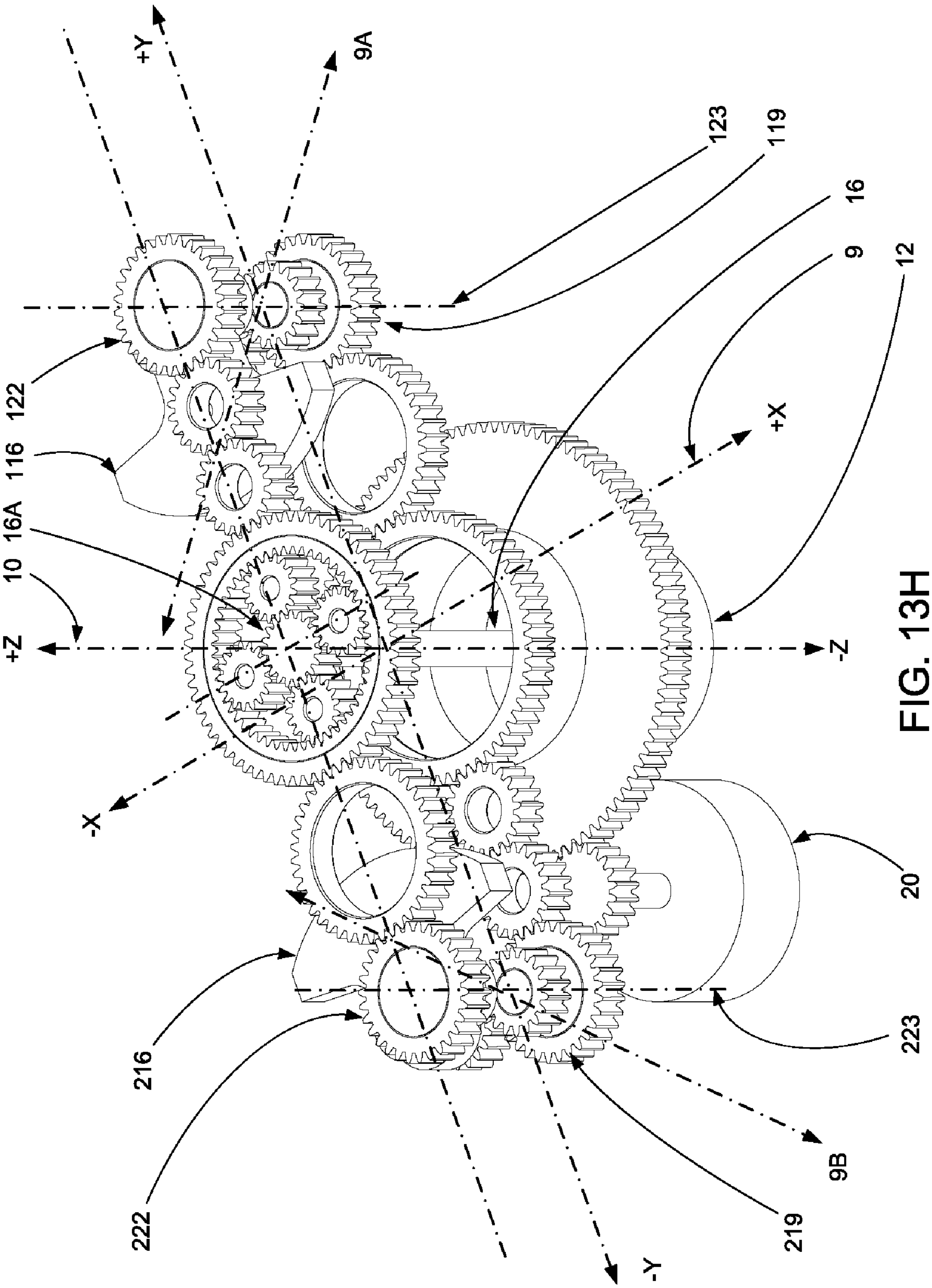
Figure 13I:
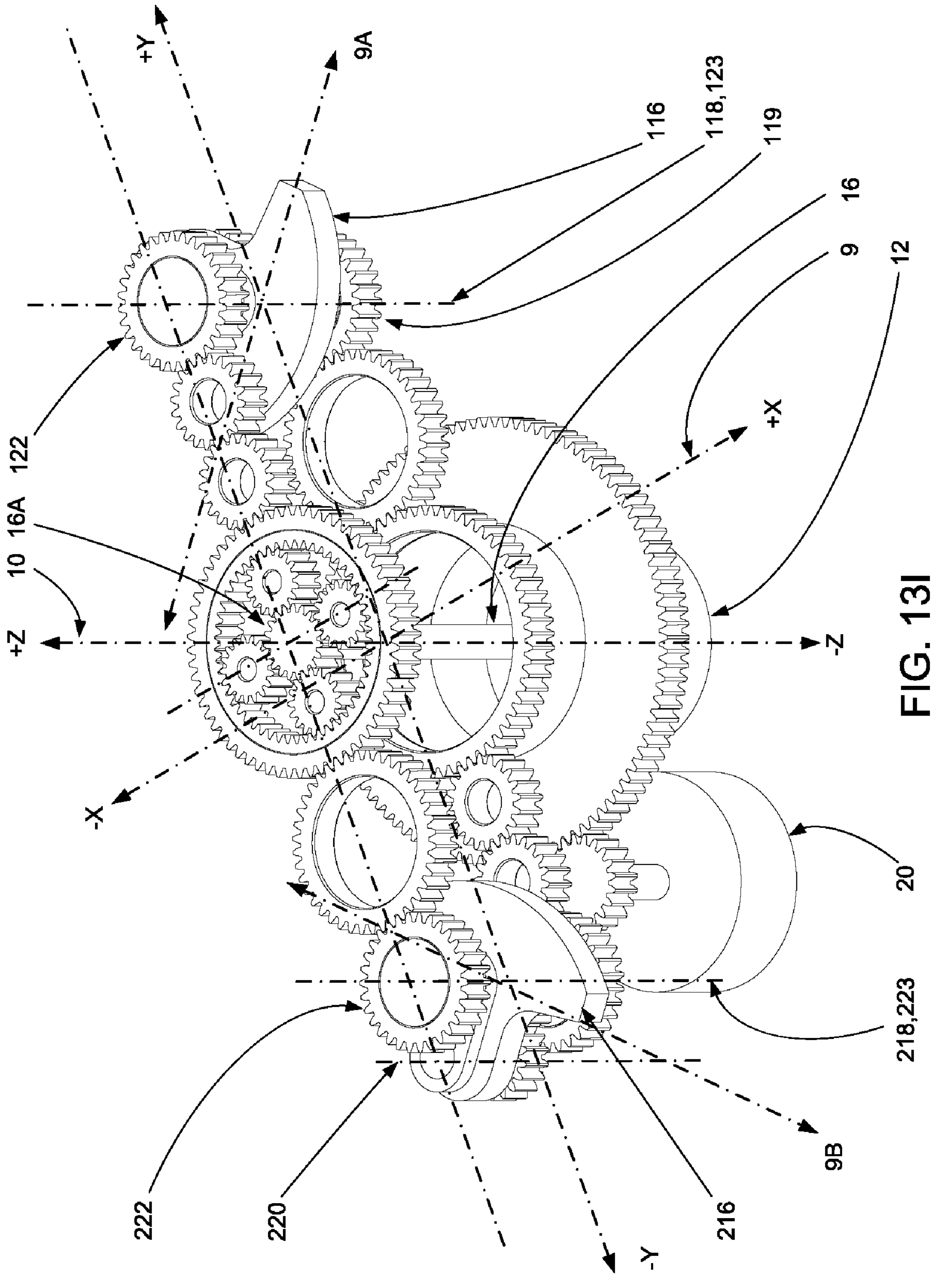

FIG. 5 shows the relative alignment of mass units 111 and 211 when controlled to provide a maximum peak counter vibration force along axis x-x, with the graphical representation of such reaction force versus time shown in FIG. 12. As shown in FIGS. 5 and 12A-12I, in this maximum force configuration, mass units 111 and 211 are controlled such that the linear motion of center of mass 118 and center of mass 218, and resulting force vectors 9A and 9B, respectively, are parallel to each other. In this maximum mode, the linear motion of center of mass 118 and center of mass 218 and force vectors 9A and 9B are controlled to also be substantially parallel to the longitudinal axis x-x of fuselage 18.

To reduce the maximum magnitude of resulting vibration counter force 9, mass units 111 and 211 are controlled such that the linear motion of center of mass 118 and center of mass 218, and resulting force vectors 9A and 9B, respectively, diverge from parallel. Such divergence 51 can range from zero to 180 degrees, with zero being the maximum when parallel as shown in FIGS. 5 and 12A-12I, and 180 degrees being a minimum of substantially zero when the motion is in line but in opposite directions as shown in FIGS. 7 and 14A-I. As shown in FIG. 5, when the linear motion of center of mass 118 and center of mass 218, and resulting force vectors 9A and 9B, respectively, are parallel, the forces 9A and 9B are entirely in the +x direction and sum from center axis 10 to provide a maximum vibration counter force 9.

FIGS. 6, 13 and 13A-13I show an intermediate force configuration. In this intermediate force mode, the linear motion of center of mass 118 and center of mass 218, and resulting force vectors 9A and 9B, respectively, are off-parallel by 90 degrees. The y-component of forces 9A and 9B cancel each other about center axis 10. The x-component of forces 9A and 9B are reduced but still sum from center axis 10 to provide an intermediate maximum vibration counter force 9. In this intermediate mode, net force 9 is controlled to be substantially parallel to the longitudinal axis x-x of fuselage 18, but the linear motion of center of mass 118 and center of mass 218 and force vectors 9A and 9B are not parallel to the longitudinal axis x-x of fuselage 18.

Figure 7:
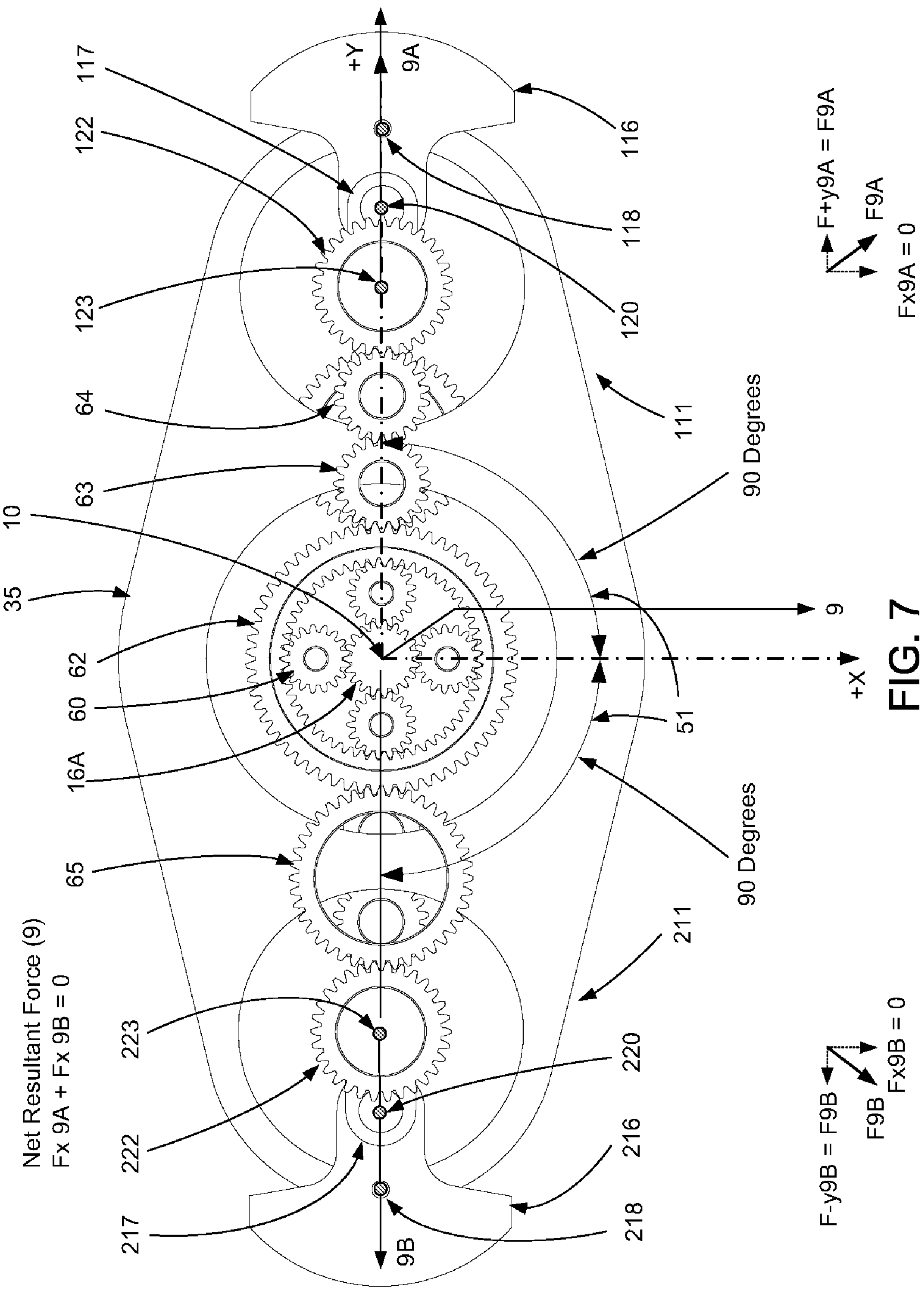
FIG. 7 is a top diagram of the vibration suppression unit shown in FIG. 4 in a minimum resulting force configuration.
Figure 14:
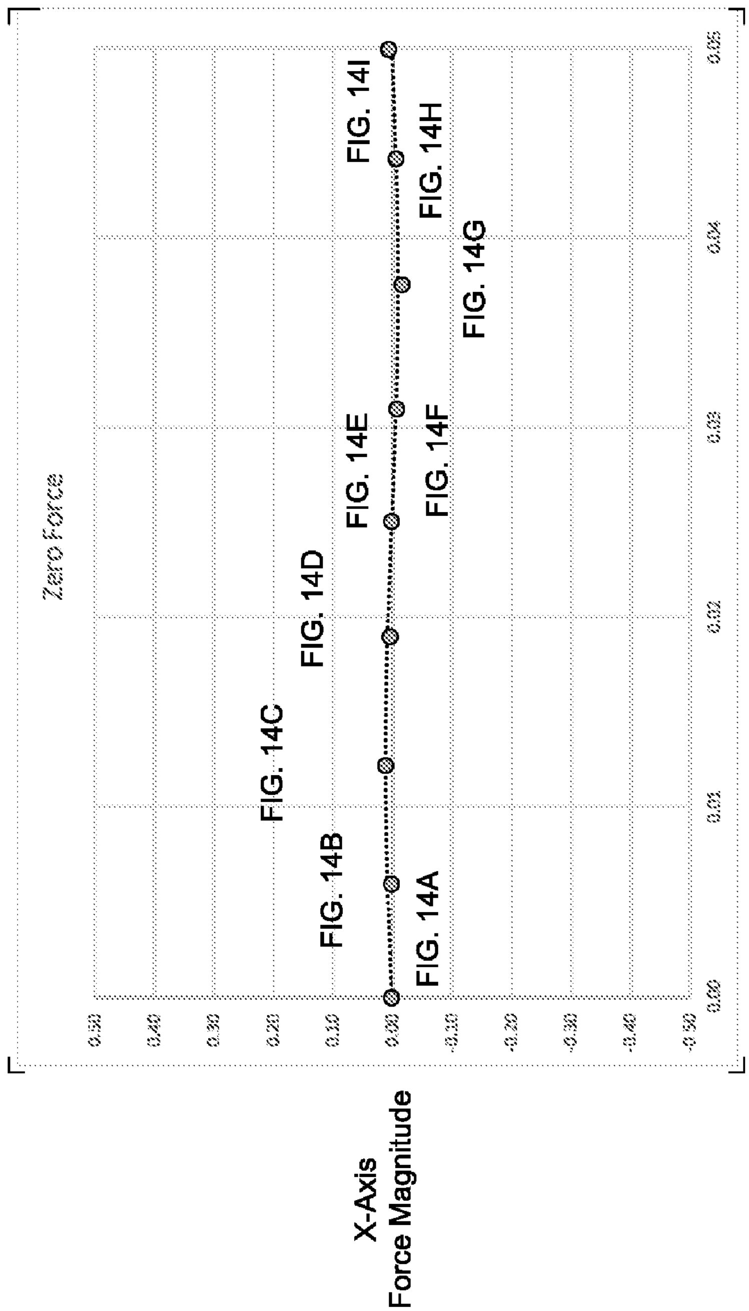
FIG. 14 is a graphical representation of reaction force versus time for the minimum configuration shown in FIG. 7.
Figure 14A:
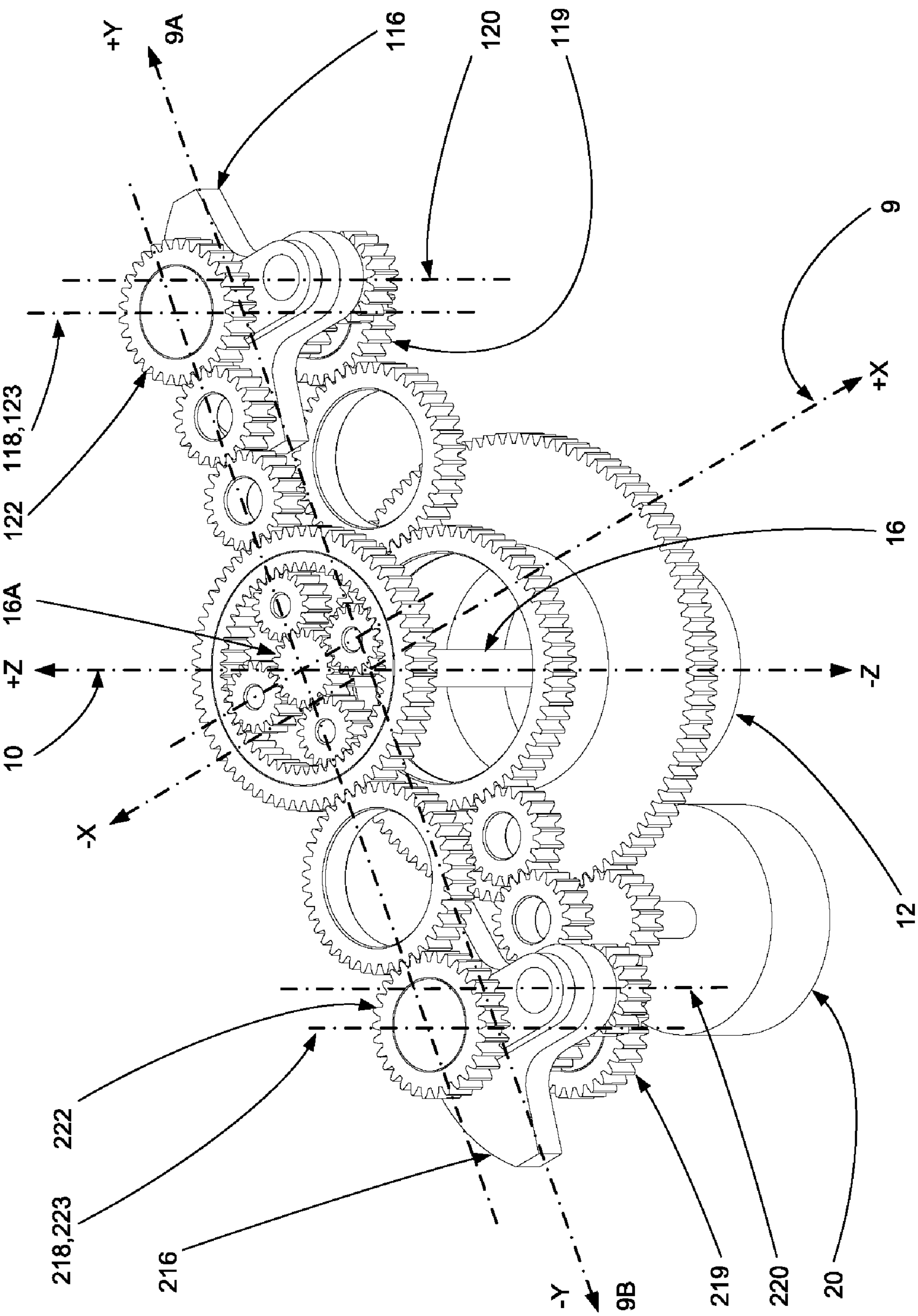
Figure 14B:
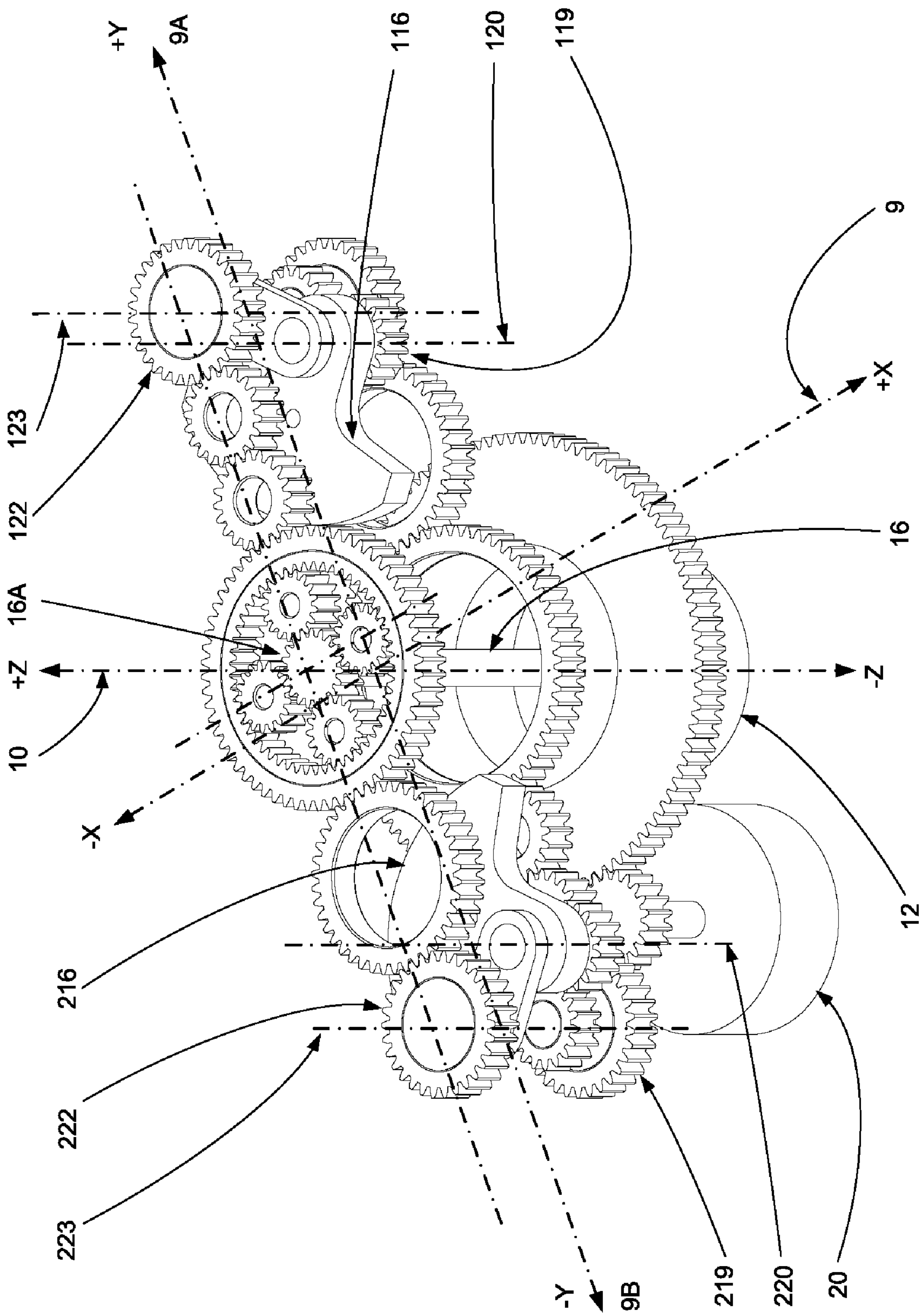
Figure 14C:
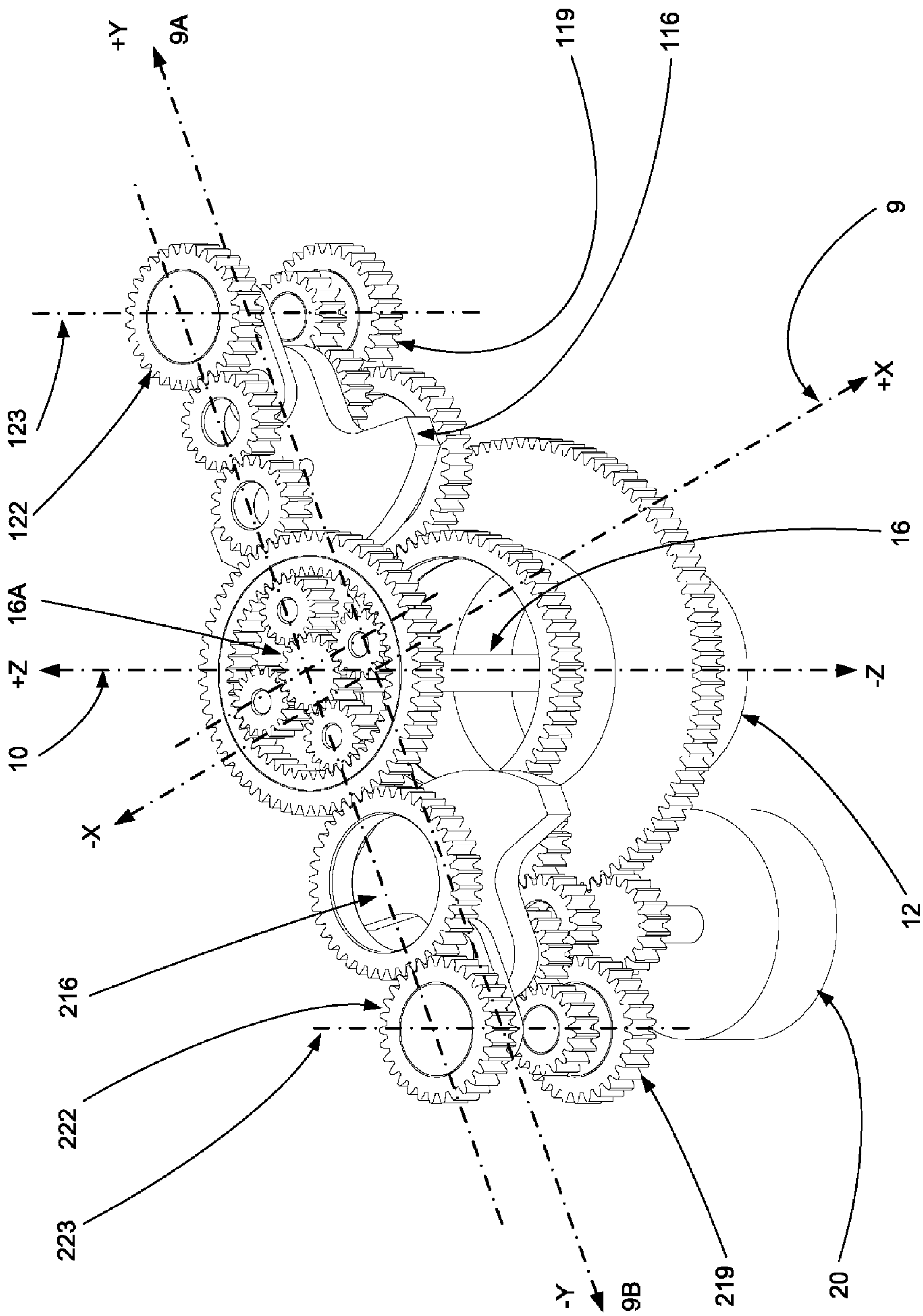
Figure 14D:
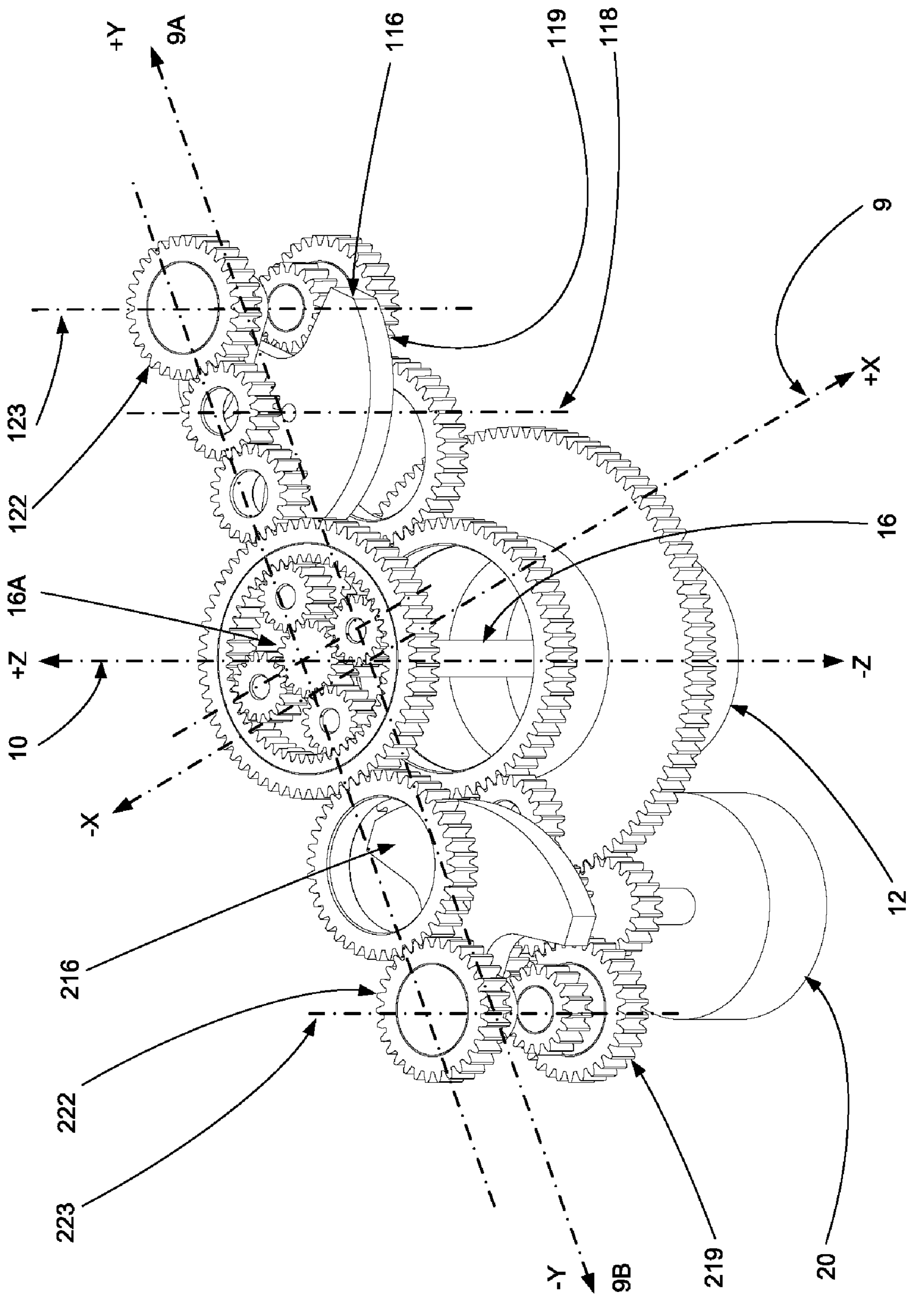
Figure 14E:
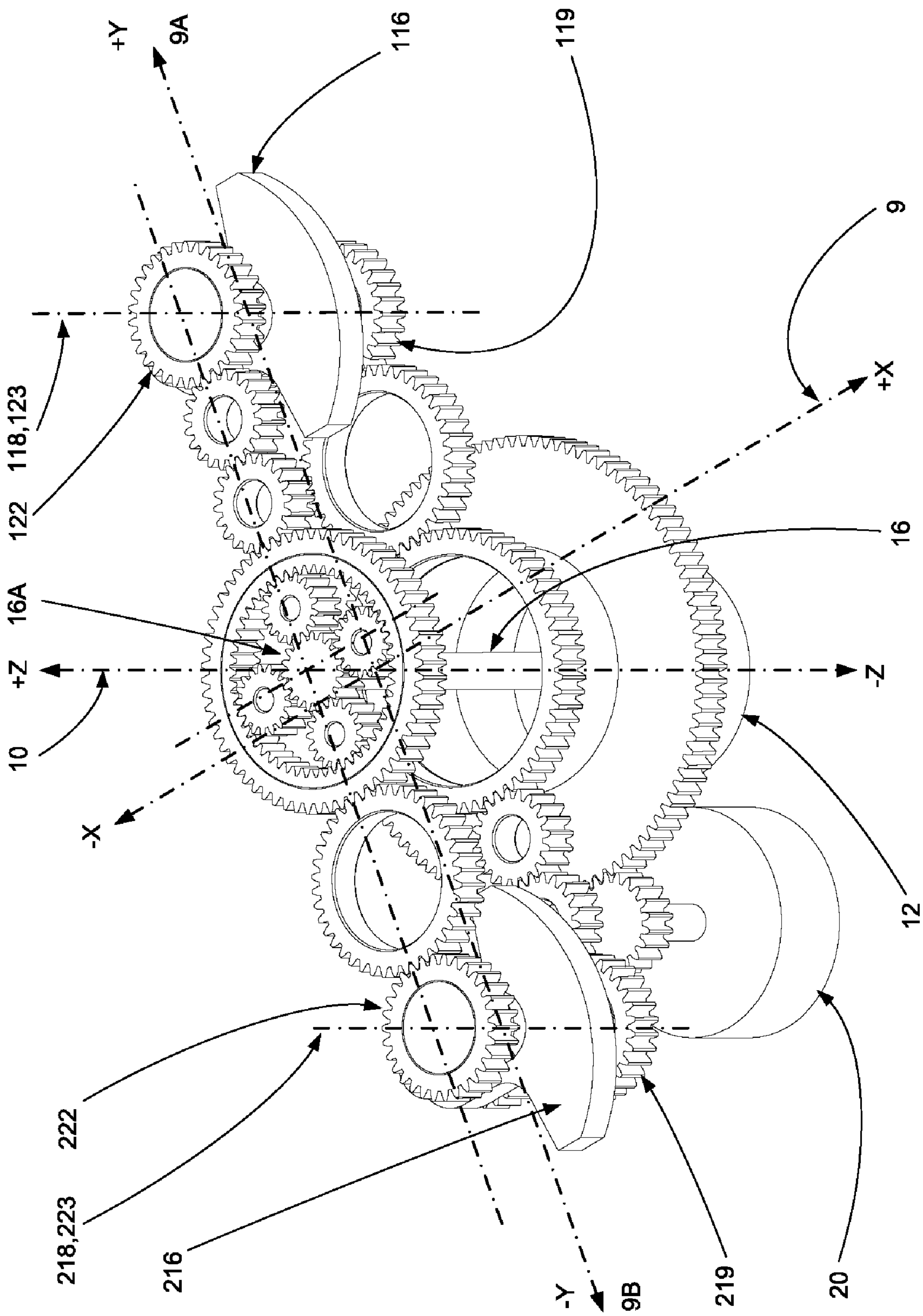
Figure 14F:
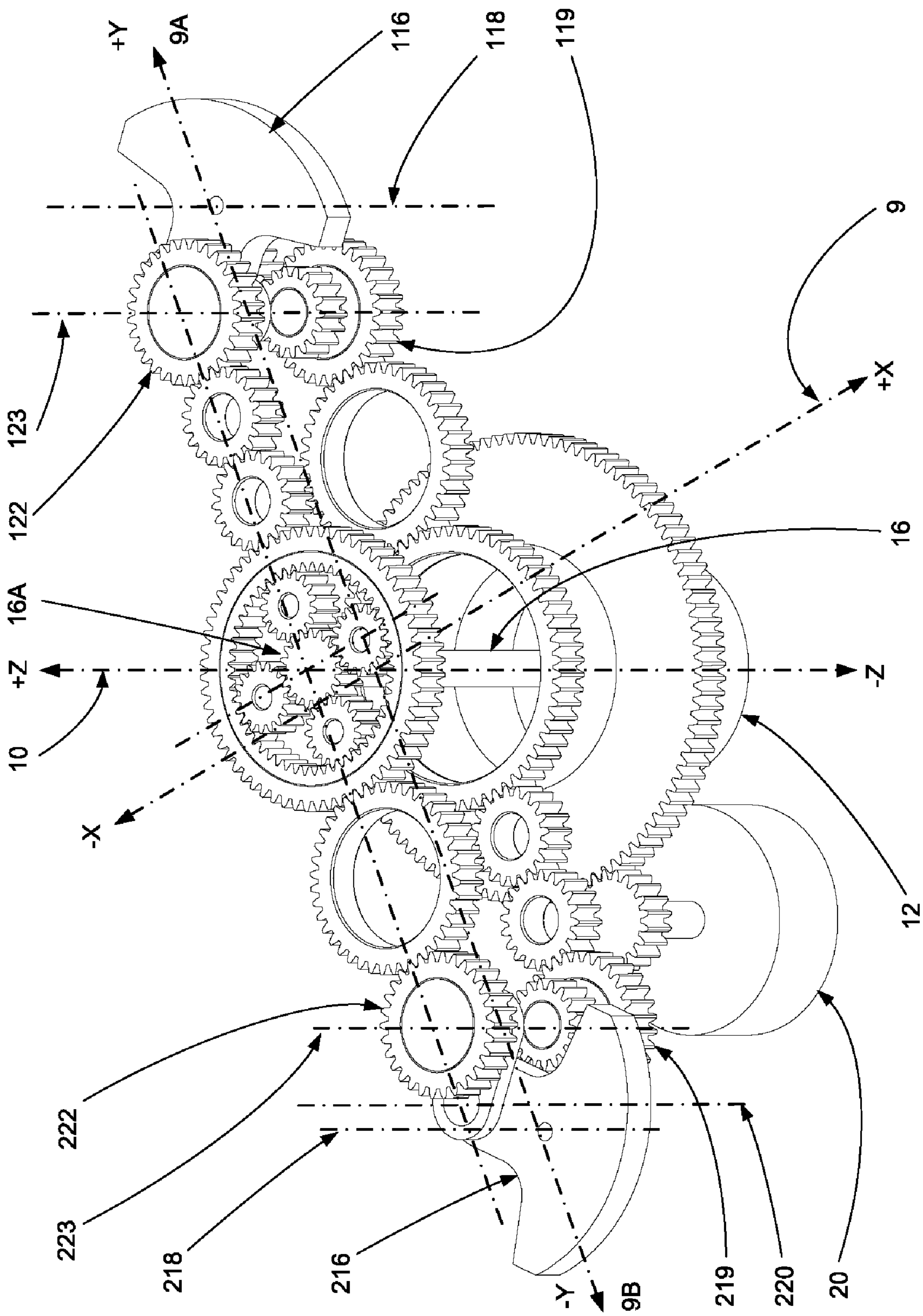
Figure 14G:
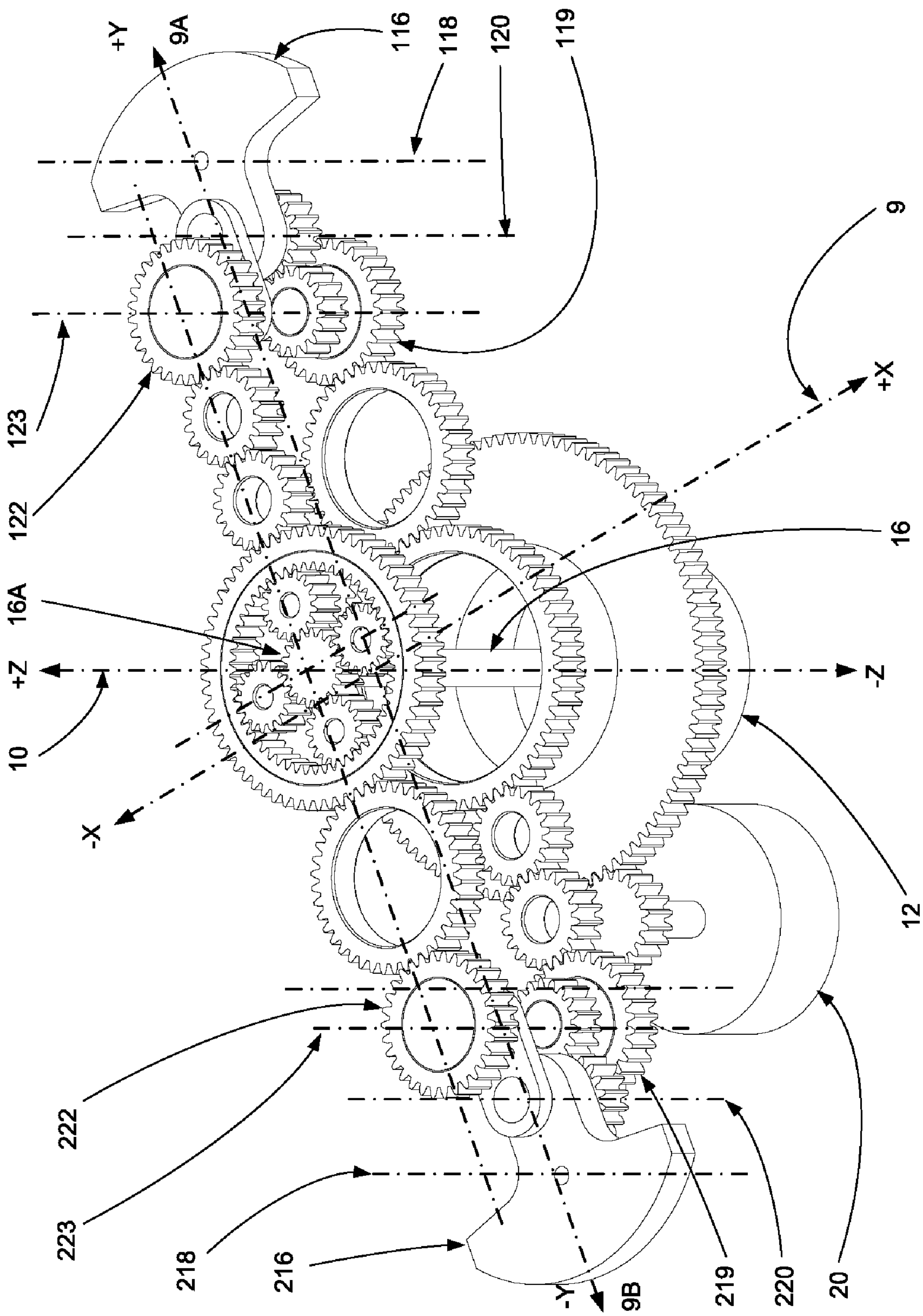
Figure 14H:
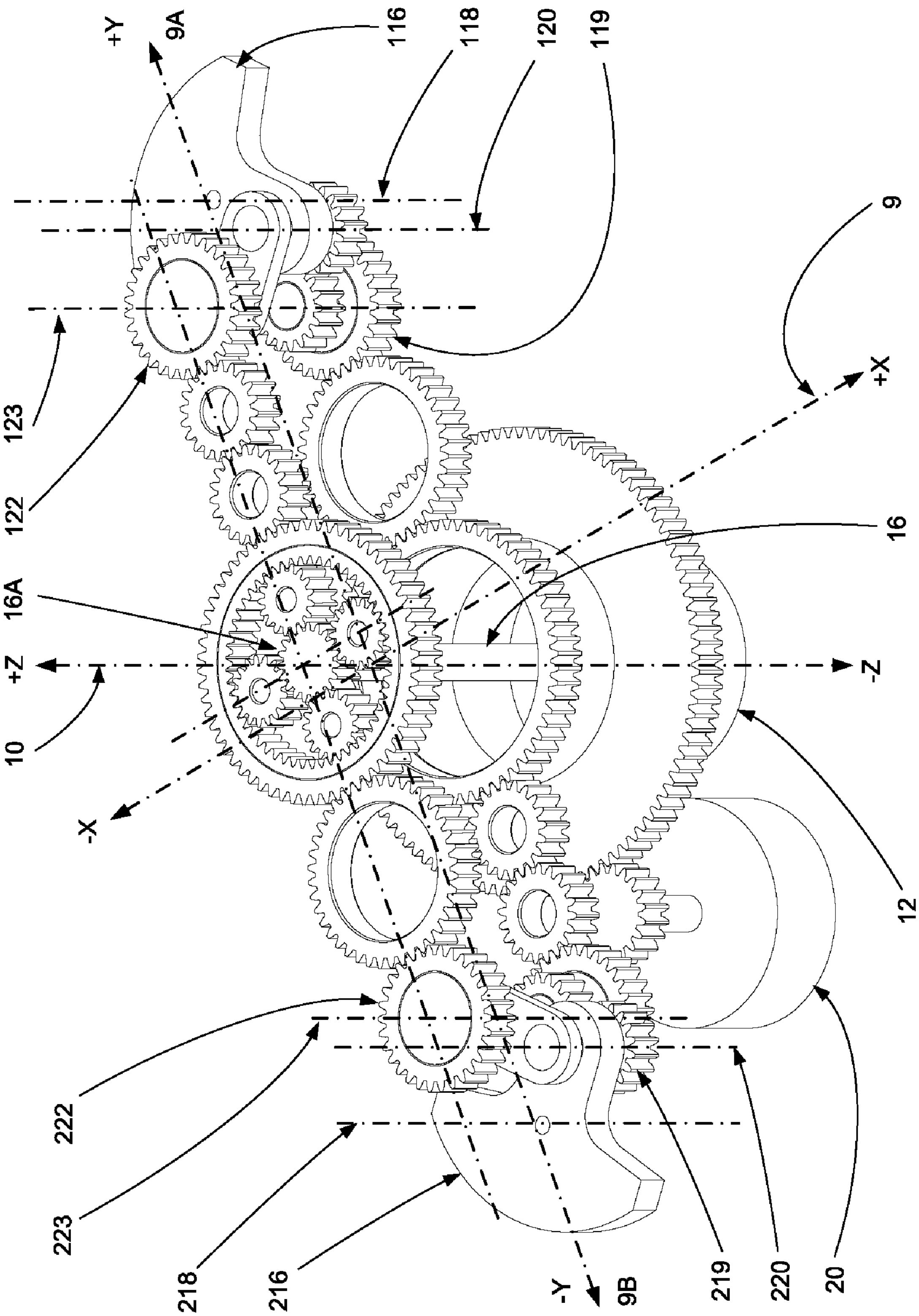
Figure 14I:
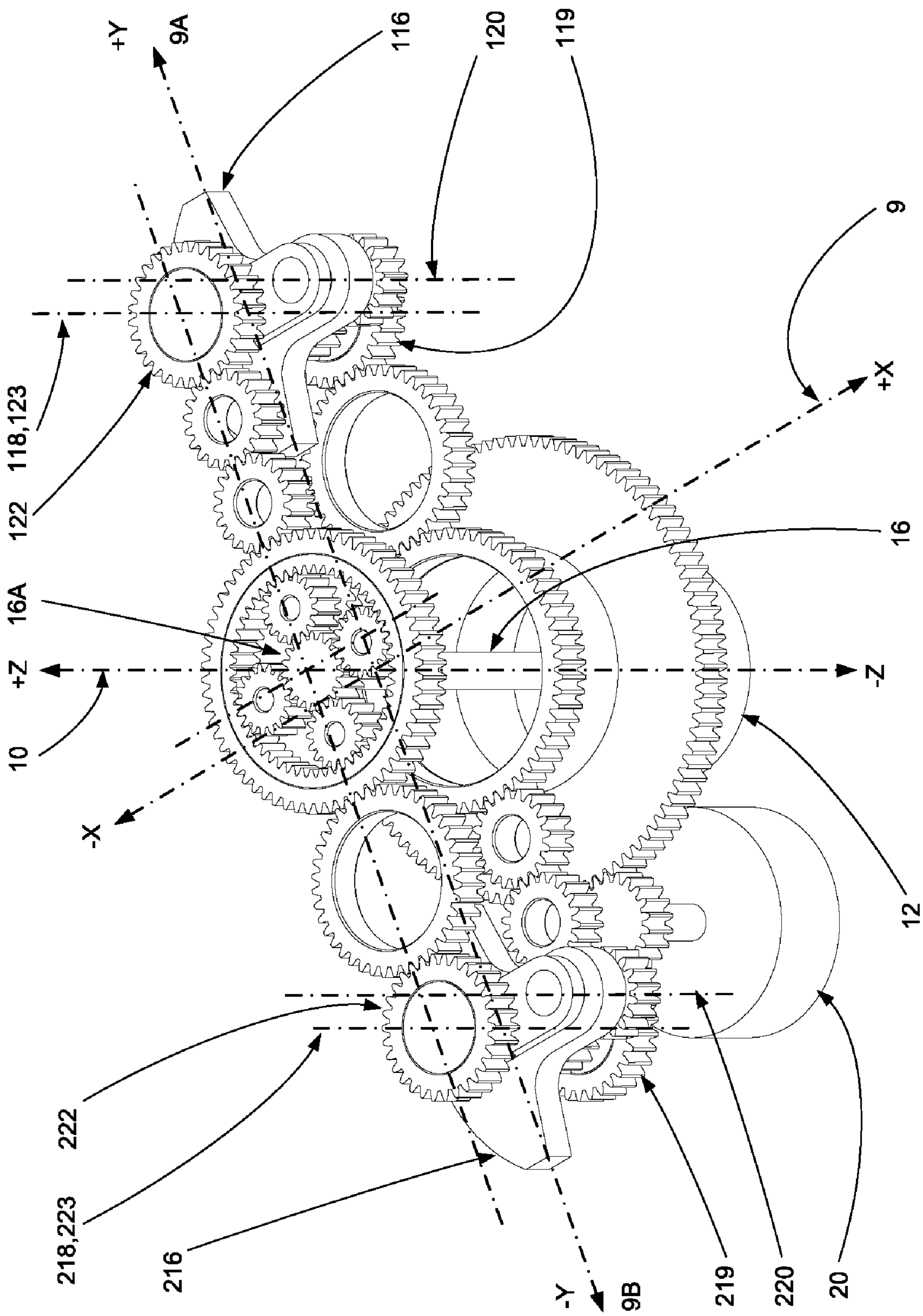

FIGS. 7, 14 and 14A-13I show a minimum configuration which results is substantially no vibration counter force. In this mode, the linear motion of center of mass 118 and center of mass 218, and resulting force vectors 9A and 9B, respectively, are off-parallel by 180 degrees. As shown in FIG. 7, when the linear motion of center of mass 118 and center of mass 218, and resulting force vectors 9A and 9B, respectively, are 180 degrees apart, the forces 9A and 9B are almost entirely in the +y and −y directions, respectively. The y-component of forces 9A and 9B cancel each other about center axis 10. The x-component of forces 9A and 9B are substantially zero to provide a minimum vibration counter force 9 that is substantially zero over time as shown in FIG. 14. In this minimum mode, the linear motion of center of mass 118 and center of mass 218 and force vectors 9A and 9B are controlled to be perpendicular to the longitudinal axis x-x of fuselage 18.

With reference to FIG. 11, to match the force magnitude curve to the desired peak force desired, the relative linear motion of center of mass 118 and center of mass 218, and resulting force vectors 9A and 9B, respectively, are controlled between the maximum force mode and the zero force mode to reach the desired magnitude of vibration counter force 9. In this embodiment, the linear motion of center of mass 118 and center of mass 218, and resulting force vectors 9A and 9B, respectively, are maintained at the desired orientation (from parallel to off-parallel by 180 degrees) by controller 80 driving mass motor 12 and Cg motor 20 relative to each other such that motor 12 rotates axis 120 about axis 123 (−ω) and axis 220 about axis 223 (ω) at a first rotation speed (ω) and motor 20 rotates center of mass 118 about axis 120 (2ω) and center of mass 218 about axis 220 (−2ω) at a second rotational speed (2ω) that is substantially twice the first rotational speed (ω). Thus, the controller maintains the desired operational magnitude of linear vibration control force 9 by maintaining the speed differential between the speed of rotation of axis 120 and 220 about axis 123 and 223, respectively, and the speed of rotation of center of mass 118 and 218 about axis 120 and 220, respectively, at a constant that is a function of a differential between the gear speed coupling ratio of rotational coupling 17 and rotational coupling 25. Accordingly, mass arm 139 rotates two times the speed of rotation of link 117 and in the opposite direction, and mass arm 239 rotates two times the speed of rotation of link 217 and in the opposite direction, to maintain the desired magnitude.

In this embodiment, the orientation (from parallel to off-parallel by 180 degrees) of linear motion of center of mass 118 and center of mass 218, and resulting force vectors 9A and 9B, respectively, are modified or varied by controller 80 driving mass motor 12 and Cg motor 20 relative to each other such that motor 12 rotates axis 120 about axis 123 and axis 220 about axis 223 at a first rotation speed and motor 20 rotates center of mass 118 about axis 120 and center of mass 218 about axis 220 at a second rotational speed that is not substantially twice the first rotational speed. Thus, controller 80 varies the desired operational magnitude of linear vibration control force 9 by varying the speed differential between the speed of rotation of axis 120 and 220 about axis 123 and 223, respectively, and the speed of rotation of center of mass 118 and 218 about axis 120 and 220, respectively, from substantially 2 to 1. In other embodiments, the controller would vary the desired operational magnitude of linear vibration control force 9 by varying the speed differential between the speed of rotation of axis 120 about axis 123 and the speed of rotation of center of mass 118 about axis 120 from a constant that is a function of the differential between the speed coupling ratios of the subject rotational couplings between the motors and masses. Once the desired operational magnitude of linear vibration control force 9 is reached, controller 80 returns to a speed differential between the speed of rotation of axis 120 about axis 123 and the speed of rotation of center of mass 118 about axis 120 of substantially 2 to 1.

Figure 15:
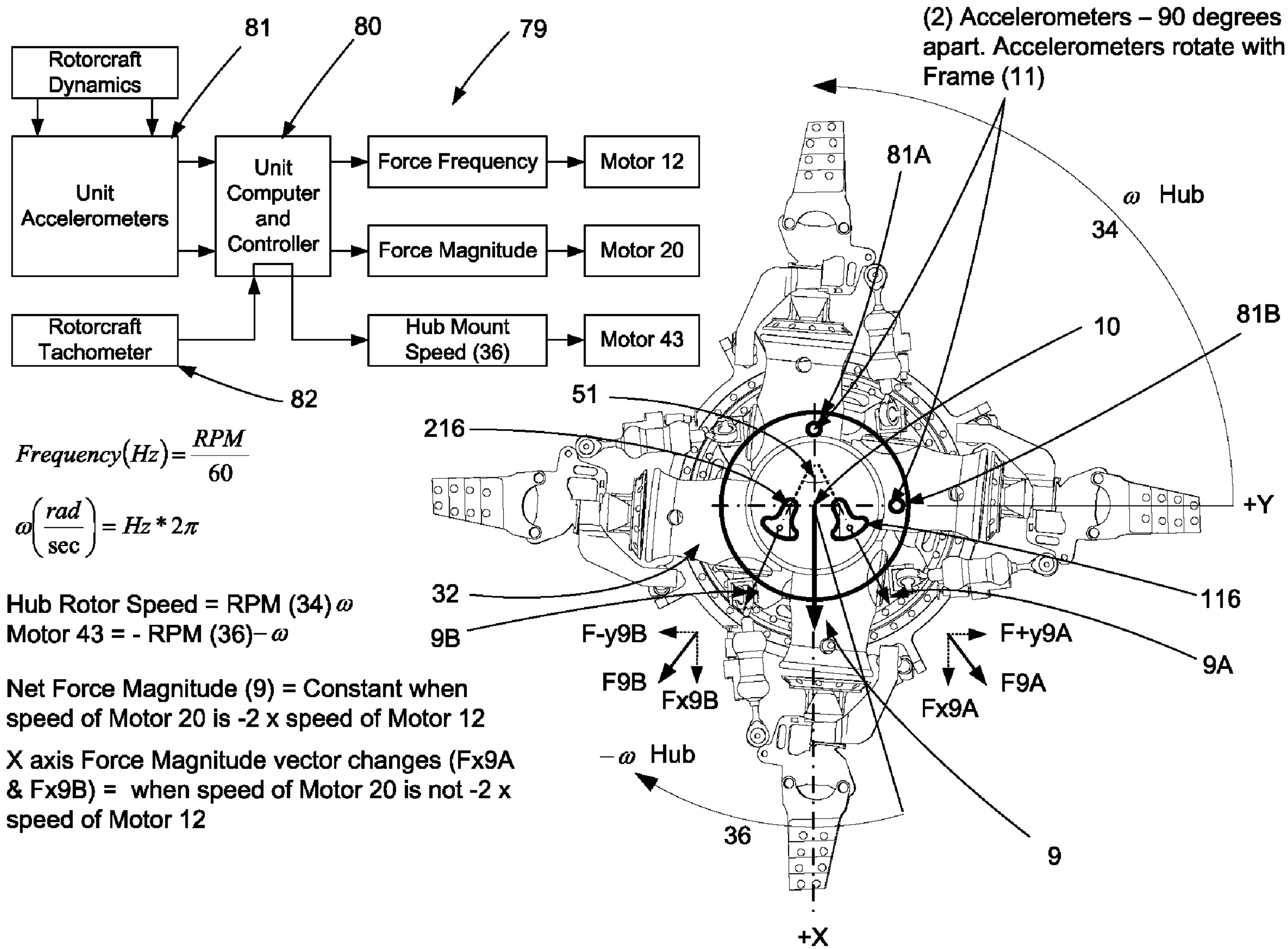
FIG. 15 is a schematic diagram of the vibration controller system for the hub mounted vibration suppression unit shown in FIG. 1.

As shown in FIGS. 3 and 15, base portion 11A of unit housing 11 supports the electronics of vibration suppression unit 110, including microprocessor controller 80 and sensor package 81, 82. In this embodiment, controller 80 is located on annular base 11A of housing 11 and is configured to automatically control the operation of motors 12, 20 and 43. However, controller 80 may be located external to housing 11, including on fuselage 18. Controller 80 receives input signals and outputs command signals to mass motor 12 and Cg motor 20 to control the speed of rotation of vibration control masses 116 and 216 and displacement angles 125 and 225 of vibration control masses 116 and 216, respectively.

Controller 80 communicates with feedback accelerometers 81A and 81B, which in this embodiment are co-located ninety degrees apart in unit frame 11, and tachometer 82, which measures rotor hub 32 rotational speed about center axis 10 relative to fuselage 18. However, alternative and/or additional sensors may be located on rotor shaft 28, on hub 32 and/or on fuselage or airframe 18 to provide rotor shaft speed or operational frequency and vibration feedback data. Thus, sensors 81 may be located outside of housing 11, including on fuselage 18. Sensors may also be installed in other locations. Additional numbers and types of sensor may be used in the system. Based on sensor data and measurements of vibrations transmitted into and through airframe 18, controller 80 controls the operation of vibration suppression unit 110. Controller 80 may control operation of vibration suppression unit 110 based on other data, such as airspeed, blade pitch angle, amount of rotor thrust, and/or other aircraft parameters and dynamics. Although not required in this embodiment, slip rings may provide input and output signals across the rotary gap to controller 80 and actuators 12, 20 and 43 in housing 11 mounted on hub 32.

Thus, as shown in FIG. 15, controller 80 receives input signals from a plurality of sensors that measure various operating parameters of helicopter 30 and provides output commands as a function of such measurements. Vibrations are monitored by the sensors in order to generate forces to actively suppress such vibration. Controller 80 is configured to receive and execute software stored in a memory for executing commands to motors 12, 20 and 43. The software may be implemented via a non-transitory computer readable medium having computer executable instructions that when executed by the processor generate a command. FIG. 15 includes a block diagram of the process 79 for generating commands to motors 12, 20 and 43 based on input from sensors 81 and 82.

In particular, controller 80 sends commands to motor 43 based on tachometer 82 input to rotate control frame 35 about center axis 10 relative to rotor shaft 28 and hub 32 in a rotational direction 36 that is opposite to rotational direction 34 of hub 32 and at an operational frequency or speed of rotation that is substantially the same as the operational frequency or speed of rotation of rotor hub 32 about center axis 10. Controller 80 may also control motor 43 to align the direction of resulting force vector 9 as needed.

Controller 80 sends commands to motors 12 and 20 based on accelerometer 81 input to drive motors 12 and 20 at such relative speeds as to provide the desired suppression force 9. For example, if accelerometers 81 are measuring an undesired x force, controller 80 varies the speed differential between the speed of rotation of axis 120 and 220 about axis 123 and 223, respectively, and the speed of rotation of center of mass 118 and 218 about axis 120 and 220, respectively, from the nominal differential of substantially 2 to 1. This can also be used to correct for any y-force discrepancies between 9A and 9B as well as any operational differences or errors between the coupling speed ratio of gear train 17 and the coupling speed ratio of gear train 25.

In this embodiment, motor 12 is commanded by controller 80 to rotate axis 120 about axis 123 and axis 220 about axis 223 at a speed of n-blades times the hub rotational speed. For helicopter 30 having four blades 31, such rotational speed would be four times the rotational speed of hub 32. Motor 20 is then commanded to operate at such rotational speed as to provide the desired speed differential between the speed of rotation of axis 120 and 220 about axis 123 and 223, respectively, and the speed of rotation of center of mass 118 and 218 about axis 120 and 220, respectively. Such differential or nominal rotational speed of rotation of center of mass 118 and 218 about axis 120 and 220, respectively, by motor 20 is two times the speed of rotation of axis 120 and 220 about axis 123 and 223, respectively, by motor 12, or eight times the rotational speed of hub 32. Controller 80 then adjusts the speed of motor 20 relative to motor 12 from the above nominal 2 to 1 speed differential until x and y accelerometer 81A and 81B measurements approach zero, with y accelerometer 81B providing feedback on whether to adjust the ratio above or below the nominal 2 to 1 differential.

Figure 15A:
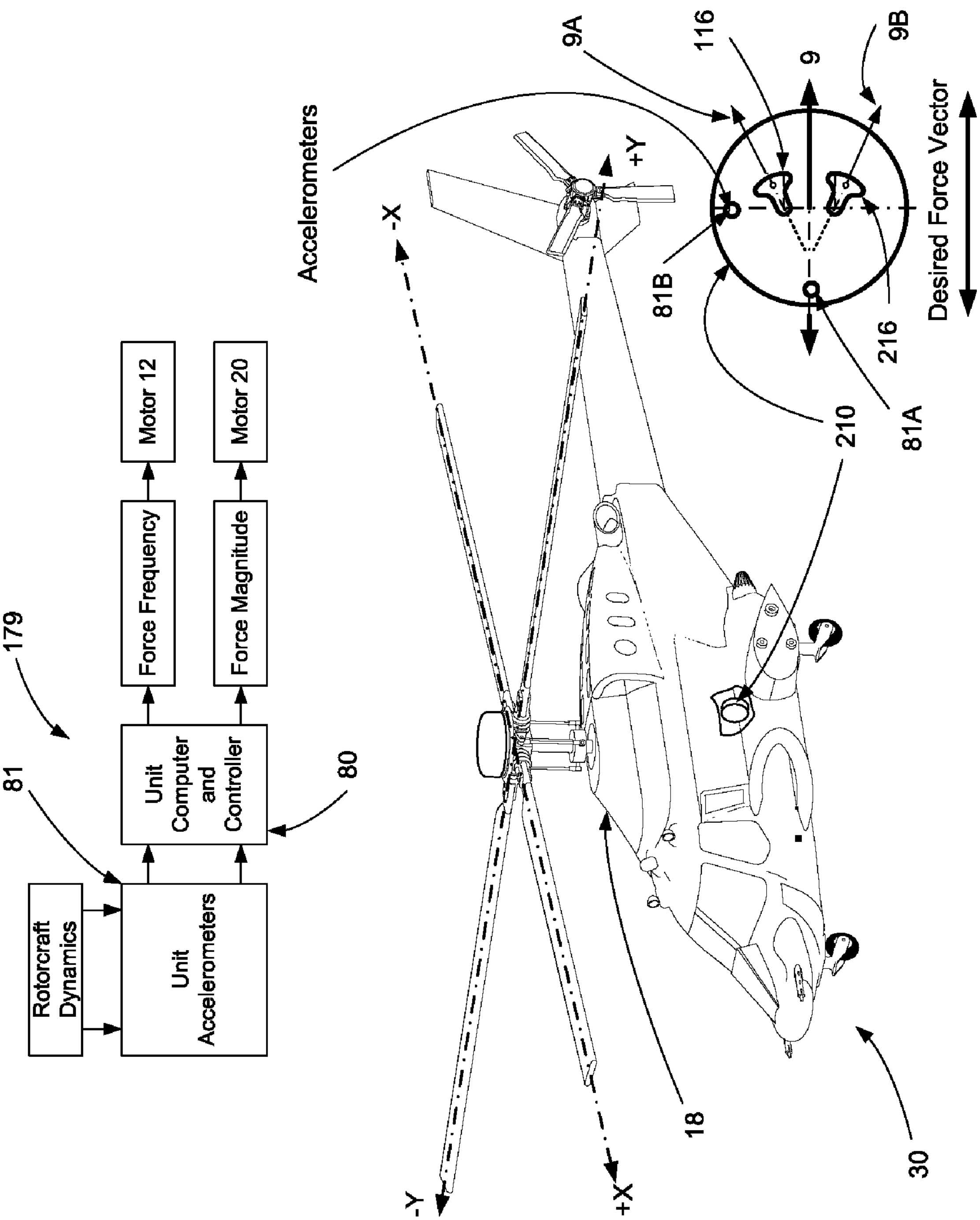
FIG. 15A is a schematic diagram of the vibration controller system for the body mounted vibration suppression unit shown in FIG. 1.

In some embodiments, the vibration control actuation system may generate a force that is applied to other components of the helicopter, or to other types of machines, equipment, vehicles or devices. FIGS. 1 and 15A show embodiment 210 mounted to fuselage 18 of helicopter 30 for providing a desired force directly to the fuselage based on sensor measurements.

While the presently preferred form of the improved vibration suppression system has been shown and described, and several modifications thereof discussed, persons skilled in this art will readily appreciate that various additional changes and modifications may be made without departing from the scope of the invention, as defined and differentiated by the claims.

What is claimed is:

1. A vibration suppression system comprising:

a first vibration control mass having a first center of mass;

a first Cg input driver rotationally coupled to said first mass such that said first center of mass rotates about a first Cg axis with selective rotation of said first Cg input driver about a first Cg input drive axis;

said first center of mass offset a first Cg radial distance from said first Cg axis;

a first mass input driver rotationally coupled to said first mass such that said first Cg axis rotates about a first mass axis with selective rotation of said first mass input driver about a first mass input drive axis;

said first Cg axis offset a first mass radial distance from said first mass axis;

said first center of mass having a selectively variable first displacement angle defined by the inclusive angle between a line extending between said first Cg axis and said first center of mass and a line extending between said first Cg axis and said first mass axis;

said first mass axis offset a first unit radial distance from a unit center axis;

a second vibration control mass having a second center of mass;

a second Cg input driver rotationally coupled to said second mass such that said second center of mass rotates about a second Cg axis with selective rotation of said second Cg input driver about a second Cg input drive axis;

said second center of mass offset a second Cg radial distance from said second Cg axis;

a second mass input driver rotationally coupled to said second mass such that said second Cg axis rotates about a second mass axis with selective rotation of said second mass input driver about a second mass input drive axis;

said second Cg axis offset a second mass radial distance from said second mass axis;

said second center of mass having a selectively variable second displacement angle defined by the inclusive angle between a line extending between said second Cg axis and said second center of mass and a line extending between said second Cg axis and said second mass axis; and said second mass axis offset a second unit radial distance from said unit center axis;

wherein said first mass and said second mass are controllable to produce a vibration control force vector having a controllable magnitude about said unit center axis.

2. The vibration suppression system set forth in claim 1, wherein said first mass and said second mass are controllable to produce a linear vibration control force vector.

3. The vibration suppression system set forth in claim 1, wherein:

said first Cg axis, said second Cg axis, said first mass axis and said second mass axis are parallel;

said first Cg axis rotates about said first mass axis and said second Cg axis rotates about said second mass axis in opposite rotational directions;

said first center of mass rotates about said first Cg axis and said second center of mass rotates about said second Cg axis in opposite rotational directions; and said first Cg axis rotates about said first mass axis and said first center of mass rotates about said first Cg axis in opposite rotational directions.

4. The vibration suppression system set forth in claim 1, wherein said first displacement angle and said second displacement angle are synchronized to be equal.

5. The vibration suppression system set forth in claim 1, wherein said first Cg input drive axis of said first Cg input driver and said first mass input drive axis of said first mass input driver are coincident with said first mass axis.

6. The vibration suppression system set forth in claim 1, wherein when said first displacement angle is 0 degrees said first center of mass is coincident to said first mass axis.

7. The vibration suppression system set forth in claim 1, comprising:

a mass motor having a mass rotor driven to rotate about a mass rotor axis;

a Cg motor having a Cg rotor driven to rotate about a Cg rotor axis;

a first motor rotational coupling between said mass rotor and said first mass input driver configured such that said first Cg axis rotates about said first mass axis with rotation of said mass rotor about said mass rotor axis, whereby a speed of rotation of said first mass about said first mass axis is a function of rotation of said mass rotor;

a second motor rotational coupling between said Cg rotor and said first Cg input driver configured such that said first center of mass rotates about said first Cg axis with rotation of said Cg rotor about said Cg rotor axis, whereby said first displacement angle is a function of said Cg rotor; and a controller for receiving input signals and outputting command signals to said mass motor and said Cg motor to control said speed of rotation of said first mass and said first displacement angle of said first mass.

8. The vibration suppression system set forth in claim 7, wherein said controller controls said first displacement angle of said first mass such that said first displacement angle varies over an operational cycle, and wherein said first displacement angle varies from 0 degrees to 180 degrees during said operational cycle.

9. The vibration suppression system set forth in claim 7, wherein said controller selectively controls said mass motor and said Cg motor such that said first Cg axis rotates about said first mass axis at a first mass rotational speed and said second Cg axis rotates about said second mass axis at a second mass rotational speed that is the same as said first mass rotational speed, and said first center of mass rotates about said first Cg axis at a first Cg rotational speed and said second center of mass rotates about said second Cg axis at a second Cg rotational speed that is the same as said first Cg rotational speed.

10. The vibration suppression system set forth in claim 7, wherein:

said first motor rotational coupling between said mass rotor and said first mass input driver comprises a first mass coupling speed ratio and said first motor rotational coupling is between said mass rotor and said second mass input driver and comprises a second mass coupling speed ratio that is the same as said first mass coupling speed ratio;

said second motor rotational coupling between said Cg rotor and said first Cg input driver comprises a first Cg coupling speed ratio and said second motor rotational coupling is between said Cg rotor and said second Cg input driver and comprises a second Cg coupling speed ratio that is the same as said first Cg coupling speed ratio; and said controller varies said first displacement angle by maintaining a speed differential between said Cg motor and said mass motor at a constant that is a function of a differential between said mass coupling speed ratio and said Cg coupling speed ratio.

11. The vibration suppression system set forth in claim 7, wherein said controller varies an operational magnitude of said vibration control force vector by varying a speed differential between a speed of rotation of said first Cg axis about said first mass axis and a speed of rotation of said first center of mass about said first Cg axis from 2 to 1.

12. The vibration suppression system set forth in claim 7, comprising:

a first support linkage rotationally coupled between said first mass input driver and said first mass such that said first support linkage and said first Cg axis rotate about said first mass axis with rotation of said first mass input driver about said first mass input drive axis; and a second support linkage rotationally coupled between said second mass input driver and said second mass such that said second support linkage and said second Cg axis rotate about said second mass axis with rotation of said second mass input driver about said second mass input drive axis.

13. The vibration suppression system set forth in claim 12, wherein said first support linkage has a first support center of mass and said first support center of mass is coincident with said first mass axis.

14. The vibration suppression system set forth in claim 7, comprising a unit frame and wherein said mass motor and said Cg motor each comprise a rotary electric motor and a stator of said Cg motor is mounted to said unit frame and a stator of said mass motor is mounted to said unit frame.

15. The vibration suppression system set forth in claim 7, wherein said Cg rotor axis and said mass rotor axis are offset from said unit center axis by an equal distance and are not coincident.

16. A rotary wing aircraft having the vibration suppression system set forth in claim 7, comprising:

a rotary-wing aircraft having a plurality of rotor blades mounted to a rotor hub and driven about a central axis of rotation at an operational speed and in a rotational direction relative to a non-rotating body of said aircraft;

a unit frame mounted to said rotor hub and operationally configured to rotate with said rotor hub about said central axis;

a vibration control frame rotationally supported by said unit frame and operationally configured to rotate relative to said rotor hub about said central axis in a rotational direction opposite to said operational rotational direction of said rotor hub;

a control frame motor configured to rotate said vibration control frame about said central axis in said rotational direction opposite to said operational rotational direction of said rotor hub;

said unit frame supporting said control frame motor, said Cg motor and said mass motor; and said vibration control frame supporting in rotational engagement said first mass input driver, said first Cg input driver, said second mass input driver, and said second Cg input driver.

17. The vibration suppression system set forth in claim 16, comprising:

a first support linkage rotationally coupled between said first mass input driver and said first mass such that said first support linkage and said first Cg axis rotate about said first mass axis with rotation of said first mass input driver about said first mass input drive axis; and a second support linkage rotationally coupled between said second mass input driver and said second mass such that said second support linkage and said second Cg axis rotate about said second mass axis with rotation of said second mass input driver about said second mass input drive axis.

18. The vibration suppression system set forth in claim 17, comprising a first linkage rotational coupling rotationally supported by said first support linkage and rotationally coupled between said first Cg input driver and said first mass and a second linkage rotational coupling rotationally supported by said second support linkage and rotationally coupled between said second Cg input driver and said second mass, wherein said first linkage rotational coupling comprises a first linkage first gear and a first linkage second gear and said second linkage rotational coupling comprises a second linkage first gear and a second linkage second gear, and wherein said first linkage second gear of said first linkage rotational coupling comprises a shaft connected to an arm fixed to said first mass, and wherein said second linkage second gear of said second linkage rotational coupling comprises a shaft connected to an arm fixed to said second mass.

19. The vibration suppression system set forth in claim 18, comprising bearings between said first support linkage and said first linkage rotational coupling such that said first linkage first gear and said first linkage second gear can rotate relative to said first support linkage, and bearings between said second support linkage and said second linkage rotational coupling such that said second linkage first gear and said second linkage second gear can rotate relative to said second support linkage.

20. The vibration suppression system set forth in claim 17, wherein said vibration control frame supports in rotational engagement said first support linkage such that said first support linkage rotates about said first mass axis relative to said vibration control frame, and wherein said vibration control frame supports in rotational engagement said second support linkage such that said second support linkage rotates about said second mass axis relative to said vibration control frame.

21. The vibration suppression system set forth in claim 17, comprising:

bearings between said first support linkage and said vibration control frame such that said first support linkage can rotate relative to said vibration control frame;

bearings between said second support linkage and said vibration control frame such that said second support linkage can rotate relative to said vibration control frame;

a bearing between said vibration control frame and said first support linkage;

a bearing between said first support linkage and said first Cg input driver; and a bearing between said unit frame and said vibration control frame.

22. The vibration suppression system set forth in claim 16, wherein:

said first motor rotational coupling between said mass rotor and said first mass input driver comprises:

planetary gears rotationally supported by said unit frame and in meshed engagement with an output shaft rotationally coupled to said mass rotor;

a ring gear rotationally supported by unit frame or vibration control frame and in meshed engagement with said planetary gears;

a first mass gear in meshed engagement with said ring gear; and a second mass gear in meshed engagement with said first mass gear and said first mass input driver, respectively; and said second motor rotational coupling is between said Cg rotor and said second Cg input driver and comprises:

a dual ring gear rotationally supported by said unit frame and configured to rotate about said unit center axis relative to said unit frame, said dual ring gear having a first ring gear and a second ring gear;

said first ring gear in meshed engagement with an output shaft rotationally coupled to said Cg rotor;

said second ring gear in meshed engagement with a first Cg mass gear; and a second Cg gear in meshed engagement with said first Cg gear and said second Cg input driver, respectively.

23. The vibration suppression system set forth in claim 22, wherein:

said first motor rotational coupling is between said mass rotor and said second mass input driver and comprises a third mass gear in meshed engagement with said ring gear and said second mass input driver, respectively; and said second motor rotational coupling between said Cg rotor and said first Cg input driver comprises a third Cg gear in meshed engagement with said second ring gear of said dual ring gear and said first Cg input driver, respectively.

24. The vibration suppression system set forth in claim 23, wherein:

said geared output shaft rotationally coupled to said mass rotor, said first mass gear, said third mass gear, and said first mass input driver each rotate in a first rotational direction and said ring gear, said second mass gear and said second mass input driver each rotate in a second rotational direction opposite to said first rotational direction; and said rotor hub, said unit frame, said geared output shaft rotationally coupled to said Cg rotor, said first Cg gear, said third Cg gear, and said second Cg input driver each rotate in a first rotational direction and said vibration control frame, said dual ring gear, said second Cg gear, and said first Cg input driver rotate in a second rotational direction opposite to said first rotational direction.

25. The vibration suppression system set forth in claim 23, comprising:

bearings between said planetary gears and said unit frame such that said planetary gears can rotate relative to said unit frame, and bearings between said first mass gear, said second mass gear and said third mass gear and said vibration control frame such that said first mass gear, said second mass gear and said third mass gear can rotate relative to said vibration control frame;

bearings between said dual ring gear and said unit frame such that said dual ring gear can rotate relative to said unit frame; and bearings between said first Cg gear, said second Cg gear and said third Cg gear and said vibration control frame such that first Cg gear, said second Cg gear and said third Cg gear can rotate relative to said vibration control frame.

26. The vibration suppression system set forth in claim 16, comprising a rotational coupling between said control frame motor and said vibration control frame comprising a frame gear mounted to said vibration control frame and in meshed engagement with an output shaft rotationally coupled to a rotor of said control frame motor.

27. The vibration suppression system set forth in claim 7, comprising:

a unit frame fixed to a structure subject to vibration;

a vibration control frame mounted to said unit frame and operationally configured to rotate relative to said unit frame about said unit central axis in a first and a second rotational direction;

a control frame motor configured to rotate said vibration control frame about said unit central axis in said first and said second rotational directions;

said unit frame supporting said control frame motor, said Cg motor and said mass motor; and said vibration control frame supporting in rotational engagement said first mass input driver, said first Cg input driver, said second mass input driver, and said second Cg input driver.

28. The vibration suppression system set forth in claim 27, wherein said controller receives said input signals and outputs command signals to said control frame motor to control a direction of said vibration control force vector about said unit center axis.

29. The vibration suppression system set forth in claim 27, wherein said first mass and said second mass are controllable to produce a circular vibration control force vector having a controllable operational magnitude.

30. The vibration suppression system set forth in claim 29, wherein said controller controls said first displacement angle of said first mass such that said first displacement angle is constant over an operational cycle to produce a vibration control force vector having a desired constant magnitude about said unit center axis over said operational cycle.

31. The vibration suppression system set forth in claim 1, wherein said first Cg radial distance is equal to said first mass radial distance.

32. The vibration suppression system set forth in claim 1, wherein a distance between said first center of mass and said first mass axis is selectively variable.

33. The vibration suppression system set forth in claim 7, comprising a sensor for measuring vibration and/or rotor shaft speed and providing input to said controller.

34. The vibration suppression system set forth in claim 16, wherein said controller is supported by and rotates with said unit frame.

* * * * *